US007350191B1

United States Patent
Kompella et al.

(10) Patent No.: US 7,350,191 B1
(45) Date of Patent: Mar. 25, 2008

(54) COMPUTER IMPLEMENTED SYSTEM AND METHOD FOR THE GENERATION OF DATA ACCESS APPLICATIONS

(75) Inventors: Radha Kompella, Redmond, WA (US); Dewayne Cowles, Portland, OR (US)

(73) Assignee: Noetix, Inc., Bellevue, WA (US)

( * ) Notice: Subject to any disclaimer, the term of this patent is extended or adjusted under 35 U.S.C. 154(b) by 728 days.

(21) Appl. No.: 10/421,532

(22) Filed: Apr. 22, 2003

(51) Int. Cl.
*G06F 9/44* (2006.01)
*G06F 7/00* (2006.01)
(52) U.S. Cl. .......................... 717/108; 717/172; 707/5
(58) Field of Classification Search ........ 717/106–123, 717/168–173; 707/1, 5
See application file for complete search history.

(56) References Cited

U.S. PATENT DOCUMENTS

| | | | | |
|---|---|---|---|---|
| 6,044,217 | A * | 3/2000 | Brealey et al. ............. | 717/107 |
| 6,085,198 | A * | 7/2000 | Skinner et al. ......... | 707/103 R |
| 6,128,619 | A * | 10/2000 | Fogarasi et al. ............ | 707/102 |
| 6,240,416 | B1 | 5/2001 | Immon et al. | |
| 6,611,838 | B1 | 8/2003 | Ignat et al. | |
| 6,662,188 | B1 | 12/2003 | Rasmussen et al. | |
| 6,785,882 | B1 * | 8/2004 | Goiffon et al. ............. | 717/120 |
| 6,895,556 | B1 * | 5/2005 | Kaply et al. ................ | 715/741 |
| 7,058,651 | B2 * | 6/2006 | Hembry et al. ............. | 707/102 |
| 7,124,150 | B2 * | 10/2006 | Majjasie et al. ......... | 707/104.1 |
| 7,124,401 | B2 * | 10/2006 | Muller et al. ............... | 717/124 |
| 7,240,330 | B2 * | 7/2007 | Fairweather ................ | 717/116 |
| 2002/0091991 | A1* | 7/2002 | Castro ........................ | 717/106 |
| 2003/0004746 | A1* | 1/2003 | Kheirolomoom et al. ...... | 705/1 |
| 2004/0085363 | A1* | 5/2004 | Lawrence ................... | 345/802 |
| 2006/0282886 | A1* | 12/2006 | Gaug ............................ | 726/5 |

OTHER PUBLICATIONS

Dalesio, The ground test accelerator control system database: configuration, run-time operation, and access, IEEE, Mar. 1989 pp. 1693-1964 vol. 3.*
Blakeley, Universal data access with OLE DB, IEEE, Feb, 1997 pp. 2-7.*
Min-A Jeong et al., A flexible database security system using multiple access control policies, IEEE,Aug. 2003 pp. 236-240.*
Metadata standards for Web-based resources, Steinacker, A.; Ghavam, A.; Steinmetz, R. Multimedia, IEEE, vol. 8 Issue: 1 Jan.-Mar. 2001, IEEE, pp. 70-76.*
Associating and presenting metadata of digital archive objects in virtual spaces as synchronized multimedia content, Tanaka, K.; Koiso, K.; Nadamoto, A., Digital Libraries: Research and Practice, 2000 Kyoto, International Conference on, 2000, IEEE, pp. 280-287.*

(Continued)

*Primary Examiner*—Wei Zhen
*Assistant Examiner*—Satish S Rampuria
(74) *Attorney, Agent, or Firm*—DLA Piper US LLP

(57) ABSTRACT

A method and architecture is described that discovers software application metadata and generates data access applications based on the discovered software application metadata. The discovered metadata along with handcrafted metadata goes through a discovery process and is converted into common, generic abstract metadata objects. The abstract metadata objects then go through an instantiation process to be translated into concrete metadata objects that represent the unique configuration, context and terminology of the source software application. The concrete metadata objects can be generated into numerous forms for the purposes of data access and information sharing. The system also has upgrade protection.

66 Claims, 34 Drawing Sheets

OTHER PUBLICATIONS

Use of metadata registries for searching for statistical data, Nelson, C., Scientific and Statistical Database Management, 2002. Proceedings. 14th International Conference on, 2002. IEEE, pp. 232-235.*

*Metadata Management for Enterprise Applications*; Neil Buchwalter, Product Manager, AllFusion © Modeling Suite May 2006.

Product Brochure: *Business Objects Metadata Manager—Consolidate, Integrate, Audit, and Trust your Metadata*; 2005.

COGNOS® 8 Framework Manager User Guide—2006.

Oracle® Business Intelligence Discoverer Administration Guide 10g Release 2 (10.1.2.1) B13916-04 Jul. 2005.

Oracle Designer website: http://download-west.oracle.com/otn_hosted_doc/designer/misc/272273/contents.htm Design Capture Driven Approach, date: unknown.

Metadata modeling tool CA Erwin—http://www3.ca.com/Files/DataSheets/erwin_ds.PDF http://www3.ca.com/Files/WhitePapers/metadata_mgmt.pdf, date: unknown.

Business Intelligence Tools by Cognos http://www.cognos.com/pdfs/issue_papers/ip_metadata_and_c8bi.pdf, date: unknown.

Business Intelligence Tools by Business Objects http://www.businessobjects.com/products/eim/lifecyclemanagement/metadatamanager.asp, date:unknown.

Business Intelligence Tools by Informatica http://www.informatica.com/products/powercenter/arch/metadata/default.htm, date unknown.

* cited by examiner

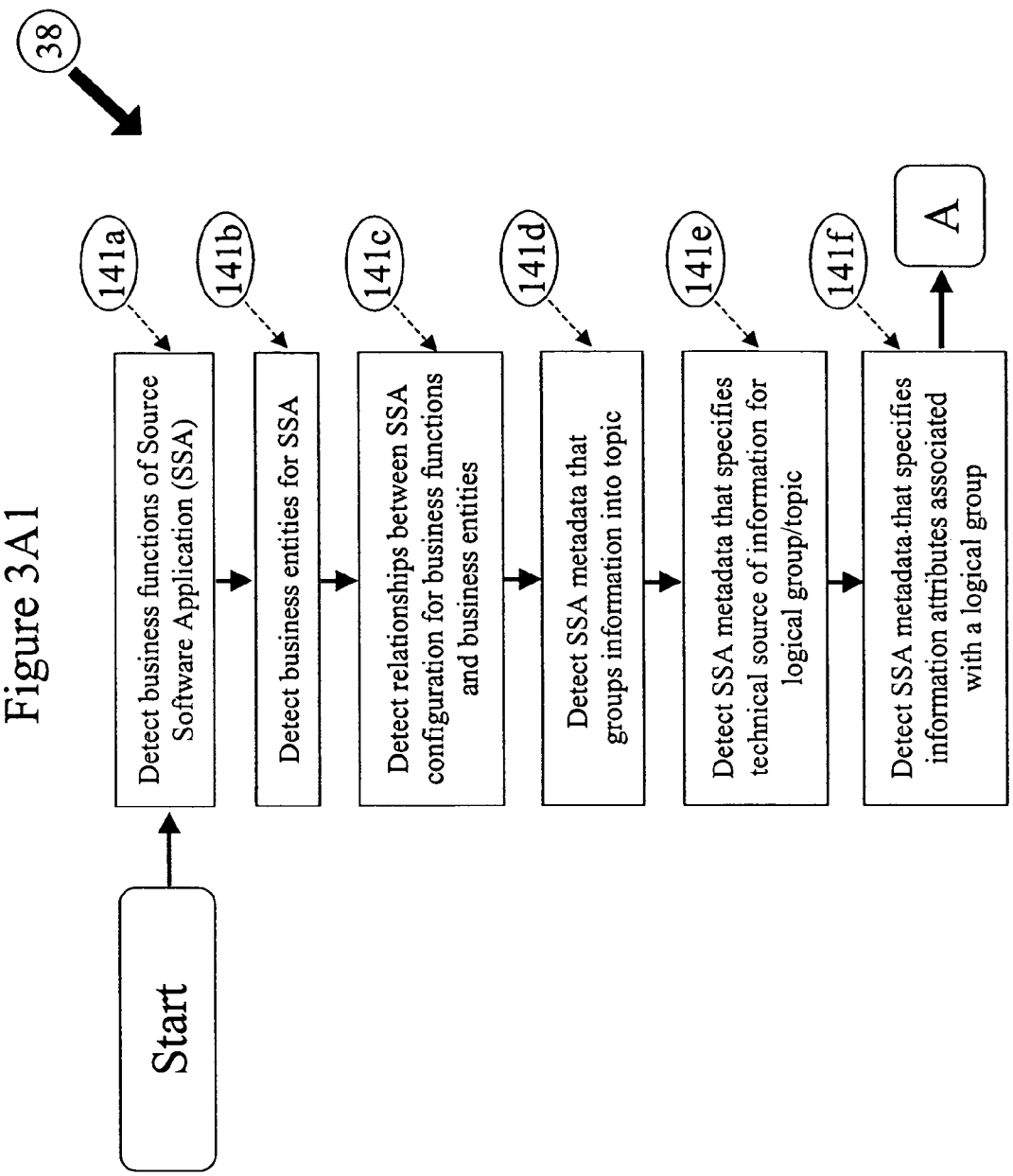
Figure 3A1

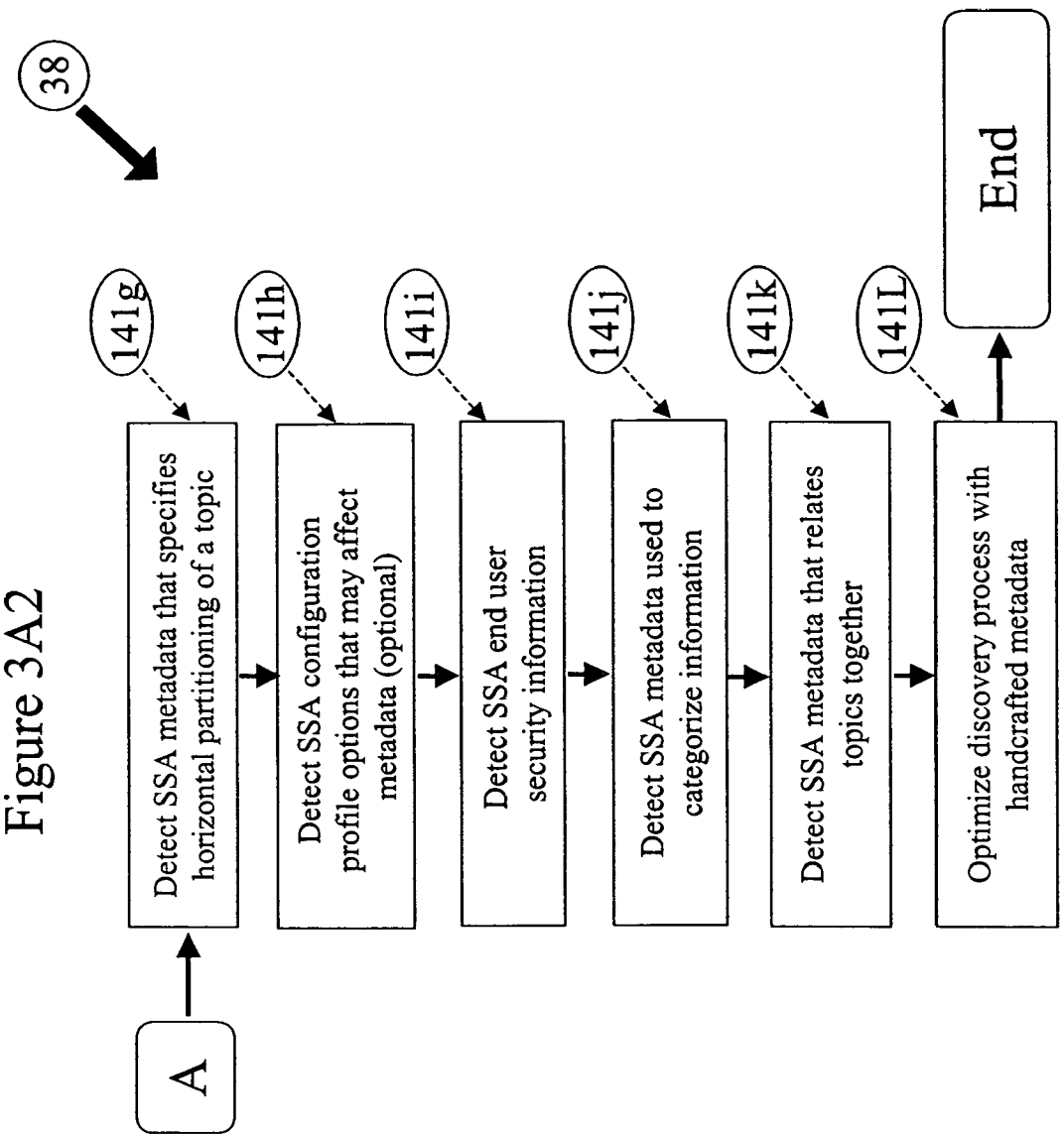
Figure 3A2

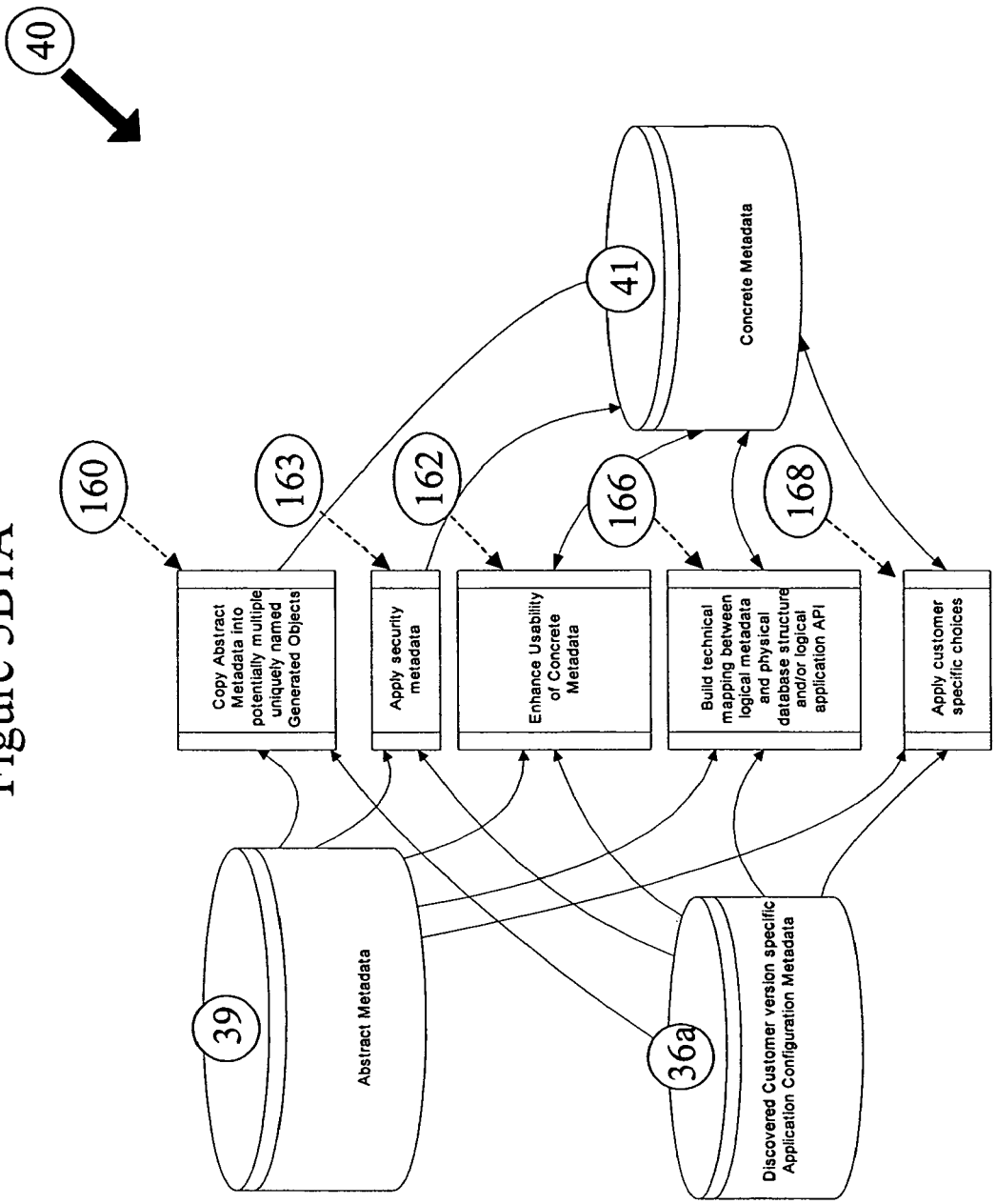
Figure 5B1A

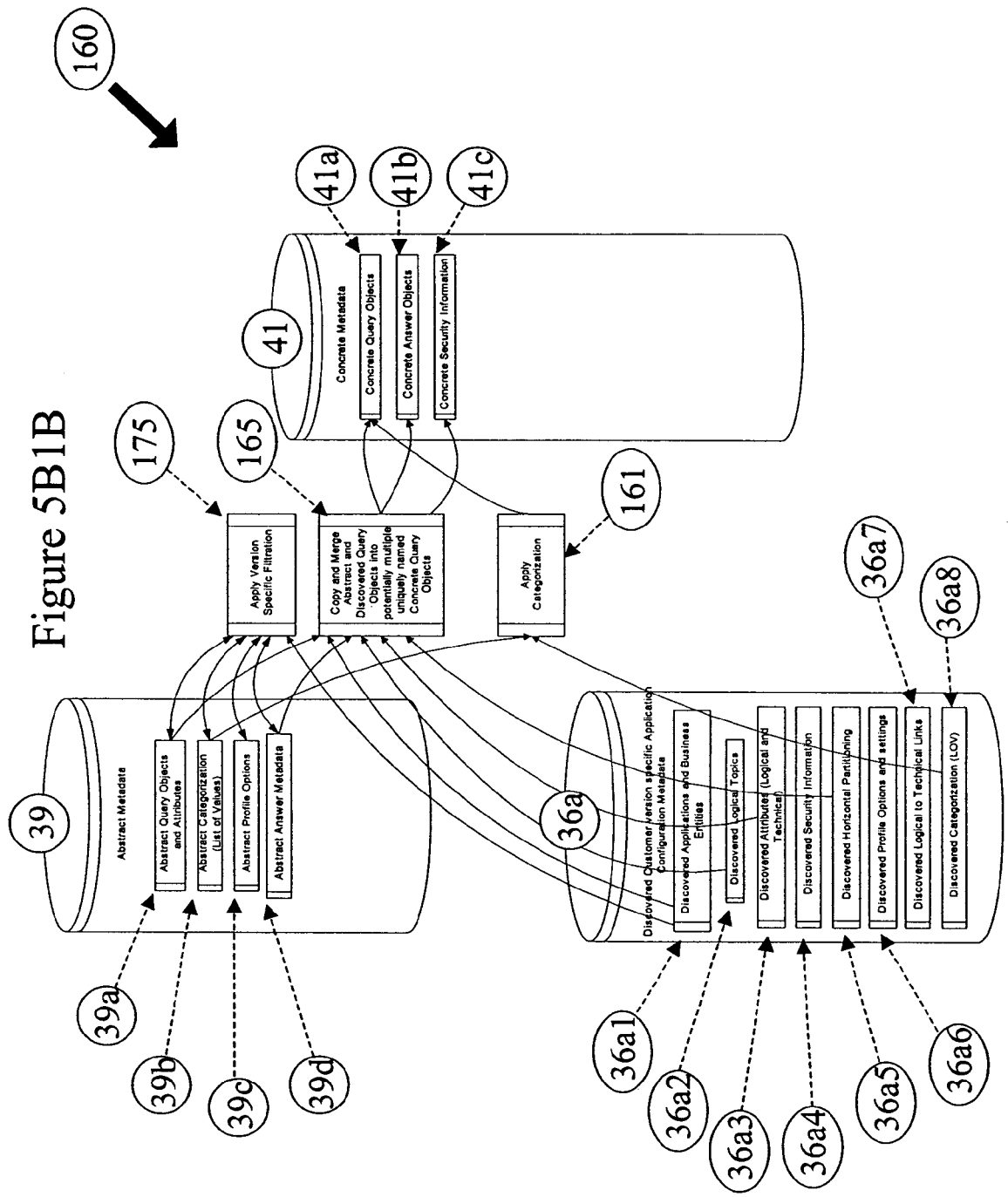
Figure 5B1B

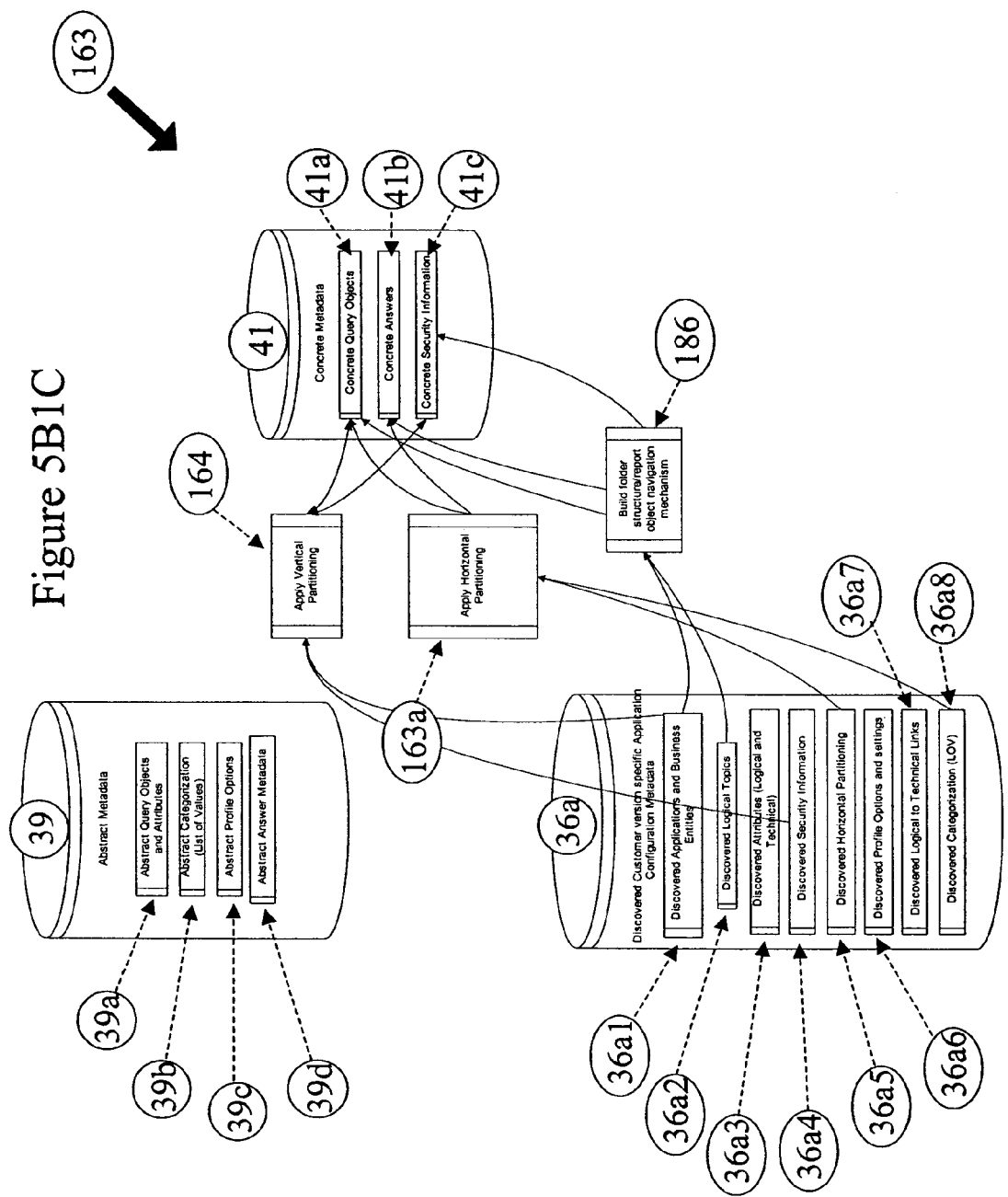
Figure 5B1C

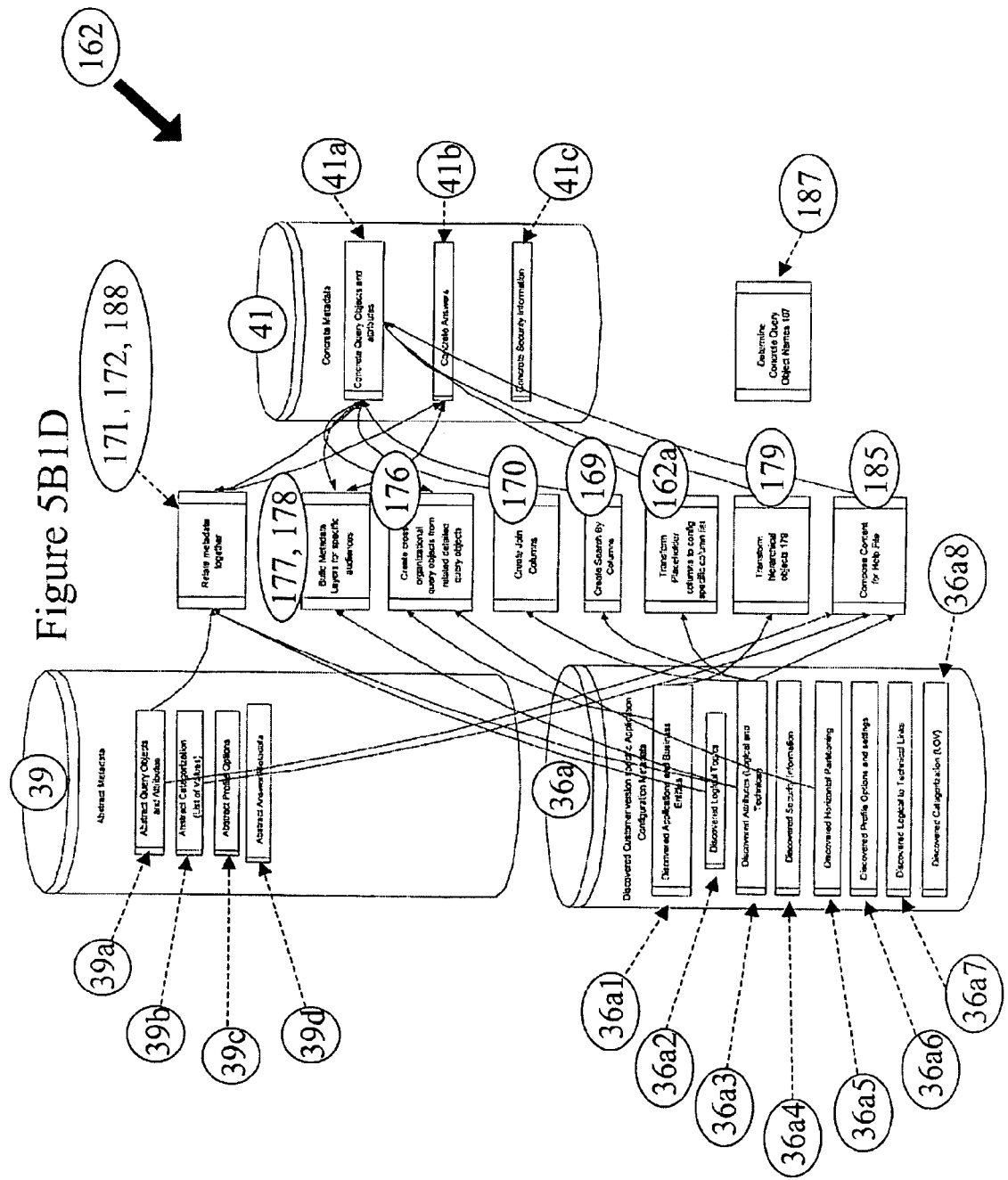
Figure 5B1D

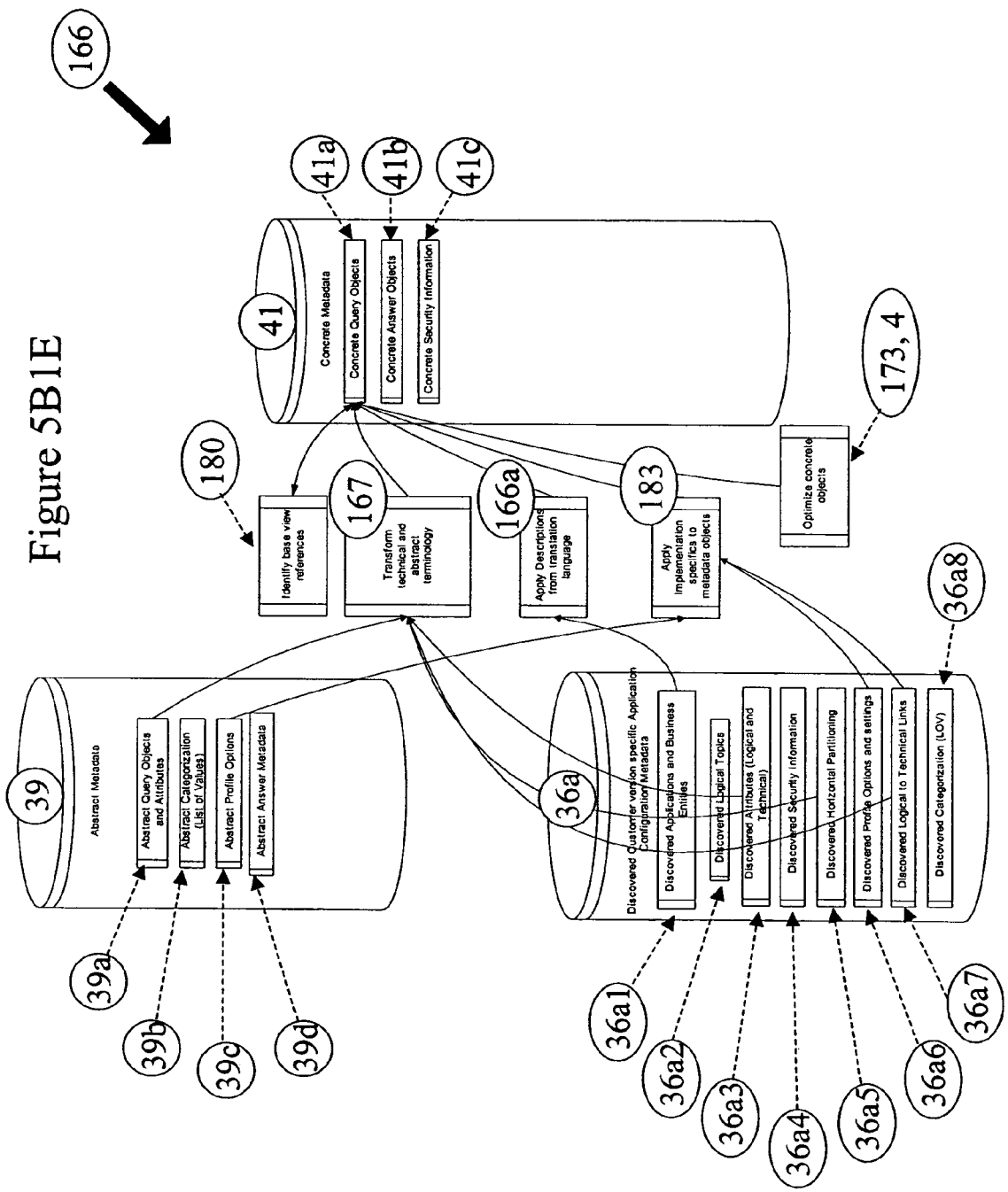
Figure 5B1E

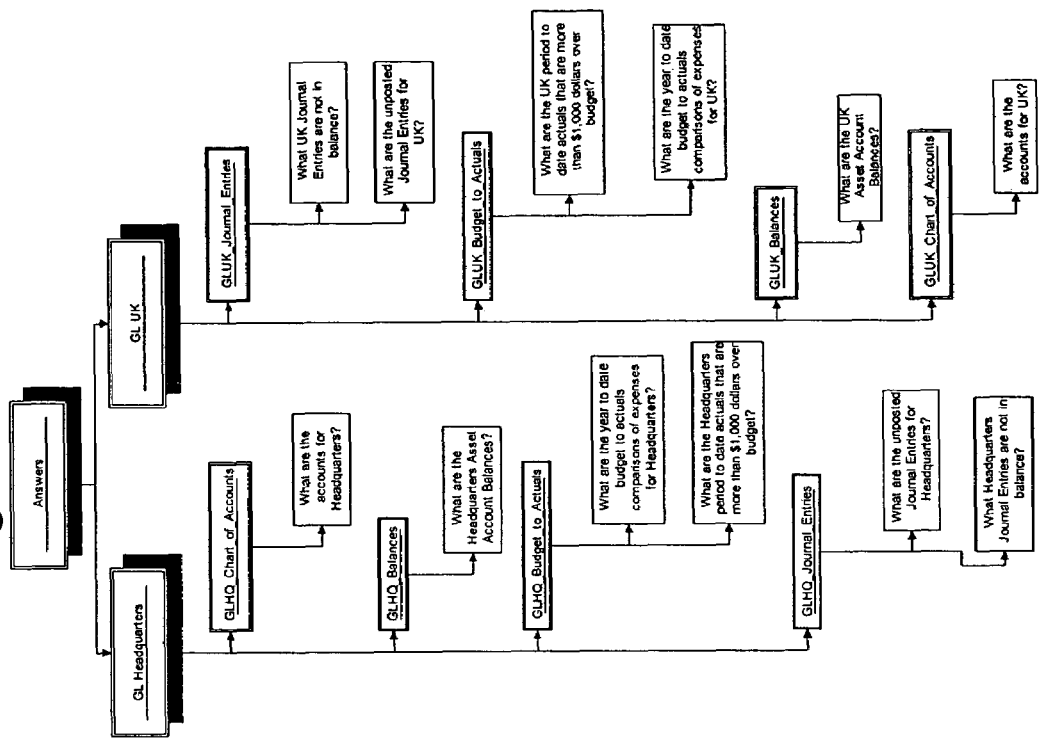
Figure 5B2

Figure 8B

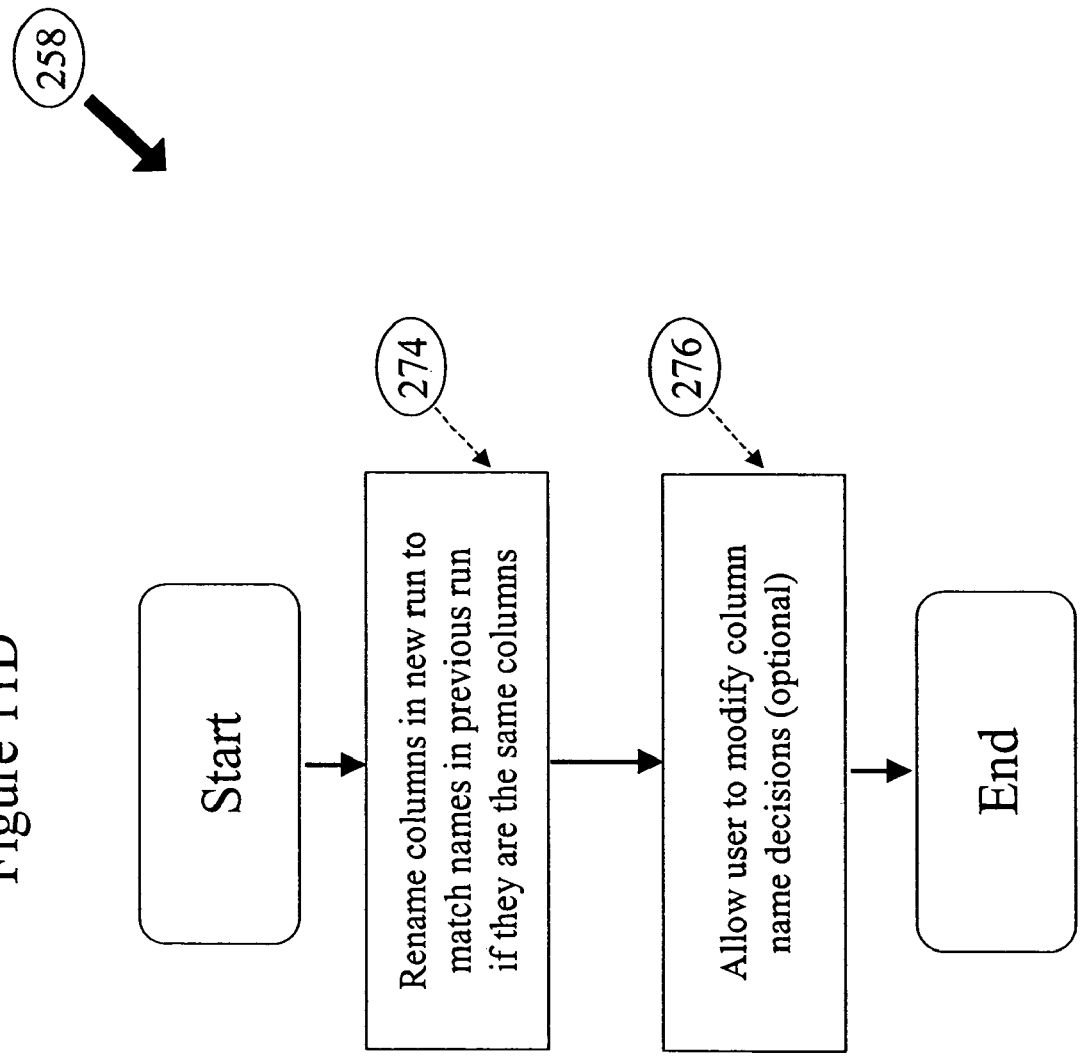

COMPUTER IMPLEMENTED SYSTEM AND METHOD FOR THE GENERATION OF DATA ACCESS APPLICATIONS

FIELD OF THE INVENTION

This invention relates generally to a system and method for generating data access applications and in particular to a computer implemented system and method for generating metadata objects associated with a software application that can be used to generate various applications to provide data access to the data in the software application.

BACKGROUND OF THE INVENTION

Business application software usage has caused a proliferation of data in the enterprise. The business user usually creates the data through a user interface or the software itself generates the data or other software loads the data from other systems. The data is contained in some type of data store such as a relational database. There is generally a complex data model that represents the structure of the stored data and it takes a skilled information technology person to extract the data for information access and data sharing. The data is used to track the operations of the business and monitor the information that drives the business as well as assist in making business decisions. The interface used to extract the information can take many forms but is often personal computer based software, such as a query tool or a report-writing tool, that can connect to a relational database or object model. It is generally a very time consuming, manual process to learn the data structures, hone the required skills and write the queries, reports or routines to extract the data and make it meaningful to a business user.

While traditional business intelligence solutions continue to introduce more and more ways to make your reports look nice, they still do not address the most difficult aspect of reporting: accessing the information you need in a timely and flexible manner and presenting that information in business terms that are understood by business people.

Thus, it is desirable to provide a system and method for the generation of data access applications that overcome the limitations of the conventional system and it is to this end that the present invention is directed.

SUMMARY OF THE INVENTION

An architecture and method are provided for the automatic discovery of source software application metadata and the instantiation of the discovered abstract metadata definitions into concrete metadata definitions designed for information access and data sharing. A method to support the inclusion of handcrafted abstract metadata is provided. The concrete metadata definitions can be generated into many different formats referred to as generated objects. Information access and data sharing software applications built on these generated objects receive upgrade protection as metadata is modified from one version to subsequent versions of the source software application. The method of the invention is depicted in FIG. 1A.

This invention simplifies and expedites access to the business application data by presenting the information in context and terminology that business users understand greatly simplifying the job of the information technology expert and often empowering the business user to access the information directly without the assistance of the expert. The architecture generates the solution automatically and therefore implements very quickly meaning days rather than months. This solution also reduces maintenance expenses for enterprises in terms of human resource costs by keeping data access applications in tact when the underlying business applications that own the data are updated or modified. This invention provides timelier, easier, cost effective access to corporate data.

Unlike reporting solutions that require weeks of extensive manual mapping to produce a single report, the invention automatically, upon installation, delivers answers to hundreds of the most important business questions from source software applications, such as Oracle® Applications, Seibel® eBusiness Applications, PeopleSoft® applications and SAP® applications. The invention is not limited to any particular source software application and may be used with a variety of existing source software applications as well as future source software applications.

The system in accordance with the invention provides businesses with a low-cost, easy-to-use self-service query and reporting solution that is accessible via the Web and works seamlessly with third-party query tools, including Microsoft® Excel. The system significantly increases the value of the organization's investment in a source software application, such as Oracle® Applications, Siebel® eBusiness Applications and PeopleSoft® Applications, by not only empowering users to easily develop and distribute their own queries and reports, but also by significantly reducing the costs associated with report development and maintenance.

The system automatically picks up the organization's unique application configuration and setup data and creates a unique set of easy-to-use generated objects commonly referred to query objects and report templates, also know as Noetix Views and Noetix® AnswerPoint. The system in accordance with the invention can then be easily rolled out to business users that need the information, further reducing the strain on overburdened IT departments.

In a short time, typically less than two weeks, the system in accordance with the invention detects the unique configuration of a source software application, such as an Oracle® Application, for a particular organization's implementation and automatically generates hundreds of answers to the most important business questions. During installation against Oracle® Applications, the system discovers metadata such as security, sets of books, operating units, inventory organization, quick picks, flexfields and business rules—providing decision makers with a map of their business application enabling the ability to quickly and accurately find business information. The system protects generated objects as well as any queries or reports developed with the system from data structure changes common to application upgrades, such as upgrading for Oracle® Application 11.0.3 to Oracle® Application 11.5.8, using the upgrade protection process.

Broadly, the invention performs a discovery process, an instantiation process and a generation process in order to generate the data access applications in accordance with the invention wherein the upgrade protection process is integrated into each of the processes. In particular, as the source software application metadata is modified, the discovery process detects the changes and the upgrade protection process applies the changes to the generated objects. The handcrafted metadata, programmatic logic and pattern-match algorithms determine how to protect the metadata definition from change by transforming or obsolescing the definition while creating new metadata definitions for newly discovered functionality. The result of upgrade protection is that, frequently, no manual changes are required to the information access software applications that use the generated objects as a foundation. Samples of information access and data sharing software applications include: database views for adhoc query and development of operational reports; database views for extraction of data by an ETL (Extract, Transform, Load) tool for populating a data warehouse; data extraction steps in an EAI (Enterprise Application Integration) workflow engine; or definitions of business analytics in an Executive Information System (EIS), digital dashboard or enterprise portal. The common element among these applications is the requirement to execute a SQL statement for accessing the data.

Thus, in accordance with the invention, a data access application generation system implemented on a computer system that processes a source software application is provided. The system comprises a discovery module and an instantiation module. The discovery module interfaces with a source software application and handcrafted metadata and discovers metadata associated with the source software application configuration and generates, from the discovered metadata and the handcrafted metadata, one or more abstract metadata objects associated with the source software application and its configuration. The instantiation module receives the one or more abstract metadata objects from the discovery module and generates one or more concrete metadata objects corresponding to each abstract metadata object wherein the concrete metadata objects are associated with the particular source software application configuration.

In accordance with another aspect of the invention, a data access application generation method implemented on a computer system that processes a source software application is provided. The method comprises a discovery process and a instantiation process. The discovery process interfaces with a source software application and handcrafted metadata and discovers metadata associated with the source software application configuration and generates, from the discovered metadata and the handcrafted metadata, one or more abstract metadata objects associated with the source software application and its configuration. The instantiation process receives the one or more abstract metadata objects from the discovery module and generates one or more concrete metadata objects corresponding to each abstract metadata object wherein the concrete metadata objects are associated with the particular source software application configuration.

In accordance with yet another aspect of the invention, an upgrade protection system and method for a data access application generation system implemented on a computer system that processes a source software application to generate concrete metadata objects associated with a particular source software application configuration is provided. The upgrade protection system and method comprises a module that provides one or more abstract metadata objects associated with the source software application and its configuration and one or more concrete metadata objects corresponding to each abstract metadata object wherein the concrete metadata objects are associated with the particular source software application configuration. The system and method further comprises a module that, as the source software application is upgraded to a new source software application configuration, updates the concrete metadata objects associated with the particular source software application configuration so that the concrete metadata objects associated with the particular source software application configuration are compatible with the new source software application configuration.

BRIEF DESCRIPTION OF THE DRAWINGS

FIGS. 3A1 and 3A2 depict more details of the discovery process in accordance with the invention;

FIG. 5B1A-5B1E are diagrams illustrating an example of instantiation process in accordance with the invention;

FIG. 5B2 illustrates an example of the navigation mechanism in accordance with the invention;

Figure 8B:
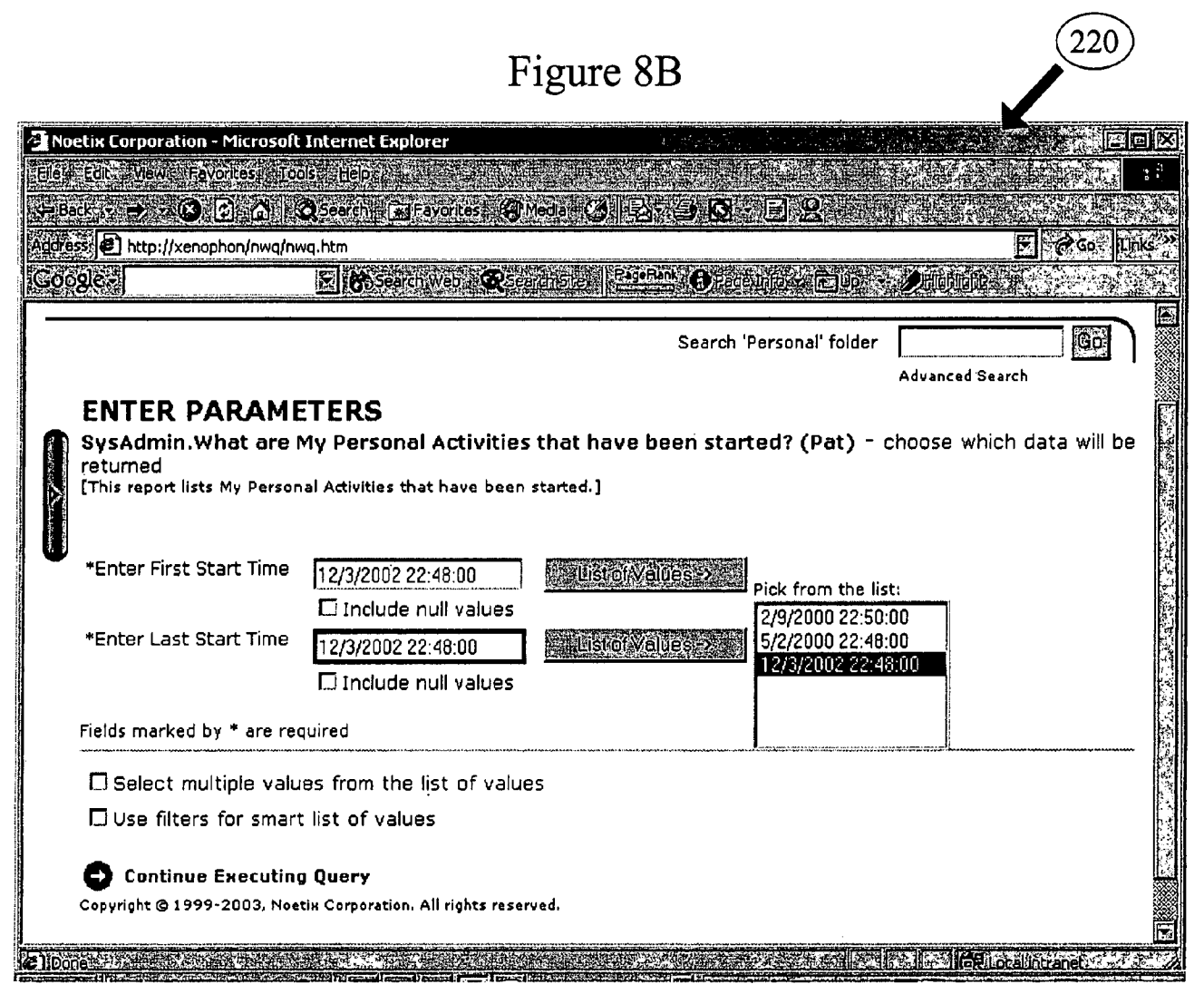

FIG. 8B is an example of a parameters screen of the data access application shown in FIG. 8A;

FIG. 11A-11D illustrate an example of an implementation of the upgrade protection method in accordance with the invention.

DETAILED DESCRIPTION OF A PREFERRED EMBODIMENT

Figure 1A:
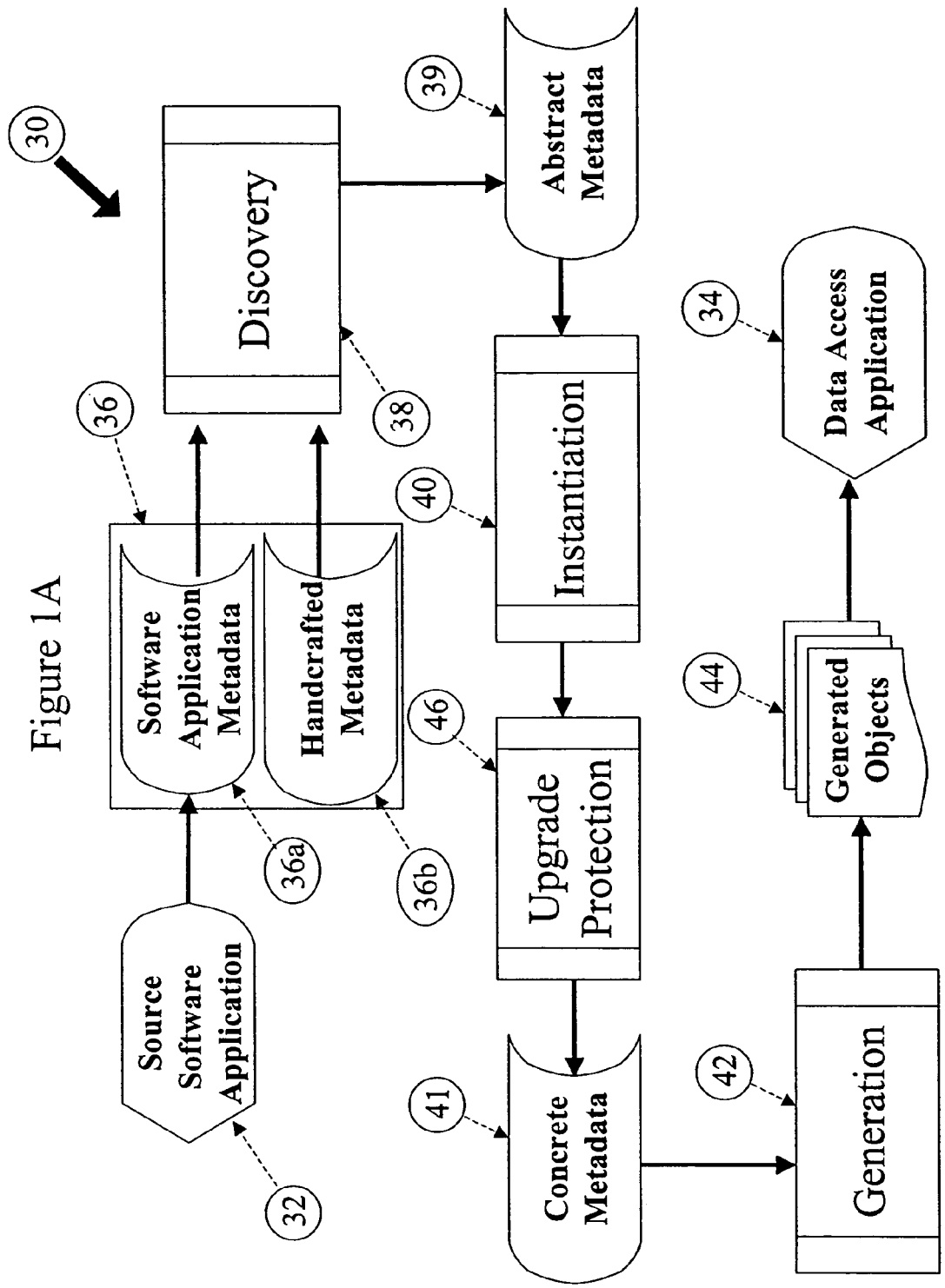
FIG. 1A depicts a computer implemented method for the generation of data access applications.

The invention is particularly applicable to a system and method for generating a data access application for an Oracle® or Siebel® based source software application using abstract and concrete metadata and it is in this context that the invention will be described. It will be appreciated, however, that the system and method in accordance with the invention has greater utility since it may be used with any source software application wherein the source software application can be any set of programs, data stores, procedures, and related documentation associated with a software system. The source software application provides user interfaces and often APIs (Application Programmatic Interfaces) for the creation and manipulation of application data. Usually there are user interfaces or programmatic interfaces for the setup and configuration of the application that results in the storage of application metadata that describes the application configuration and describes the application data. Programs in the software application may generate data or metadata through its own execution independent of user interaction. Source software applications create much of the metadata used by the processes and procedures of this invention. The data model that represents the storage of the metadata is separate from the data model that represents the storage of the data. This invention is primarily concerned with the repurposing and enhancing of the metadata stored in the metadata model. The metadata model is commonly referred to as a data dictionary, object library or metadata repository. Current examples of source software applications include ERP (Enterprise Resource Planning), CRM (Customer Relationship Management) and HRMS (Human Resources Management System) applications from vendors including, but not limited to Oracle®, Siebel® and PeopleSoft®.

This invention makes use of metadata. Metadata is a related discipline to data designed to deal critically with data. Metadata is a later, more highly organized, specialized form of data. In addition, one source software application's metadata can be another source software application's data. Furthermore, metadata itself can be described by metadata.

The source software applications provided by vendors, such as Oracle®, SAP®, Siebel® and PeopleSoft®, generally ship with numerous types of metadata. Some of this metadata may be more accurately described as application configuration data but for the purposes of this invention it will all be referred to generically as source software application metadata. During the setup, configuration and implementation of the source software application, additional metadata is created and modified. The metadata in the source software application may include, but is not limited to, table definitions, column definitions, descriptions of relationships between tables and columns, configuration of business concepts such as general ledger or inventory organizations; descriptions of user interfaces; security rules, users of the system, roles of users, data segmentation, business rules, formulas and calculations, derived data elements, menu definitions for application navigation; configuration of extensible features such as adding data elements and other specialized forms of data.

In one embodiment described below, the source software application metadata includes data model, setup, configuration and customization information from a leading ERP (Enterprise Resource Planning) application suite. In another embodiment described below, the discovered metadata represents online transaction processing (OLTP) user interface objects, such as screens and menus for a leading CRM (Customer Relationship Management) application suite. The interface objects are transformed into abstract metadata using the discovery process described below. In accordance with the invention, the abstract metadata definitions, either discovered or handcrafted, are transformed into concrete instances through the instantiation process described below using programmatic logic and pattern-matching algorithms. The concrete instances can be generated to many different formats depending on the consumer of the generated content using the generation process which is described below. Sample generators include Microsoft® Help File, HTML, XML or DDL for a database view. The generated metadata definitions may be a software application used by a human for information access but the definitions are often used as a foundation to build data access applications or for data sharing between software applications.

The system in accordance with the invention also provides upgrade protection. In particular, as the source software application metadata is modified, the links to that metadata are lost so that, for example, the views used to access the data in the source software application are no longer usable. In accordance with the invention, the upgrade protection process identifies the changes to the metadata when the data access application generation process is repeated (the discovery, instantiation and generation processes) after the initial installation. In particular, the handcrafted metadata, programmatic logic and pattern-match algorithms determine how to protect the metadata definition from change by transforming or obsolescing the definition while creating new metadata definitions for newly discovered functionality. The result of upgrade protection in accordance with the invention is that, frequently, no manual changes are required to the data access applications that use the generated objects as a foundation. The data access applications may include, for example, database views for adhoc query and development of operational reports; database views for extraction of data by an ETL (Extract, Transform, Load) tool for populating a data warehouse; data extraction steps in an EAI (Enterprise Application Integration) workflow engine; or definitions of business analytics in an Executive Information System (EIS), digital dashboard or enterprise portal. Now, the details of several embodiments of the system and method will be described in more detail.

FIG. 1A illustrates an overall data access application generation method 30 in accordance with the invention. Each of the steps and processes described briefly here will be described in much greater detail below. The method 30 begins with a source software application 32 (the scope of which is described above) and provides generation in that the data access applications 34 may be generated automatically in accordance with the invention from the source software application to provide access to the data in the source software application. In particular, software application metadata 36, including the software application metadata 36a and the handcrafted metadata 36b, (as described above) may be generated and automatically discovered. The software application metadata may further include software application metadata 36a which is automatically discovered and handcrafted metadata 36b which may be created by a human being. The source software application metadata is then fed into an discovery process 38. The output from the discovery process is a plurality of abstract metadata objects 39. The abstract metadata objects 39 are fed into an instantiation process 40 in which the abstract metadata objects are converted into concrete metadata objects 41 which are fed into a generation process 42 in which data objects are generated to produce generated objects 44. The generated objects are then used to generate the data access application(s) 34 for the particular source software application. In accordance with the invention, a variety of different data access applications (such as those described above) may be generated for a particular source software application. In accordance with the invention, the process may discover the metadata from a source software application and then generate the various data access applications automatically. Thus, a user of the system in accordance with the invention does not need to have extraordinary familiarity and knowledge of the particular source software application, its data structures, its data methodology, etc. . . . in order to generate the data access applications. The process may also include an upgrade protection process 46 which permits the process to automatically track changes to the source software application (such as version upgrades and new releases) and automatically re-generate the metadata objects (abstract and concrete metadata objects) so that the data access applications work with the upgraded source software application. Although FIG. 1A illustrates that the upgrade protection process 46 occurs after the instantiation process 40 before the concrete metadata 41 is generated, the upgrade protection process 46 actually occurs during and is preferably integrated into the discovery, instantiation and generation processes described above. The upgrade protection process will be described in more detail below.

More broadly, the process described above may be used to receive source metadata objects and create target metadata objects. In the example set forth above, the source metadata object is the abstract metadata and the target metadata object is the concrete metadata. However, the invention is broader than the example set forth above. In particular, the source metadata objects may include abstract metadata objects, concrete metadata objects and generated objects and the target metadata objects may include abstract metadata objects, concrete metadata objects and generated objects. Therefore, the process described above may receive any one or more of the types of source metadata objects and create any one or more of the types of target metadata objects. For example, the process may receive abstract metadata objects and create abstract metadata objects, the process may receive concrete metadata objects and create concrete metadata objects, the process may receive generated objects and create generated objects, the process may receive abstract metadata objects and create concrete metadata objects (as shown in the example in FIG. 1A), the process may receive concrete metadata objects and create generated objects and the process may receive abstract metadata objects and create generated objects. Now, several examples of the operation of the data access application generation process shown in FIG. 1A will be described.

Figure 1B:
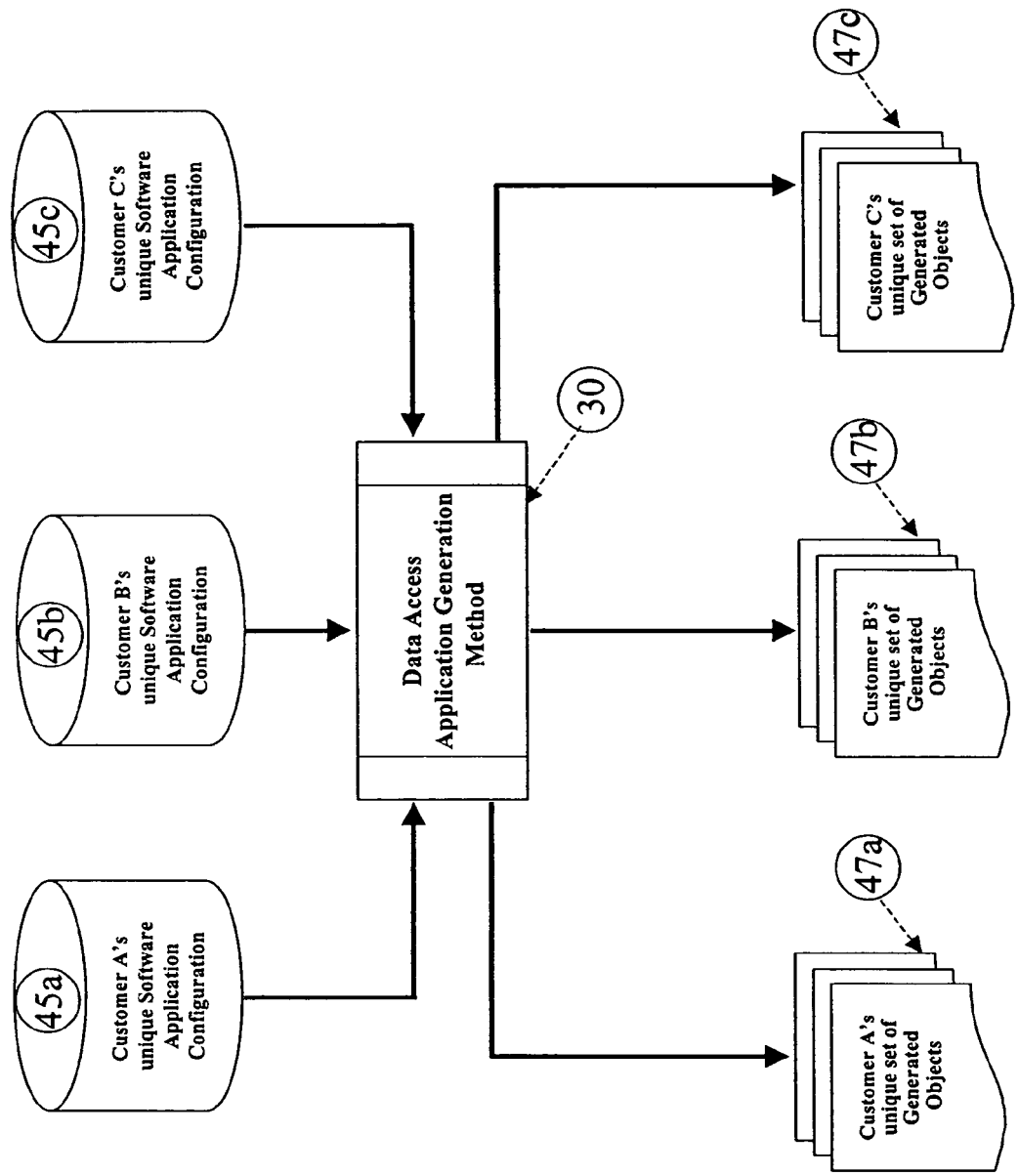
FIGS. 1B-1D are diagrams depicting the operation of the computer implemented method for the generation of data access applications.
Figure 1C:
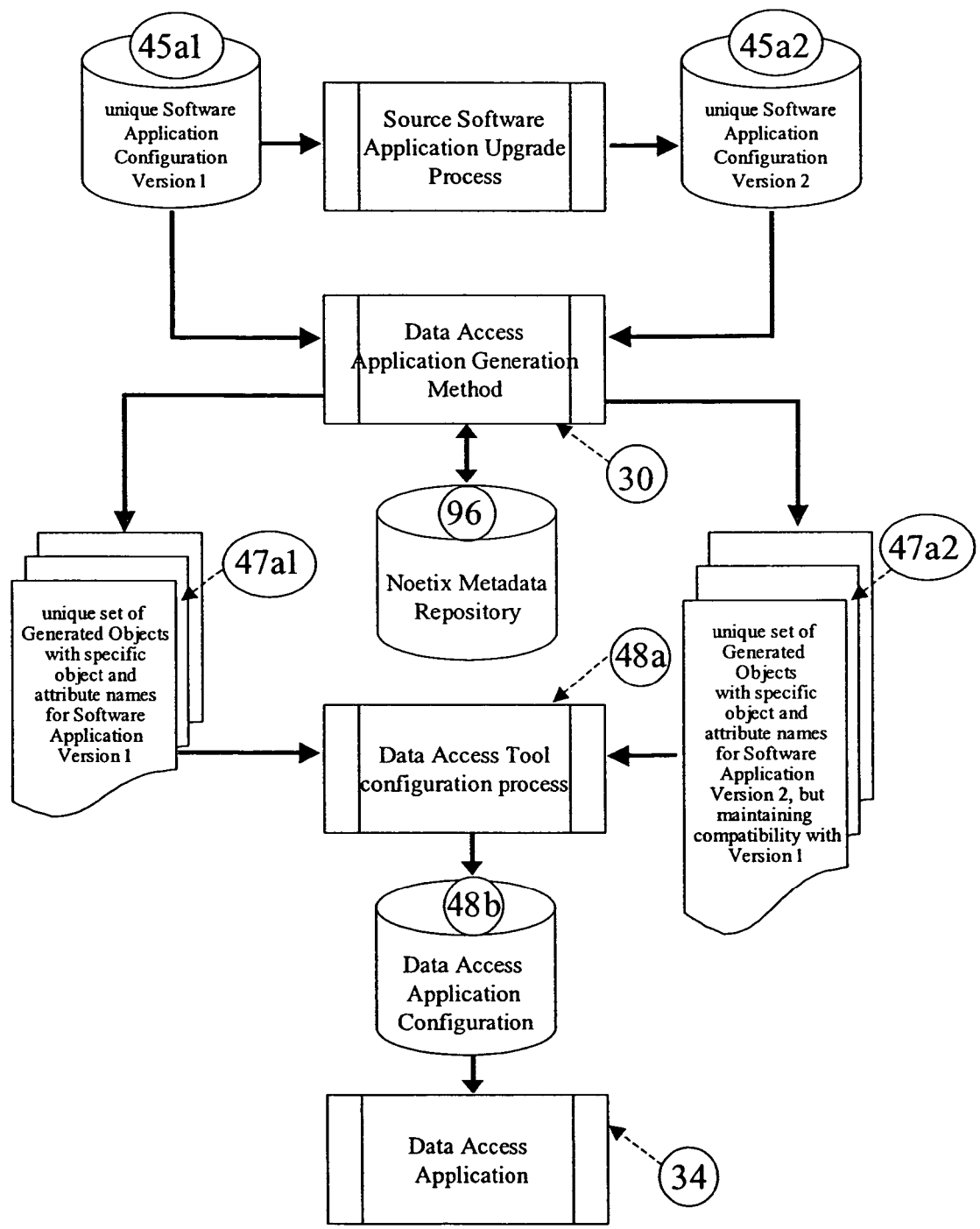
Figure 1D:
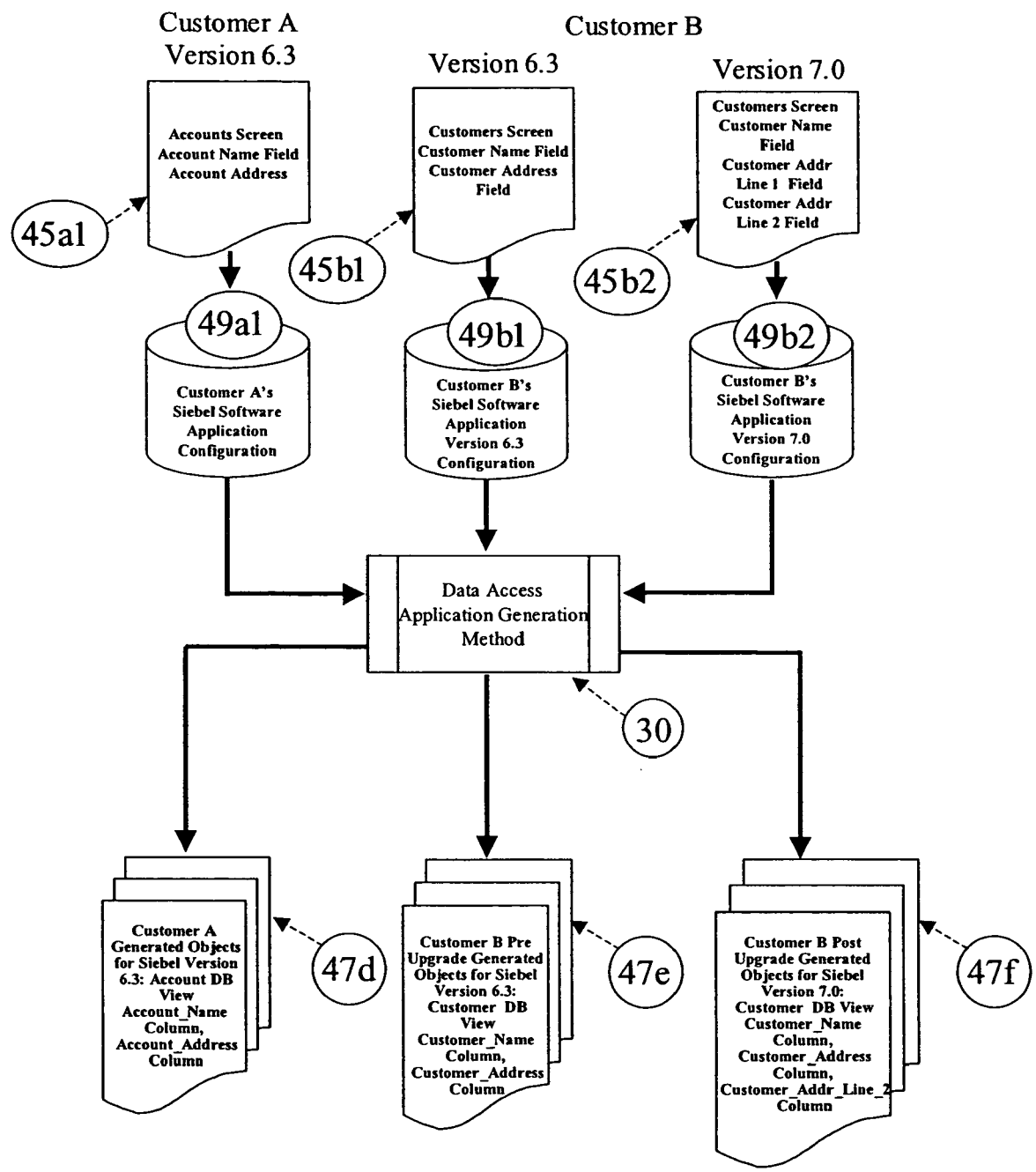

FIGS. 1B-1D are diagrams illustrating examples of the operation of the data access application generation process 30 of FIG. 1A. As shown in FIG. 1B, there may be a Customer A's unique software application configuration 45*a*, Customer B's unique software application configuration 45*b* and Customer C's unique software application configuration 45*c* wherein each customer may customize the software application for its particular operations and purpose. As shown, each of the these configurations are fed into the method 30. The method generates a plurality of unique sets of generated objects 47, such as Customer A's objects 47*a*, Customer B's objects 47*b* and Customer C's objects 47*c*, based on the unique customer configurations set forth above. These unique generated objects are used to generate the data access applications wherein the data access application are customized for each Customer based on the unique objects.

Another example of the operation of the method 30 is shown in FIG. 1C which illustrates the benefits of the upgrade protection process. In this example, a first version of a unique software application configuration 45*a*1 and a second version of the unique software application configuration 45*a*2 are shown. The second version of the configuration resulted from a software application upgrade process, such as a upgrade from a current version of an Oracle application to a newer version of the Oracle application. As described above briefly, the upgrade protection process shown in FIG. 1B ensures that the upgrade of the software application by the customer does not break/render useless the previously generated objects. FIG. 1B illustrates how the upgrade process is handled by the method shown in FIG. 1A. In particular, each version of the configuration of the software application is fed into the process 30 as shown. The process 30 stores discovered metadata and extracts metadata from an NMR 96 (described below in more detail with reference to FIG. 2C.) As shown, the process 30 may generate a unique set of objects 47 for each version of the source software application. In particular, each unique set of objects, 47*a*1 and 47*a*2, has specific object and attribute names associated with the particular version of the source software application. For the newer version of the objects, due to the upgrade protection that is described below in more detail, the generated objects have specific object and attribute names for the newer version, but also maintain compatibility with the older version so that the generated objects can still operate with the upgraded source software application. As shown, the unique set of generated objects from both versions are fed into a data access tool configuration process 48*a* which outputs data access application configuration data 48*b*. In more detail, the data access application for the older version of the generated objects are configured for and dependent upon a specific set of named objects with specific attribute names. The data access application, post upgrade, is configured to contain the new features from the newer version and to maintain the older version specific named objects and attributes. As a result of the data access application configuration, a data access application 34 is generated which operates is compatible with both version of the source software application so that the objects generated for the older source software application are still operable with the newer version of the source software application. In a typical system (without the upgrade protection in accordance with the invention), the pre-upgrade data access application configuration may contain metadata that is end user created that points to generated objects. If those same named objects and attributes do not exist post-upgrade, the objects are rendered useless and un-useable to the end user as a result of the upgrade.

FIG. 1D is a diagram illustrating another example of the operation of the method 30. In this example, there may be two customers, Customer A and Customer B, wherein Customer A has a version 6.3 of a source software application 45*a*1 wherein the version includes an Account Screen, an Account Name Field and an Account Address Field. Customer B has the same version (6.3) of the source software application 45*b*1, but has some customized screens and fields (represented in the source software application metadata) as compared to Customer A's configuration. In particular, Customer B has renamed some screen and fields with more meaningful names (such as replacing Account(s) with Customer(s)) as shown. Customer B has then upgraded to Version 7.0 of the source software application 45*b*2, but kept the same customizations and added another address field as shown. As a result, Customer A has a particular software application configuration 49*a*1, the older version of the software application of Customer B has its own configuration 49*b*1 and the upgraded version of the Customer B's software application has its own configuration 49*b*2. These different configurations are fed into the method 30 (as the abstracted metadata discovered during the discovery process.) As a result of the process 30, unique sets of generated objects 47d, 47e, 47f are generated wherein each unique set of generated objects for each customer specific source software application configuration is generated during the process even if the uniqueness is due to enhancements (represented by changes to the application configuration metadata) introduced by upgrades to the source software application. Now, a computer-based implementation of the above described process will be described.

Figure 2A:
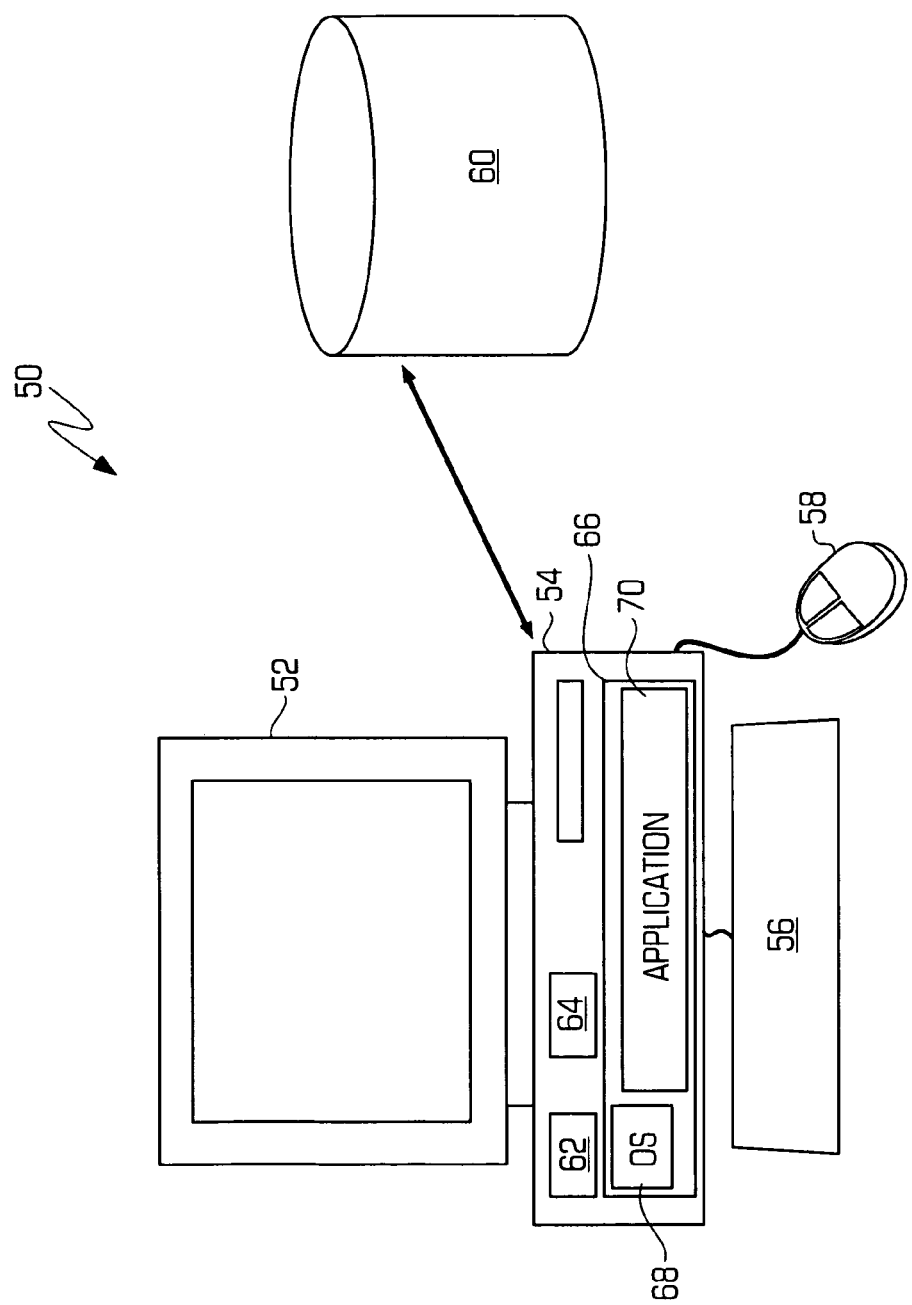
FIG. 2A illustrates an example of a computer system that may be used to implement the data access application generation process in accordance with the invention.

FIG. 2A is a diagram of an example of a computer implemented system 50 that may be used to implement the data access application generation process in accordance with the invention. In accordance with the invention, the data access generation process may be implemented of a variety of different computer-based systems, such as personal computer systems, client-server systems, mini-computers systems, internet (intranet, extranet, etc.) systems, browser based systems, peer-to-peer systems, collaborative systems, distributed computer systems, mainframe systems, PDAs, wireless computer systems, grid computing systems, etc. The computer system 50 shown in FIG. 2A is a stand-alone computer system which may implement any or all of the inputs, outputs or processes defined in FIG. 1A referred to wholly as the data access application generation process. The computer system may include a display unit 52, such as a cathode ray tube or liquid crystal display screen, which permits the user to visually perceive the generation process and its results. The computer system further may include a chassis 54 and one or more input/output devices, such as a keyboard 56 and a mouse 58 as shown wherein the input/output device permit the user to interact with the computer system (such as entering data into the system, configuring the system, printing out results from the computer system, etc . . . ) The computer system may include a database system 60, such as an Oracle or Siebel database system. The database system may store various information which is typically accessible using a source software application The chassis of the computer system may include one or more processor(s) 62 which control the operation of the computer system as is well known, a persistent storage device 64, such as a hard disk drive, optical tape drive. optical drive, etc. which permanently stores data of the computer system and a memory 66, such as SRAM or DRAM, which temporarily stores data being executed by the processor 62 and loses its data when power is not supplied to the computer system. The computer system may include an operating system 68, such as Microsoft Windows, which is executed by the processor 62 to control the operation of the system as is well known and a data access application generation system 70 in accordance with the invention. In a preferred embodiment of the invention, the data access application generation system may be implemented as a software application being executed by the computer system and the processor. The data access application generation system may include one or more software modules which operate in combination to achieve the steps and processes of the data access application generation process. For example, the data access application generation system may include a discovery module, an instantiation module, a generator module and an upgrade protection module described below in more detail. Each of the modules in the data access application generation system may comprise a plurality of lines of computer code (written in any well known programming language (which cause the computer system to implement the data access application generation process. In a preferred embodiment, the computer code may be written in C++ or C# for the overall code, Transact SQL, PL/SQL, SQL for the processing language which is the language of the metadata source, korn shell scripting for some of the scripts used in the modules, HTML, XML, HDML for web queries, RTF for help files and XSLT for script files. Now, an example of the actual implementation of the data access application generation system in accordance with the invention will be described.

Figure 2B:
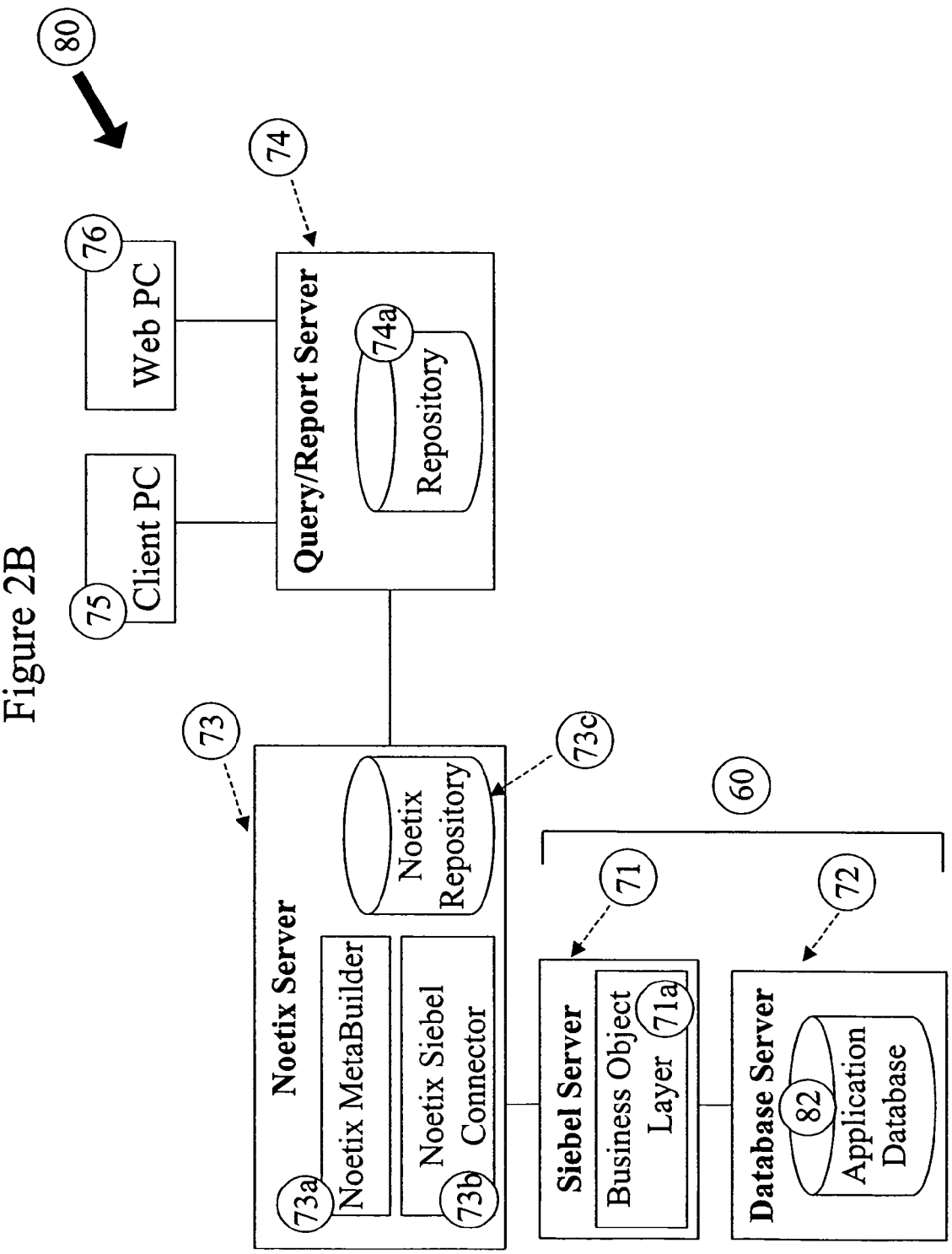
FIG. 2B illustrates an example of the actual implementation of computer-implemented data access application generation system.

FIG. 2B illustrates an example of an implementation of a data access application generation system 80 that includes the database system 60. In this implementation, the database system 60 may be a Siebel database system which includes a Siebel server 71 and a database server 72. The Siebel server 71 may be a typical server system and may include a business object layer 71a as is well known and the database server 72 may include an application database 82 which includes the data stored in the database system. The data access application generation system may further include a server 73, a query/report server 74, a client PC 75 and a web PC 76. The servers described herein are well known server computer systems and the PCs are typical personal computer systems. The client PC may permit a user of the system to access the server 73 and the database system 60 as is well known such as over a computer network. The web PC 76 may permit a user to remotely access the server 73 and database system 60 from the internet.

The server 73 may perform many of the essential operations and functions of the data access application generation system and may include a metabuilder module 73a, a Siebel® connector module 73b and a repository 73c. The metabuilder module generates metadata based on the metadata contained in the database system 60 and the connector 73b connects the data access application generation system server 73 to the database system 60 and permits the two systems to communicate with each other for the purpose of transferring data and metadata. The repository 73c stores some of the code and all of the metadata associated with the data access application generation system including the metadata generated by the system as described in more detail below. As shown, the query/report server 74 may include a repository 74a which stores the queries and reports generated by the data access application system. Now, another implementation of the data access application generation system will be described.

Figure 2C:
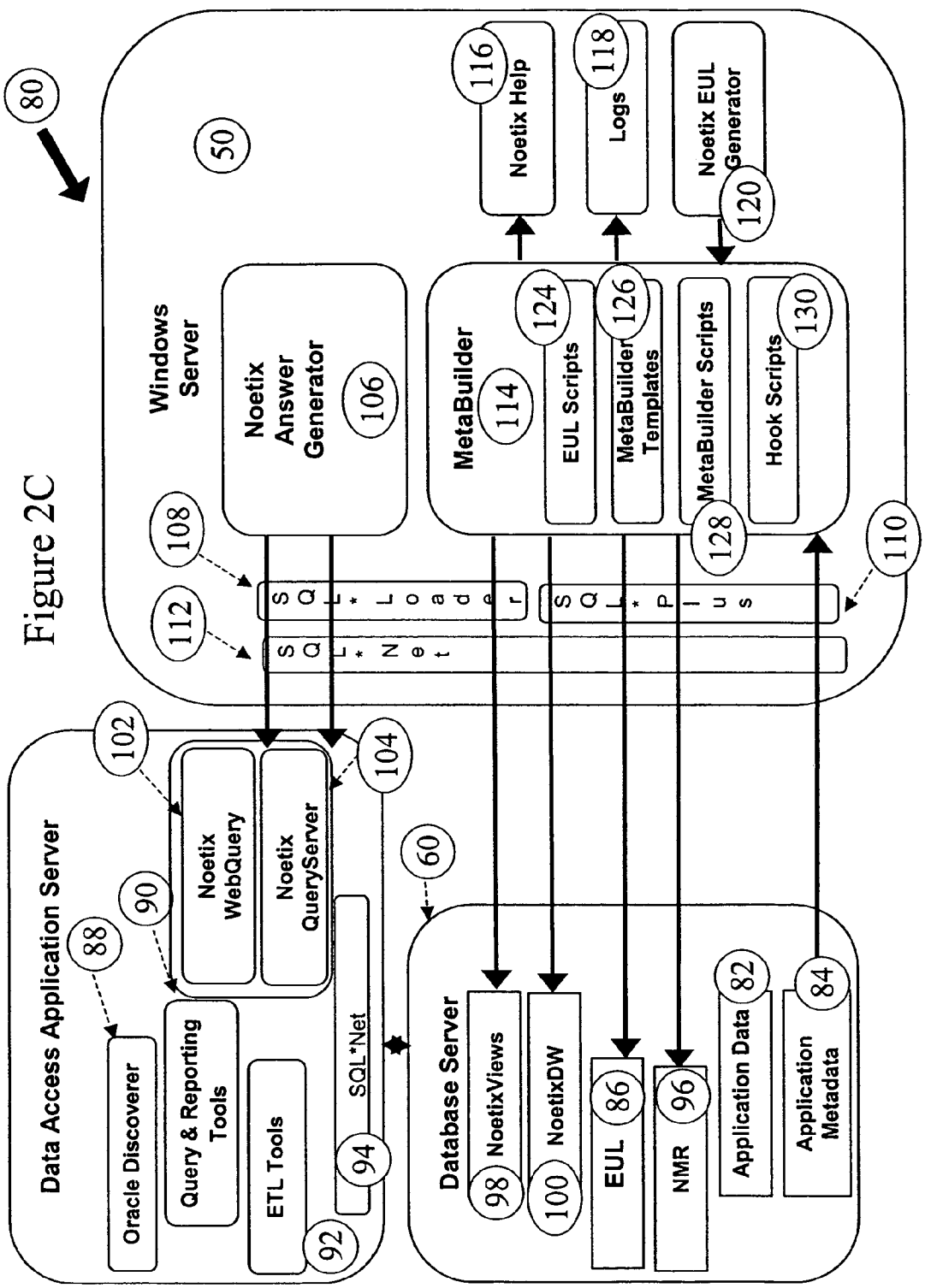
FIG. 2C illustrates an example of another implementation of the computer-implemented data access application generation system in accordance with the invention.

FIG. 2C illustrates another example of an implementation of a data access application generation system 80 that includes the database system 60 and the computer system 50. In this implementation, the database system 60 may be an Oracle® database system and may further include application data 82, application metadata 84, End user layer (EUL) 86, Oracle® Discoverer 88, query and reporting tools 90, Extract, Transform, Load tools (ETL) 92 and SQL*Net 94 as shown. The database system 60 further comprises a Noetix® Metadata Repository (NMR) 96, a Noetix Views module 98 and a NoetixDW module 100 which may be part of the data access application generation system. The NoetixDW module automatically maps data locations from the database system and generates unique metadata that systematically designs and creates an extraction schema for an ETL tool or equivalent to use the mappings for extracting data from the application system to a data warehouse system. The Noetix Views module generates one or more data access views for the database system using the data access application generation process. The data access application generation system 80 may further include a WebQuery tool 102 which permits the information from the database system to be delivered securely over the Web to a user and a QueryServer 104 which provides a mechanism for delivering the query definition (mapping) and connection information to the requesting application such as the WebQuery tool 102. The data access application generation system 80 further comprises one or more modules that reside on the computer system 50 including an Noetix® Answer Generator module 106 that generates information that is provided to the WebQuery tool 102 and QueryServer tool 104 as shown and performs the generation process of the data access application generation process in accordance with the invention. The communication between the computer system and the database system may occur through the well known SQL* Loader, SQL* Plus and SQL*Net modules 108-112 as shown. The data access application generation system 80 further comprise a Noetix® MetaBuilder module 114 that performs the discovery and instantiation processes, a Noetix® help module 116 which provides help to the user and is another implementation of the generation process of the data access application generation system, a logs module 118 that generates and stores logs for the system and a Noetix EUL Generator module 120 that generates the end user layer of the system.

The MetaBuilder module 114 may further comprise EUL scripts 124 that define how to populate the Oracle EUL (End User Layer) resulting in a data access application implemented in the Oracle Discoverer query tool, Handcrafted Metadata 126 that are the manually created abstract metadata objects that represent the views and answers, MetaBuilder scripts 128 that contain the execution logic for the data access application generation system and hook scripts 130 that allow customers to modify the execution of the system or modify the concrete metadata or the abstract metadata. Generally, the MetaBuilder module accesses the database system 60 in order to discover the metadata associated with the database system so that the data access applications in accordance with the invention may be generated. The MetaBuilder module also includes the upgrade protection module (not shown). Now, each process and module of the data access application generation process, including the discovery module, the instantiation module, the generation module and the upgrade protection module, will be described in more detail.

Figure 3:
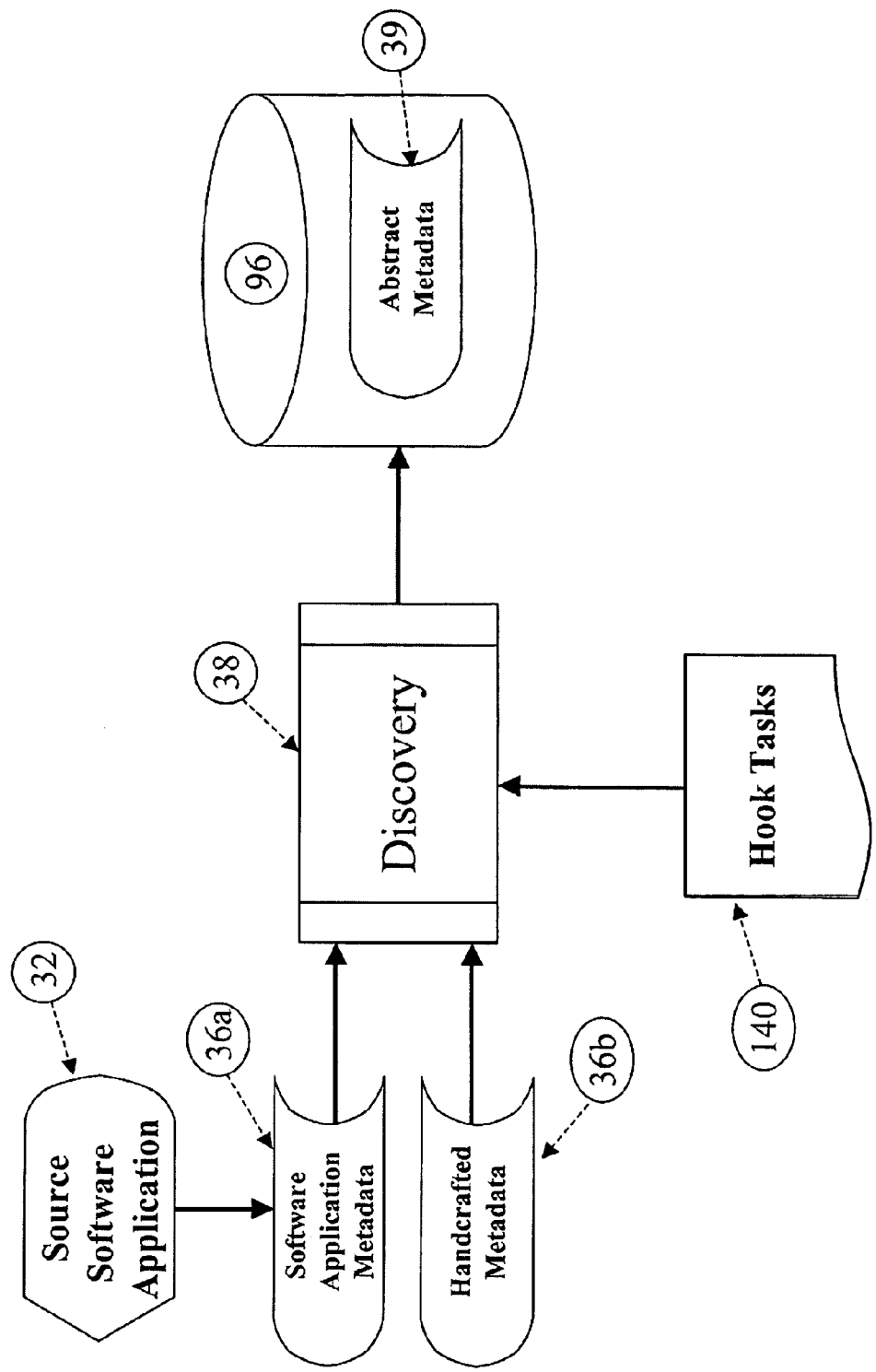
FIG. 3 depicts the discovery process in accordance with the invention.

FIG. 3 depicts the discovery process 38 in accordance with the invention. The discovery process is a process that consists of discovering, analyzing, generalizing, and summarizing information from the software application metadata 36a which is associated with the source software application 32. In more detail, the discovery process identifies all of the source software application metadata and the handcrafted metadata and stores it in the Noetix® Metadata Repository (NMR) 96 as abstract metadata 39. In a preferred embodiment, the NMR consists of two distinct areas referred to as the abstract metadata tables and the concrete metadata tables of a relational database. In accordance with the invention, the NMR also may store the metadata in any other storage mechanism, such as in memory, in an XML data structure, on a disk, such as an optical disk or a magnetic disk, in a memory cache, etc. The Abstract Metadata 39 is loaded into the abstract metadata tables so that the abstract metadata 39 is organized and prepared for the instantiation process which follows. Thus, the output of the discovery process is a collection of abstract metadata 39 that describes the content and structure of the software application metadata 36a in general terms.

In more detail, the discovery process may be performed automatically (i.e., programmatically) to generate the software application metadata 36a and/or manually (i.e., by humans following a process of analysis, design, documentation, and metadata creation) to generate handcrafted metadata 36b. When performed automatically, the discovery process consists of programmatically inspecting the software application metadata, detecting information that includes, but is not limited to, its contents, relationships between its elements, data access rules and restrictions, and business rules and constraints. When performed manually, the discovery process consists of manually inspecting the data structures, interfaces, technical documentation, and program code of the source software application and its metadata, discovering information that includes, but is not limited to, its contents, relationships between its elements, data access rules and restrictions, and business rules and constraints. Once that information has been discovered, the discovery process concludes by generalizing the information and creating a collection of abstract metadata objects. These objects are stored in the Noetix® Metadata Repository (NMR) 96. Now, the discovery process will be described in more detail.

FIGS. 3A1 and 3A2 are a flowchart illustrating further details of the discovery process 38. In particular, the discovery process may include the steps 141a-141l as shown. The discovery steps set forth below preferably may be carried out by a software-based crawler (that has one or more pieces of code to discover the desired metadata) which navigates through the source software application metadata in order to discover the relevant metadata. In step 141a, the discovery process detects the business functions that the source software application is configured to perform (including software modules installed and configured for use in the source software application.) For example, the General Ledger, Accounts Payables, Accounts Receivables, etc . . . applications are identified and then are abstracted to a list of application templates in the language of the source software application, such as Oracle. In step 141b, the discovery process detects the Business Entities for which the source software application has been configured. For example, a particular source software application may be configured to provide functionality to Headquarters, US East Coast Sales Office, US West Coast Sales Office, Dallas Tex. Warehouse, European Distribution Center, etc . . . This information is combined with the information detected in step 141a. In step 141c, the discovery process detects the relationship between the source software application configuration for a particular business function and a particular Business Entity, and abstracts this information into metadata that defines a grouping of abstract Generated objects. For example, for a particular source software application, Headquarters uses General Ledger, Accounts Payables and Accounts Receivables; US East Coast Sales Office uses Order Entry and Inventory; European Distribution Center uses Inventory, and Accounts Payables. This relationship information is abstracted into information detected in steps 141a and 141b above.

In step 141d, the discovery process detects the source software application metadata that logically groups information together into a topic wherein the topic is a grouping which within the source software application has the purpose of providing a functional building block. For example, a group of data elements to base an application screen upon or base an application technical interface upon may be a topic. In accordance with the invention, these topics are abstracted into abstract (candidate) reporting object metadata. For example, an AP Invoice, a Supplier, a Customer, an Order, etc. . . . is abstracted to a list of reporting object templates. In step 141e, the discovery process detects source application metadata that specifies the technical source (physical database table in the preferred embodiment) of information related to a logical grouping or topic and abstracts this information into Reporting Object tables. For example, AP Invoices are stored in the database table, AP_INVOICES, Customers are stored in the Business Object Accounts is abstracted to a list of reporting object query (at least one, optionally more) and table templates (at least one, optionally more). In step 141f, the discovery process detects the source software application metadata that specifies the specific information attributes associated with a logical group of information and abstracts this to Reporting Object attributes (or view columns). For example, the Customers topic includes the customer name, the customer address, a primary contact name, a phone number, a web site address, etc . . . The information detected in this step also includes the technical information required to access an attribute at the source software application database or API level. The information detected in this step also includes abstracting attribute descriptive information into column descriptions. The information detected in this step also includes abstracting information that describes the internal database indexing information into search by and join to metadata. The information detected in this step also includes abstracting information that describes customer defined fields (Extension columns) within the source application into reporting object column abstract metadata. In an Oracle type application, the standard fields are generated as handcrafted metadata while the custom fields are automatically discovered with the assistance of handcrafted metadata whereas all of the fields in a Seibel type application are automatically discovered.

In step 141g, the discovery process detects source software application metadata that specifies horizontal partitioning of a topic, which is abstracted into Reporting Object SQL WHERE clauses. For example, the Customers topic is further divided into existing customers and prospective customers. This also includes the technical information required to define a topic at the source application database or API level. This information is abstracted to reporting object SQL WHERE templates. In step 141h, an optional step may occur. In particular, the discovery process may optionally detect the source software application configuration profile options that might alter any of the handcrafted metadata in specific situations. The information discovered also includes the technical information required to test a configuration option at the source application database or API level. This information is abstracted to profile option templates. In step 141i, the discovery process detects the source software application end user security information (includes username, user source application responsibilities (e.g. Account Payables Manager, East Coast Sales Manager, System Administrator, etc . . . ), horizontal partitioning assignments (for example, end user cost center access rights, a list of business entities, a list of organization positions) that is abstracted to query users, and a list of roles (groups of Generated objects) to which the query user will have access. This information is abstracted to query user templates, query user role templates, role object templates (relationship between reporting object templates and query user roles (responsibilities).

In step 141j, the discovery process detects the source software application metadata used to categorize information (possibly transactions or other entities, e.g. for customers it might capture a list of customer types, along with a description of each customer type) that is abstracted into metadata describing lists of values (dimensions). The discovered information includes technical so as to recreate a SQL SELECT statement that returns list of values (Code and Description) and end user level details to resolve cryptic codes into "Business Terminology"/"Meaningful Descriptions." In step 141k, the discovery process detects source application metadata that relates topics together (such as source application menu structures, keywords to index the topics by) and the metadata is abstracted to see alsos, and help keywords. In step 141l, the discovery process optimizes the discovery process by utilizing handcrafted metadata and discovered metadata to minimize the amount of discovered metadata to a highly relevant set. In other words, rather than just capture all metadata, look to see what metadata is needed, and as you are performing the discovery process, use that information to further reduce what needs to be discovered later to only that which is necessary for later steps.

In accordance with the invention, the process of discovery can be modified for each unique implementation by using a mechanism referred to as Hook Tasks 140 or Hook Scripts. These hooks exist throughout the process to change or enhance the behavior of the system. To better illustrate, an example will be provided. A customer decides to suppress generated objects related to a specific source application module, and writes a computer program that is named a certain way (to indicate its effect on the overall process) and manipulates information to conform to specific data integrity constraints (specific to the data available at that point in the process), that has the purpose of inactivating abstract or concrete metadata associated with that specific source application module. Another example is that a customer decides to impose a specific horizontal partitioning scheme that is not consistent with source application metadata but is consistent with modifications (or customizations) the customer has made to the source application computer code. Since information about the specifics of the customers requirements are not available in source application data or metadata, the process will abstract certain information that must be modified to conform to customer requirements with similar modifications (or customizations) using hook scripts. In this particular example the customer would create a computer program with a specific name (consistent with standard naming conventions defined by the system to correspond to a particular point within the discovery process), and modify the abstracted metadata in a specific way that implements the customers requirements to achieve the desired horizontal partitioning scheme, which will later be used to create potentially one or more generated objects, each built upon the customer modified template reporting object.

In one embodiment (an implementation of the system for Seibel) the following information is discovered or manually created so that the abstract metadata in accordance with the invention may be generated:

1. Components of the metadata object including view, queries, tables (FROM), columns (SELECT), clauses (WHERE) and grouping are gathered.

2. "Search by" or index information is gathered. In particular, the Crawler gathers and creates abstract metadata describing indexed columns.

3. Relationships between metadata objects is identified. In particular, the Crawler gathers key information and creates abstract metadata describing it.

4. Associations between metadata objects are identified referred to as See Also.

5. Horizontal and vertical partitioning information is captured.

6. Cross-operational business structure and business rules are defined.

7. Keywords to enable easier searching and browsing of the metadata objects are assigned.

8. Essays describing the purpose, usefulness, granularity, complexity and capabilities of the abstract objects are loaded or created.

9. A variety of Security information is identified including users and roles.

10. Profile Options are applied to determine actions the process should implement on the metadata objects. This is an abstraction, Profile Options primarily inhibit handcrafted metadata. The detection phase of the discovery process for processing Profile Options is to resolve their status, the Instantiation Phase is to apply them based on their status to inhibit inappropriate metadata for the unique configuration of the source software application at the organization where the system is being implemented.

11. Short Descriptions are defined to describe the metadata object.

12. Lists of Values and Lookups are discovered to resolve cryptic codes into business terminology and meaningful descriptions or values.

13. Business Information Hierarchies are determined to help organize and structure the data in a manner that is familiar for business users and provides context for users of the source software application.

14. User interface organization and presentation metadata is gathered and applied appropriately to build metadata objects that provide context and terminology that would be familiar for a business user.

15. The user of the system has the ability to alter the execution and results of the process. One way this is accomplished is through a mechanism referred to as a "hook script". This mechanism allows manipulation of the steps defined above as well as the ability to modify the concrete or abstract metadata objects.

16. During the process a consolidation of common metadata occurs creating centralized, reusable metadata objects that other metadata objects may reference in their definition. This creates a layering and reuse of metadata objects. Query Objects, Template Base Views and UI Layer referring to an IT Layer are some examples of this reuse and layering.

To better understand this discovery process and the other processes of the data access application generation system, an example will be provided in which each process/step of the data access application generation process is illustrated. This example begins with a source software application. The end result of the data access application generation process is a generated data access application that provides business users with the ability to perform ad-hoc queries and author reports in the same terminology and context of the source software application. IT developers can also use the generated objects to meet other reporting and data extraction needs. The generated objects include NoetixViews for Siebel and AnswerPoint for Siebel running through the Noetix Enterprise Technology Suite (NETS).

Figure 3B:
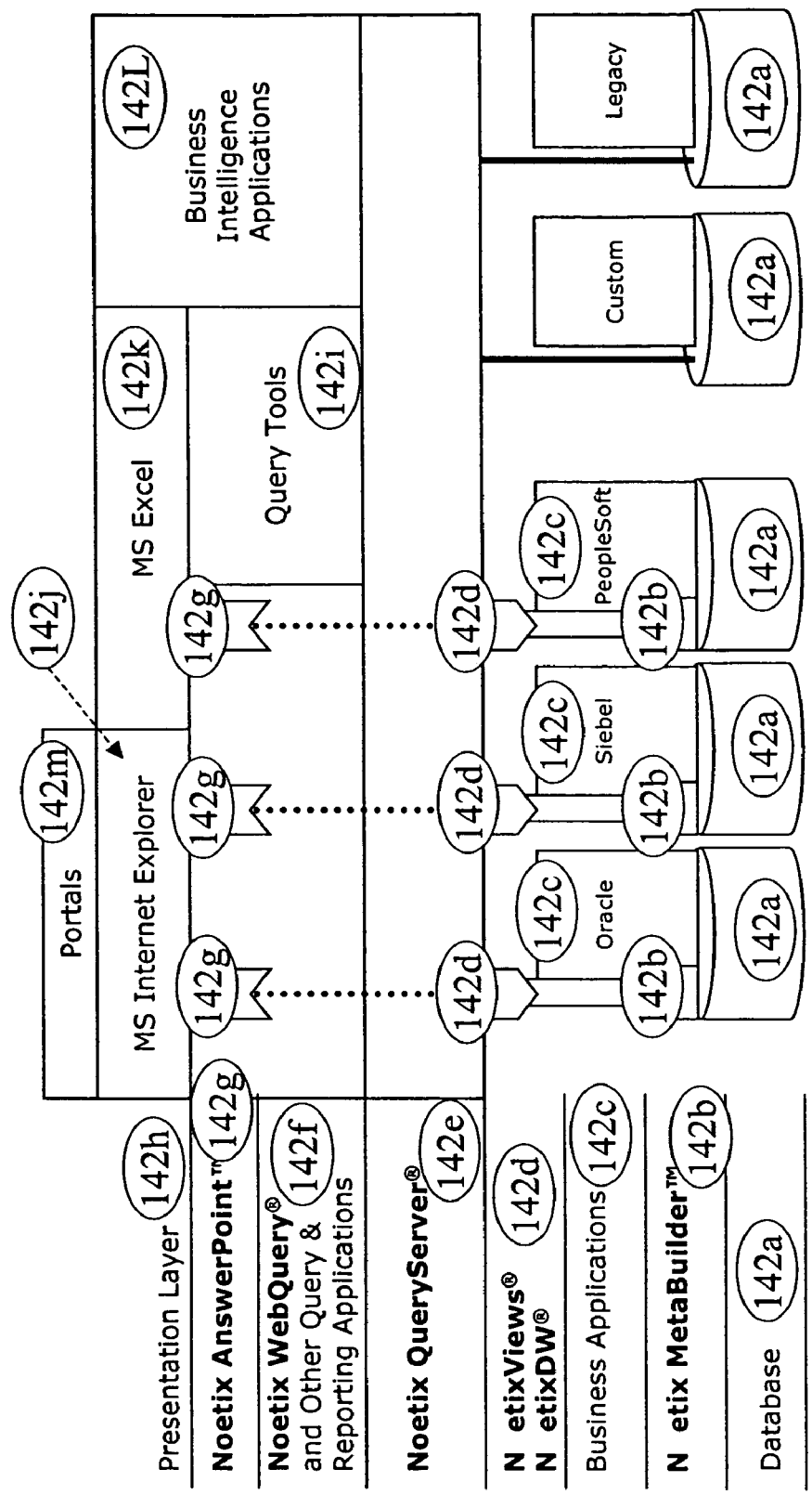
FIG. 3B is a diagram illustrating an example of the implementation of the data access application generation system.

FIG. 3B is a diagram illustrating an example of a NETS system 142 that may implement the data access application generation system in accordance with the invention. The components shown here correspond to the process steps and element shown in FIG. 1A and those relationships will be described here. The NETS system 142 may include a database 142a which contains the source software application 32 data repository which is typically an Oracle or Microsoft® SQL® server database. The NETS system further comprises a MetaBuilder module 142b which is the Noetix® software component that performs the Discovery 38, Instantiation 40, Upgrade Protection 46 and Generation 42 processes shown in FIG. 1A. The NETS system further comprises business applications 142c which are source software applications 32, such as Oracle®, Siebel®, Peoplesoft®, custom developed and legacy applications. The NETS system further comprises a NoetixViews module and a NoetixDW module 142d wherein the NoetixViews module is a set of generated objects 44 that comprise the data access application 34 providing a foundation schema for writing adhoc queries and reports. This content is utilized by the Noetix QueryServer tool. The NoetixDW module is a set of generated objects 44 that comprise the data access application 34 providing a foundation schema for writing data extraction queries in an ETL (Extract, Transform, Load) tool for populating a data warehouse or data mart.

The NETS system 142 further comprises a Noetix® QueryServer module 142e which is a software component of the data access application 34 that is populated with content by the generation process 42 that accepts requests in the form of SQL queries and returns the proper SQL syntax along with data location and connection information for a requesting query tool to retrieve the source software application data. The NETS system further comprises a Noetix® WebQuery module 142f which is a software component of the data access application 34 that is populated with content by the generation process 42 that provides a browser based user interface for interacting with the adhoc queries and data results. The system further comprises a Noetix® AnswerPoint module 142g which is a set of generated objects 44 that comprise the data access application 34 providing a set of adhoc queries and reports referred to as "Answers". This content is utilized by the Noetix® WebQuery tool. The system further comprises a presentation layer 142h which is the layer in the technology stack that provides the user interface or presentation to the end users of the generated objects and allows interaction with those objects and the data that the objects return. The system further comprises query tools 142i that are tools other than Noetix® WebQuery that provide an ability to access NoetixViews and write queries or reports such as Oracle® Discoverer or Cognos® Impromptu. The system also has an MS Internet Explorer element 142j which is a software component of the presentation layer implying a browser based presentation tool. The system also has an MS Excel module 142k which provides an alternate user interface for interacting with the data. The system also has business intelligence applications 142l that are other business intelligence applications that can interact with Noetix® QueryServer to return data such as analytics or data warehousing applications. Finally, the system also has a portal 142m which is another example of a presentation solution for accessing information within a browser.

Figure 4:
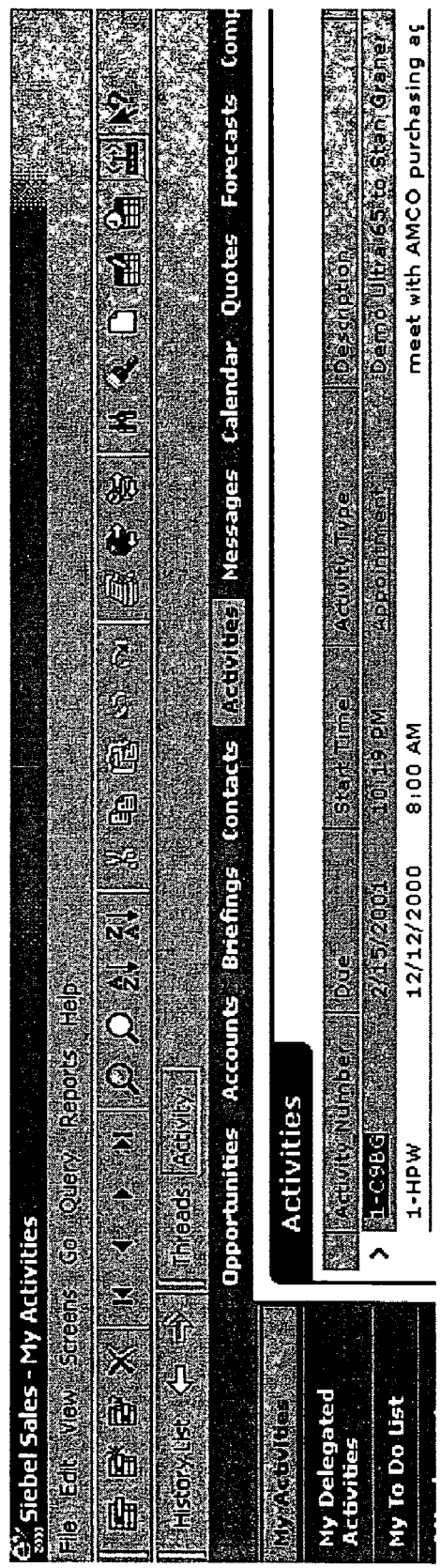
FIG. 4 illustrates an example of a source software application from which data access applications may be generated in accordance with the invention.

Returning to the example above, the source software application is Siebel® eBusiness Applications and in particular it is a well known Online Transaction Processing (OLTP) System. For clarity and simplicity of illustration, a subset of columns in one screen within the application will be used as the example. The screen name in this example is Activities (as shown in FIG. 4) and can be accessed by pressing the Activities screen tab from the main Siebel® user interface. The architecture of the Siebel® system which generates this screen is shown in FIG. 2B. The key point to recognize is that the Siebel application and the programmatic interface to Siebel® is not through SQL or the relational database. The Siebel® application is based on an object model and the programmatic interface is COM. Eventually Siebel® data is stored in a relational database but this example executes through the COM layer referred to as the business object layer 71*a* shown in FIG. 2B. Therefore many layers and translations exist in this example. In this example, only a single screen in the source software application and a small amount of metadata associated with the single screen of the source software application will be described. It should be understood however that the data access application generation system in accordance with the invention may be used with the entire source software application and with any metadata contained in the source software application.

As is typical, the source software application consists of numerous types of metadata. For purposes of this illustration, this example will focus on the following software application metadata:

Screen: Activities Screen

View: Activities List View

Applet: Activity List Applet With Navigation

Business Component Action

Business Object Action

Columns of Interest: Activity Number, Due, Start Time, Activity Type

These types of Metadata are shown and described below with reference to FIG. 7.

Controls in an Applet

The "Activity List Applet With Navigation" applet has the following display names and field names stored as metadata. A field from the business component displayed on a screen through the applet is referred to as a Control.

In this example, the end users will want the terminology in the Display Name that they see on the application screen to appear in the final generated data access application.

| DISPLAY NAME | FIELD (BUSINESS COMPONENT) |
|---|---|
| Activity Number | Id |
| Due | Start Date |
| Start Time | Start Time |
| Activity Type | Type |

Fields in a Business Component

The Action Business Component is associated with the S_EVT_ACT database table and contains the metadata for the Field Names of the Business Component and Columns for the table(s) in the Business Component.

| FIELD NAME | COLUMN |
|---|---|
| Id | ID |
| Start Date | APPT_START_DT |
| Start Time | APPT_START_TM |
| Type | TODO_CD |

The relational database data dictionary is checked to assure the S_EVT_ACT Table exists and that all the Columns identified exist.

| COLUMN |
|---|
| ID |
| APPT_START_DT |
| APPT_START_TM |
| TODO_CD |

The metadata defining the users of the application, the security access those users possess and the navigation information required to find the object is identified.

The handcrafted metadata is a sample "Answer" which is basically a query template definition of a report. The Answer handcrafted metadata includes the question, match string, answer description, report title, report sub-title, columns and parameters for the report. Meta-tags exist throughout the handcrafted metadata that are modified or replaced with values from the abstract metadata during instantiation.

Therefore, as a result of the discovery process described above, the following abstract metadata is generated so that, as requested by the user in this example, the end users will want the terminology in the Display Name that they see on the application screen to appear in the final generated data access application. The abstract metadata identified by the data access application generation system in this example is:

Question: What are <SECURITYCODE/> <TABLEALIAS TABLENAME="Action"/> that have been started?

Match String: Action

Answer Description: This report lists <SECURITYCODE/> <TABLEALIAS TABLENAME="Action"/> that have been started.

Report Title: <TABLEALIAS TABLENAME="Action"/> by Person

Report Sub-Title: Selected by <COLUMNNAME COLUMNMATCHSTRING="Action". "Starte Date"/>@p1 Through @p2

| Columns: |
|---|
| "Action"."ID" |
| "Action"."Start Date" |
| "Action"."Start Time" |
| "Action"."Type" |

Parameter Prompts:

Enter First <COLUMNNAME COLUMNWATCHSTRING="Action"."Start Date"/>

Enter Last <COLUMNNAME COLUMNMATCHSTRING="Action"."Start Date"/>

Now, the instantiation process in accordance with the invention will be described in more detail.

Figure 5A:
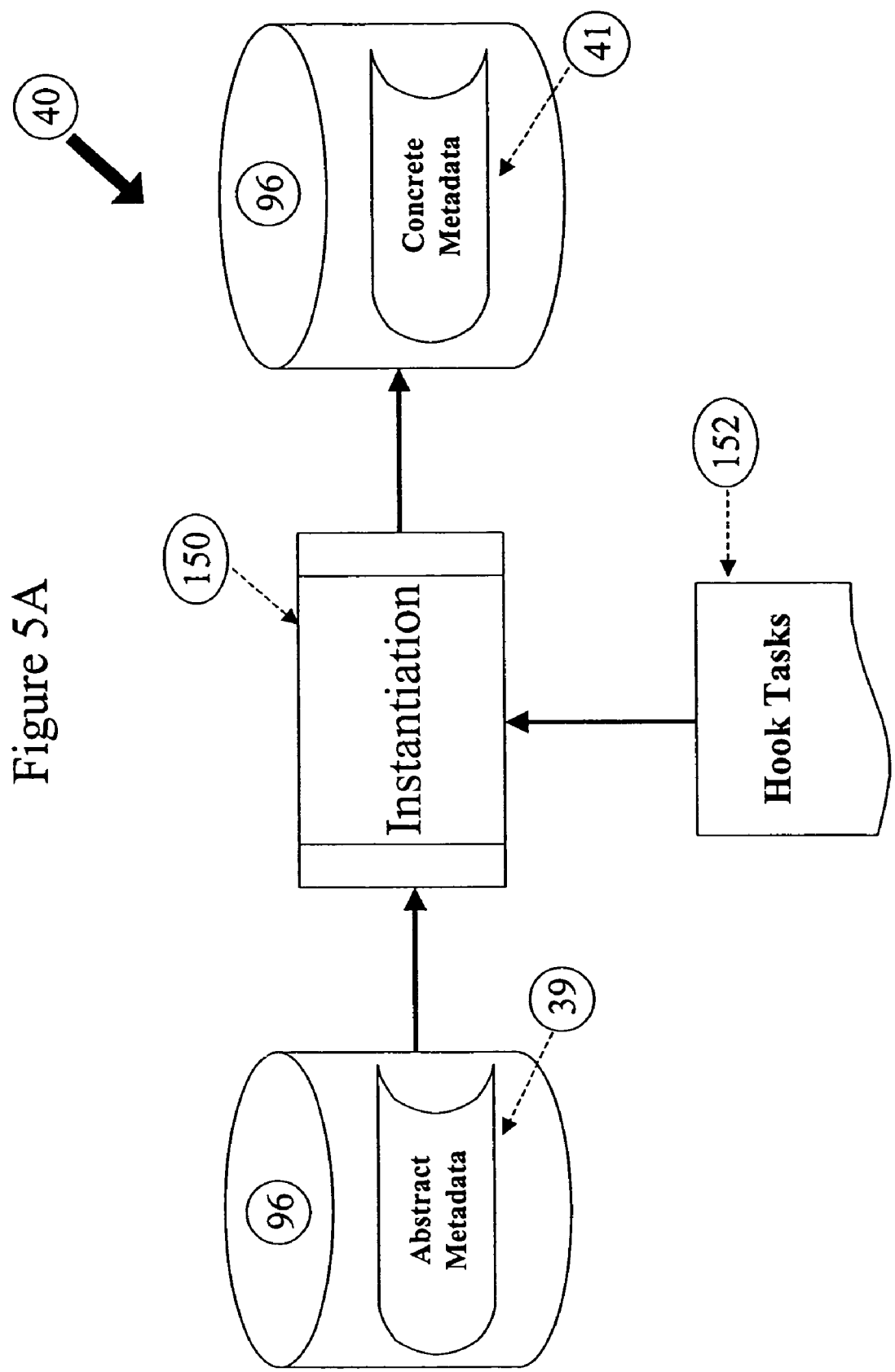
FIG. 5A depicts the instantiation process in accordance with the invention.

FIG. 5A depicts the instantiation process 40 in accordance with the invention. Generally, the instantiation process converts the abstract metadata objects discovered during the discovery process into concrete metadata objects 41 that represent the unique setup and configuration of the source software application. The source abstract metadata 39 is read from the abstract metadata tables of the NMR 96, transformed and loaded back into the concrete metadata section of the NMR 96. The resultant concrete metadata 41 reflects the unique configuration of the source software application. For the metadata discovered automatically in this example, the source software application metadata is moving through the discovery and instantiation processes with little or no modification other than preparation and organization for the target generated objects. On the other hand, the handcrafted metadata is transformed during this process.

Thus, as shown in FIG. 5A, the abstract metadata located in the NMR 96 is read out by an instantiation step 150 which converts the abstract metadata 39 into concrete metadata 41 and then stores the concrete metadata 41 back into a different portion of the NMR 96. In addition, the process may include hook tasks 152 that can be created to execute during the instantiation process to modify or enhance the outcome of the process. The hook tasks also may change the resultant abstract metadata objects directly. An example of a hook task is set forth above and will not be repeated here.

FIGS. 5B1A-5B1E illustrate an example of the steps of the instantiation process 40 in accordance with the invention. In a preferred embodiment, the instantiation process is performed by a piece of software/software module which contains a plurality of lines of computer code that implement the steps described below. The following steps depict an example of the instantiation process 40. Many of the steps that occur during instantiation are similar to the steps for discovery in that the abstract metadata discovered during the discovery process must be instantiated to become the concrete representation of the object and therefore the same concepts addressed during the discovery process must be readdressed during instantiation. As shown in FIG. 5B1A, the instantiation process may accept abstract metadata 39 and customer version specific application configuration metadata 36a (referred to as source software application metadata in FIG. 1A) and may generate concrete metadata 41. As shown in FIG. 5B1B-5B1E, the abstract metadata 30 may further include abstract query objects and attributes 39a, abstract categorizations (list of values) 39b, abstract profile options 39c and an abstract answer metadata 39d. The concrete metadata 39 may further include concrete query objects 41a, concrete answer objects 41b and concrete security information 41c. The customer version specific configuration metadata 36A may further include discovered application and business entities 36a1, discovered logical topics 36a2, discovered attributes (logical and technical) 36a3, discovered security information 36a4, discovered horizontal partitioning 36a5, discovered profile options and settings 36a6, discovered logical to technical links 36a7 and discovered categorizations (LOV) 36a8.

Returning to FIG. 5B1A, the instantiation process includes a copy abstract metadata into potentially multiple uniquely named generated objects process 160, apply security metadata process 163, enhance usability of concrete metadata process 162, a build technical mapping between logical metadata and physical database structure and/or logical application process 166 and an apply customer specific choices process 168 wherein metadata is input into each process from the two input sources 39, 36a and each process generates concrete metadata 41 as shown. As shown, these processes may be carried out simultaneously. In more detail, customer specific choices for the data is applied which is generated from information entered by the user through the user interface. The choices may include inactivating some metadata so that fewer generated objects are generated, naming conventions in the concrete and generated objects, optionally creating specifically named database accounts are with access to a specific subset of generated objects, optionally creating additional concrete and generated objects with specific horizontal partitioning, and concrete and generated objects with names to match previously generated objects even if the current abstract metadata has different names (see the description of upgrade protection below for an example.) Each of these processes will now be described in more detail.

FIG. 5B1B shows more details of the process 160. In particular, the process 160 may include an apply categorization (list of values) step 161 in which lookups are resolved and wherein the abstract metadata describing where the categorization of source application data (lookup information) is stored is used to access a specific list of lookups from the source application data and record this information as concrete metadata. This step may receive the abstract categorizations 39b and the discovered categorizations 36b8 and may generate concrete query objects 41a as shown. The process 160 may further include a copy and merge abstract and query objects into potentially multiple uniquely named concrete query objects step 165 which receives the inputs shown and outputs concrete metadata 41a-41c. In more detail, additional metadata copies are created to take a topic (template reporting object), that is not customized per configuration options, nor is horizontally partitioned nor is business unit specific, and create several concrete instances of the template that each can be modified to make them relevant to the source application data and terminology applicable to their specific business unit. For example, if a company has 3 warehouses, one template inventory on hand view is available. From this template, 3 (possibly 4) separate concrete generated objects will be generated, one for each of the warehouses, possibly with that warehouses specific configuration and terminology included. This will include a unique name that indicates which warehouse the reporting object applies to, potentially unique set of columns based on how the source application is configured for the warehouse (for example warehouse A deals with serial numbered inventory and warehouse B does not, so warehouse A's reporting object may contain a column for serial number, and the reporting object as a result of the same template metadata will not have a serial number column) for horizontal and vertical partitioning as well as security models. Finally, the process 160 includes an apply version specific filtration step 175 (with the inputs and outputs as shown) that is applied in order to reduce a superset of metadata, which covers multiple versions of a source application, to the subset that applies to the specific version of the source application currently installed and configured for use. Now, the process 163 will be described in more detail.

FIG. 5B1C illustrates more details of the process 163. In particular, the process includes an apply horizontal partitioning step 163a that has the inputs and outputs shown and in which concrete metadata describing a logical slice of information (e.g. a single business entities Orders) and the technical SQL code to achieve it (the logical slice) is created from the abstract metadata describing a horizontal partitioning scheme (a subset of records on a given topic of information, e.g. partial list of customers). The process 163 may further include an apply vertical partitioning step 164 (with the inputs and outputs shown) wherein vertical partitioning is a subset of metadata that relates to a subset of topics (generated objects) and topic attributes (columns) that a person in a certain job responsibility would need to do their job or sometimes referred to as role objects) by grouping objects based on a security model, business rule, audience and/or business flow. The process 163 further includes a build folder structure/report object navigation mechanism step 186 that has the inputs and outputs shown. For example: Headquarters GL Information is a parent folder to a folder for a set of answers for each of the generated objects that belong to the GL Headquarters role (e.g. GLHQ_Chart_of Accounts, GLHQ_Balances, GLHQ_Budget_to_Actuals, GLHQ_Journal_Entry_Lines, etc. . . . as shown in FIG. 5B2. Now, the process 162 will be described in more detail.

FIG. 5B1D illustrates more details of the process 162. The process may include a transform placeholders columns to configuration specific column list step 162*a* with the inputs and outputs shown. The process 162 further includes a create search by columns step 169 with the inputs and outputs shown that is created to give the end user enough information to know how to use the generated object efficiently to perform queries that execute using as little resources as possible (for example, if there are two attributes of the customer topic (A$customer type and customer type description) and customer type is a "search by" because it is preferenced with an A$. The process 162 further includes a create join columns step 170 with the inputs and outputs shown that allows an end user who needs information from multiple topics to know if information needs to be accessed from each topic in a separate query attempt or, all information desired can be asked for in one query event by joining two topics together using their join to (Z$) columns. The process further includes a relate metadata together step 171, 172, 188 with the inputs and outputs shown. In more detail, in step 171, the instantiation process identifies any relationships between metadata objects referred to as "See Also" for the purpose of providing an end user a list of related topics if they are looking at a topic and wish to see related information, as in the case when a specific topic they happen to be looking at does not meet their needs and they wish to see other related (but different) topics. In step 172, the method identifies if any layered metadata objects exist and instantiate the layered objects on top of the lower level objects. In step 188, the process creates a list of values (LOV) for answer parameters.

The process further includes a create cross organizational query objects from related details query objects step 176 with the inputs and outputs shown that correctly filter information as related to two or more functional business entities. For example: US East Coast Sales and US West Cost Sales each have their own Order information but customer accounts receivables is maintained at the headquarters level which includes both sales divisions. Accounts receivables information for security purposes needs to be separated into two views, one for each sales divisions showing only accounts receivables information related to that specific sales divisions order information, in addition to a combined reporting object for headquarters that shows all sales divisions order and accounts receivables information combined so that complete company totals can be calculated. The process 162 further comprises a build metadata layers step 177, 178 where in each layer reuses another layer already built or to meet requirements of specific audiences, that has the inputs and outputs shown and that generates the necessary metadata objects for a particular audience since each different audience might require a different set of metadata objects to generate the information to be viewed by a particular user.

The process 162 further comprises a transform hierarchical objects step 179 with the inputs and outputs shown, In particular, in step 179, hierarchical objects, such as hierarchical employee reporting relationships, are transformed into concrete query objects so that, once generated, hierarchical data can be accessed through relational objects. The process 162 further includes a compose content for help file step 185 with the inputs and outputs shown wherein the content for the help file associated with the instantiated metadata is generated (e.g., configuration information/object descriptions/column descriptions, key words, see also.) The process 162 further includes a determine concrete query object names step 187 with the inputs and outputs shown wherein the instantiation process determines the report object name mapping to reporting requirements. Now, the process 166 will be described in more detail.

FIG. 5B1E illustrates more details of the process 166. The process may include an apply descriptions from translation language step 166*a* with the inputs and outputs shown that is applied for multiple language support. If the source software application supports multiple languages within the same source application data then there is usually source software application metadata that defines where the language specific data and sometimes language specific metadata is stored. That metadata is identified during this step. The process 166 further includes a transform technical and abstract terminology step 167 with the inputs and outputs shown wherein technical and abstract terminology is transformed to business, end-user, friendlier concrete terminology using a list of definitions abstracted from the source application that match handcrafted metadata codes (terms) or source application configuration metadata. The process 166 further comprises an optimize concrete objects step 173, 174 with the inputs and outputs shown. In more detail, in step 173, hints/filters applicable to a given object are added so that documentation can be provided to an end user of the given object that describes in detail what information the object returns, specifically what individual records the object might return (for example, a prospects generated object with a filter applied returns a subset of customers that have not purchased yet, even though all customer records are stored in the customers topic without the filter applied.) In step 174, the instantiated metadata objects are optimized for performance of the generated objects. This is where a technical command (or Hint as it is called in an Oracle database) is added to the SQL coded metadata to force the database to process the query in a particular manner that is more efficient than if the database were left to decide for itself how to process the SQL code.

The process 166 further includes an identify base view references step 180 with the inputs and outputs shown that provides an efficient concrete metadata structure in which some views are built to refer to other views, and in this way minimize the amount of metadata required and provide building blocks of varying degrees of detail to meet a maximum number of potential uses. The process 166 further includes an apply implementation specifics to metadata objects step 183 with the inputs and outputs shown. In more detail, implementation specifics are applied to the metadata objects (e.g., GL archive view if they have archives or AP views if they have PO implemented.)

As a result of the instantiation process, concrete metadata is generated. Returning to the example set forth above which described examples of abstract metadata, an example of the concrete metadata in accordance with the invention will be described in more detail. In this example, the concrete metadata representing the reporting object contains the key components that make up a SQL statement including the column list and column aliases in the SELECT and the three part ODBC table list and table aliases in the FROM clause. For clarity, this is a very simple example although the system in accordance with the invention may be used to generate a variety of different concrete metadata. For example, many examples also require a WHERE clause to join multiple tables and possibly other SQL syntax such as GROUP BY or HAVING. This concrete metadata will be used for generating objects against the Siebel Business Object Layer.

SELECT Columns:

| Column Name | Column Alias |
|---|---|
| Id | Activity Number |
| Start Date | Due |
| Start Time | Start Time |
| Type | Activity Type |

FROM clause Tables:

| Table Name | Table Alias |
|---|---|
| Personal.Action.Action | Action |

Another set of Concrete Metadata is generated that will generate objects or mappings that will execute directly against the relational database. The user facing generated object will be the same as reflected by the same Alias names in both sets of Concrete Metadata

SELECT Columns:

| Column Name | Column Alias |
|---|---|
| ID | Activity Number |
| APPT_START_DT | Due |
| APPT_START_TM | Start Time |
| TODO_CD | Activity Type |

FROM clause Tables:

| Table Name | Table Alias |
|---|---|
| Personal_Action_Action | S_EVT_ACT |

Concrete Answer Metadata

Here is the resultant concrete metadata created by the instantiation process for the abstract metadata defined in the previous example for the following components: Question, Answer Description, Report Title, Report Sub-Title, Columns and Parameter Prompts.

Question: "What are My Personal Activities that have been started?"

Answer Description: This report lists My Personal Activities that have been started.

Report Title: Activities by Person

Report Sub-Title: Selected by Start Time @p1 Through @p2

Columns:

Activity Number
Due
Start Time
Activity Type

Parameter Prompts:
Enter First Start Time:
Enter Last Start Time:

Current examples of the abstract metadata objects that are instantiated into concrete metadata objects include Noetix-Views for Oracle® Applications, AnswerPoint for Oracle® Applications, NoetixViews for Siebel® and AnswerPoint for Siebel® which are products of Noetix® which is the assignee of the present application. A first example from the NoetixViews for Oracle® Applications product addresses a concept known as Descriptive Extension Columns (known as Flexfields and Key Flexfields in an Oracle® product). The discovery process detects the configuration of Descriptive Flexfields and Key Flexfields in the source application setup data. The system reads the configuration of the Extension Columns and uses this information to transform manually created abstract metadata objects into concrete metadata objects based on the configuration of the Extension Columns. This configuration presents the Extension Columns in business terms rather than technical terms. Another example is QuickPicks that present data in business terms rather than cryptic codes.

Figure 5C:
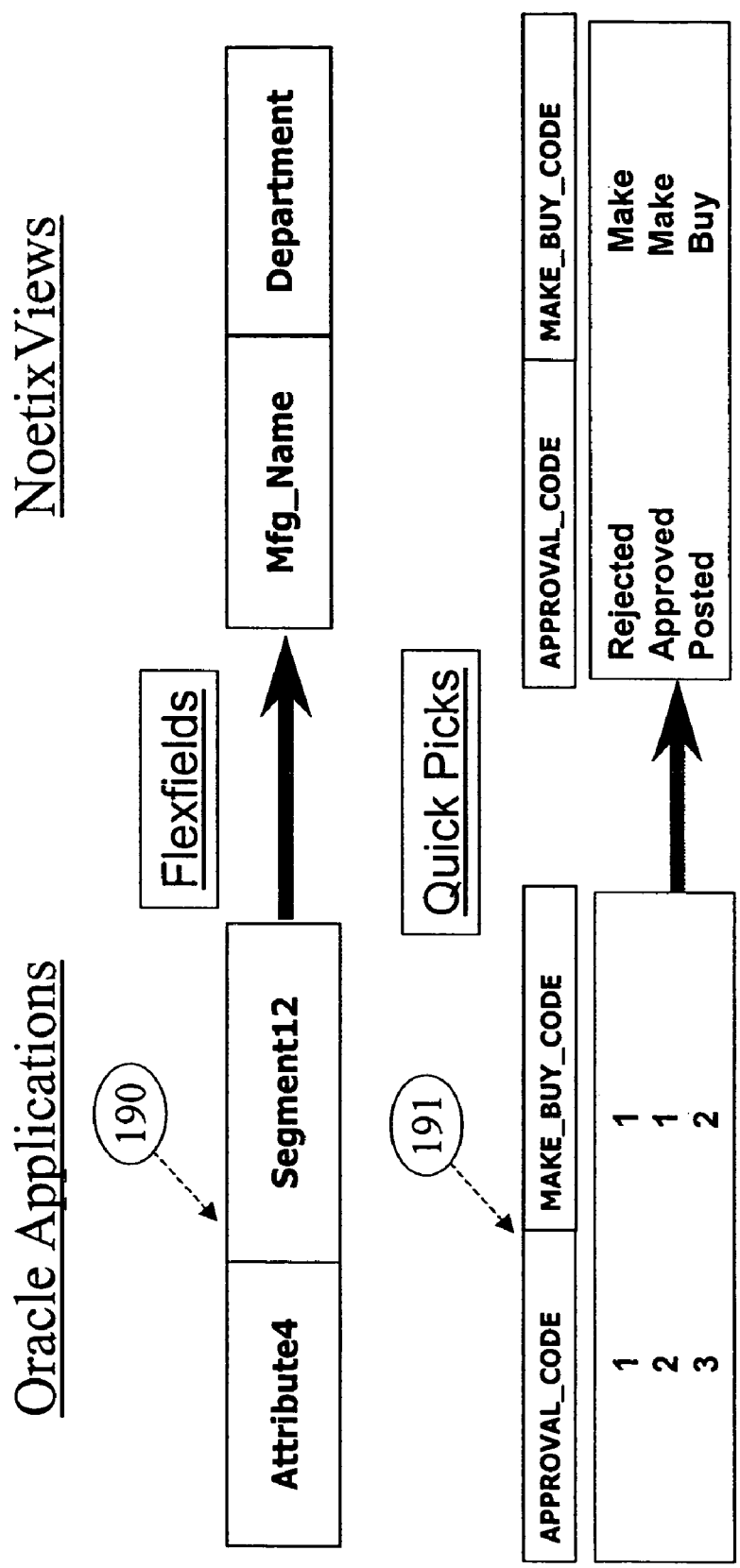
FIG. 5C illustrates an example of the Descriptive Flexfields and Quick Picks from the data access application generation system based on fields in the database system.

FIG. 5C depicts a sample of Flexfields and QuickPicks. In particular, a flexfield 190 for an Oracle® application (with the Attribute4 and Segment12 fields) and a quickpick field 191 for an Oracle® application (with the Approval_Code and Make_Buy_Code columns and the associated codes) are shown. As a result of the instantiation process, the flexfield 190 fields have been converted into Mfg_Name and Department (from Attribute4 and Segment12 in the Oracle application) based on the metadata discovered by the system in accordance with the invention. Similarly, the Approval_Code and Make_Buy_Code codes have been converted into "Rejected", "Approved", "Posted", "Make" and "Buy" from the numbers in the columns of the Oracle application based again on the discovered metadata in accordance with the invention.

Figure 5D:
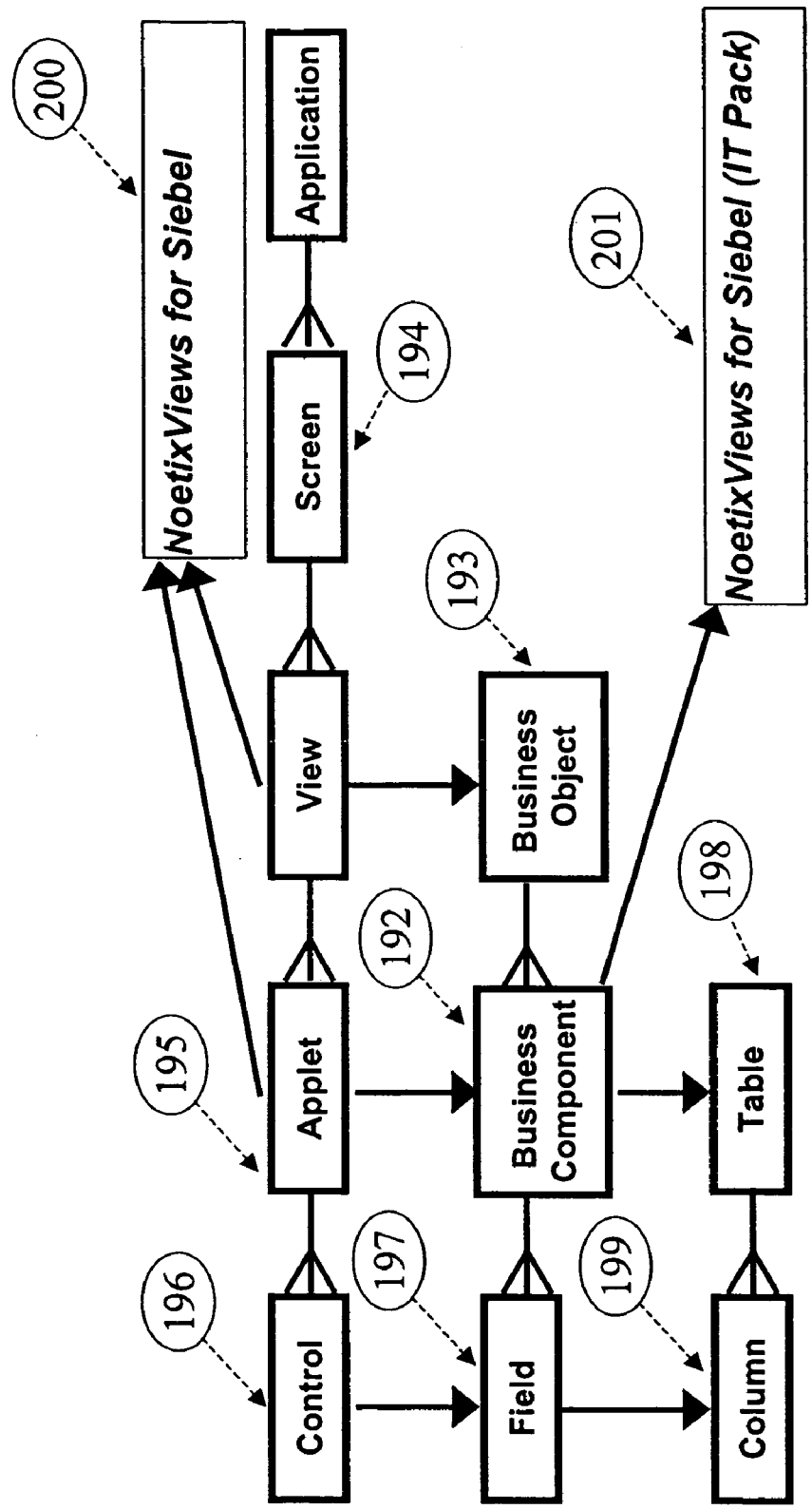
FIG. 5D depicts an example of a Siebel source application metadata being transformed into metadata objects.

FIG. 5D depicts the NoetixViews for Siebel® source application metadata. In another example, the source software application metadata is extracted from the Siebel® eBusiness Applications suite. The Siebel architecture has a Business Component Layer that resides over the top of the database. The Business Component Layer is comprised of business objects and business components. There are a set of business objects representing the Siebel® Repository that provide access to the data and metadata that represents the structure of the application including setup, configuration and customization information. The discovery process extracts the source application metadata from the Siebel® Repository including business objects 192, business components 193, screen views 194, (user interface), applets 195 (a component of a view), controls 196, fields 197, tables 198, columns 199, menu structures and security information such as users and roles. This information is used to define abstract metadata objects. One set of objects 200 correlate closely with the views and applets. Another set of objects 201 correlates directly with the business components and is referred to as the IT Pack.

In another example, the source software application metadata is associated with the Oracle® Applications eBusiness suite. The manual process includes the creation of abstract metadata objects that are loaded into the Noetix® Metadata Repository and then modified and transformed based on additional information extracted from the source software application. The resultant abstract metadata objects are the foundation of the NoetixViews for Oracle® Applications product. The abstract metadata objects are then processed by instantiation and become the concrete metadata objects. In another example, the source software application metadata is associated with the Oracle® Applications eBusiness suite. Abstract metadata objects are manually defined that represent business reports, referred to as Answers. The Answers are layered on top of the NoetixViews. The abstract metadata Answers are then processed by instantiation and become the concrete metadata Answers. In another example, the source software application metadata is associated with the Siebel® eBusiness Applications suite. Abstract metadata objects are manually defined that represent business reports, referred to as Answers. The Answers are layered on top of the NoetixViews. The abstract metadata Answers are then processed by instantiation and become the concrete metadata Answers. Now, the generation process in accordance with the invention will be described in more detail.

Figure 6:
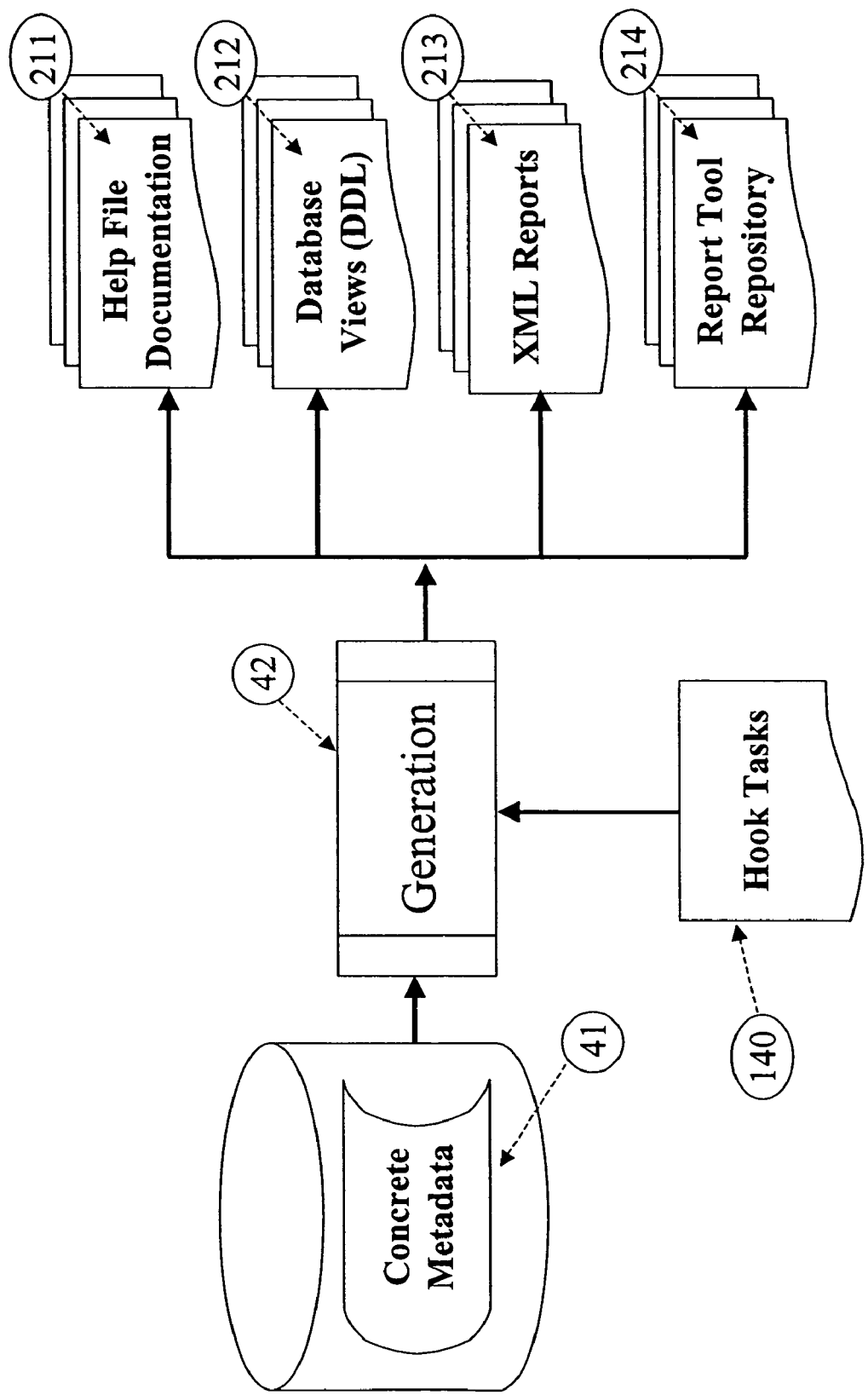
FIG. 6 depicts the generation process in accordance with the invention.

FIG. 6 depicts the generation process 42 in accordance with the invention. In particular, the generation process 42 involves the execution of one or more generator applications/programs wherein each generator application is preferably a piece of software/software module which a plurality of lines of computer code which implement the functions/operations of the generator application. A given generator application will read the concrete metadata 41, created by the instantiation process described above, and transform the concrete metadata as needed and then act on that metadata for a particular target application. Each generator application may create an end user application, package the metadata into an intermediate form that can be processed by another system or configure a system directly for immediate use.

The generation process can be modified for each unique implementation by using a mechanism referred to as Hook Tasks or Hook Scripts. These hooks exist throughout the process to change or enhance the behavior of the system. For example, a customer has multiple departmental reporting servers (for example a reporting server for Accounting, for Order Entry, for Inventory, and for Manufacturing) in addition to the source application database. These reporting servers are duplicates of the main source application database. The customer would like a subset of the concrete objects to be generated in each reporting server. In this particular example the customer would create a computer program with a specific name (consistent with standard naming conventions defined by Noetix to correspond to a particular point within the abstraction process). The hook script would subsets of the concrete metadata, call computer programs within the generation process to generate each subset of concrete metadata into a specified reporting server.

Figure 7:
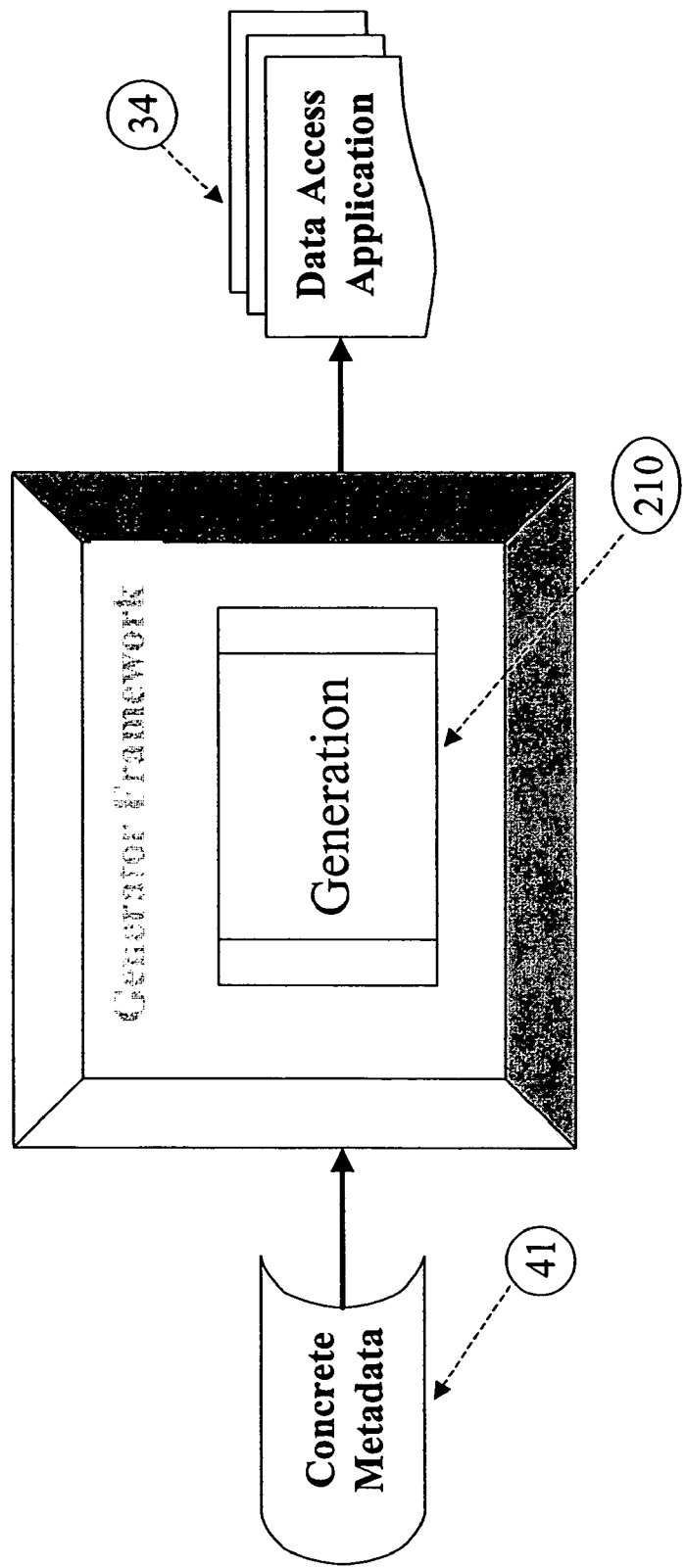
FIG. 7 illustrates a generator application framework.
Figure 8A:
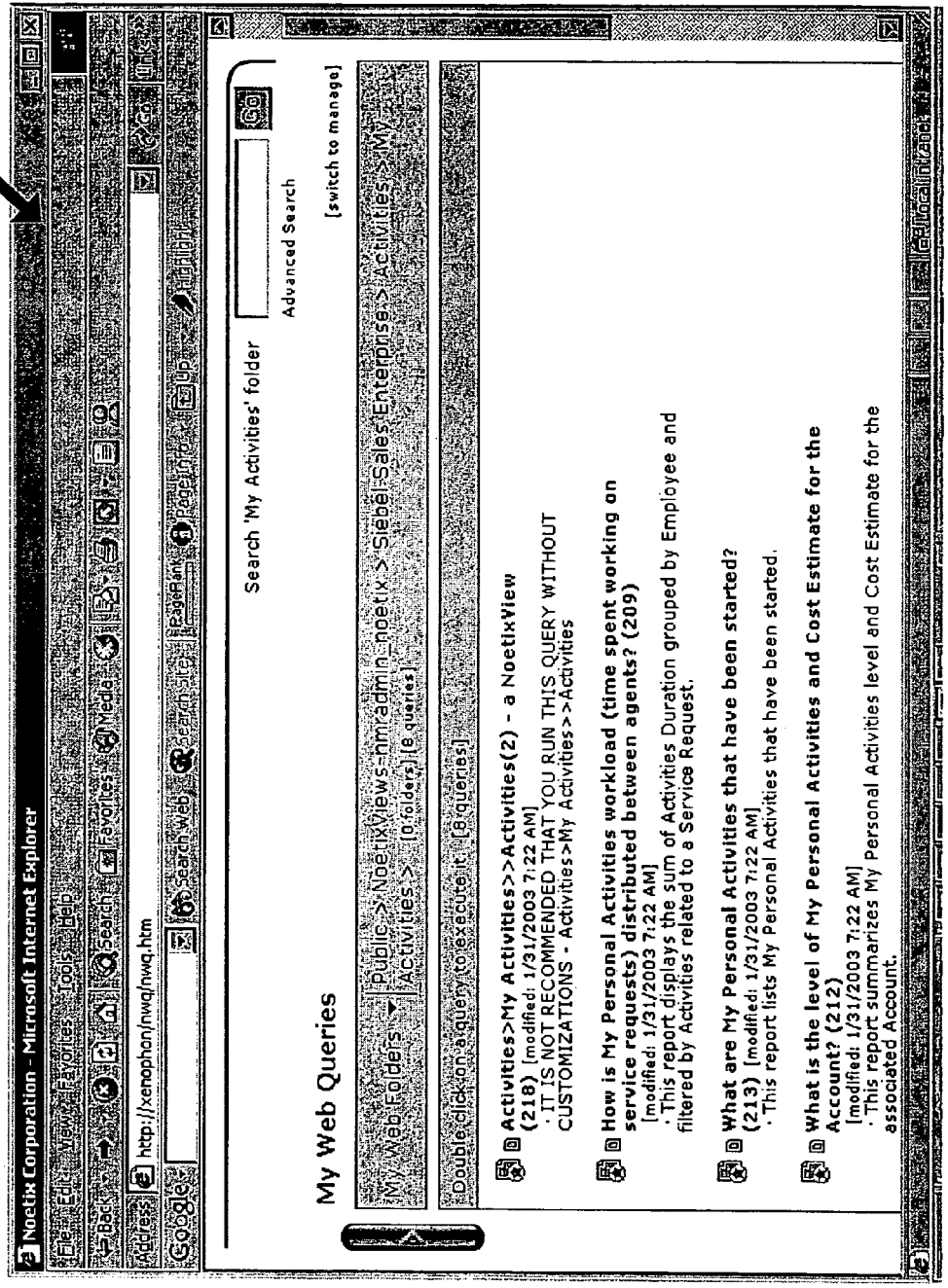
FIG. 8A is an example of the data access application generated by a generator application in accordance with the invention.
Figure 8C:
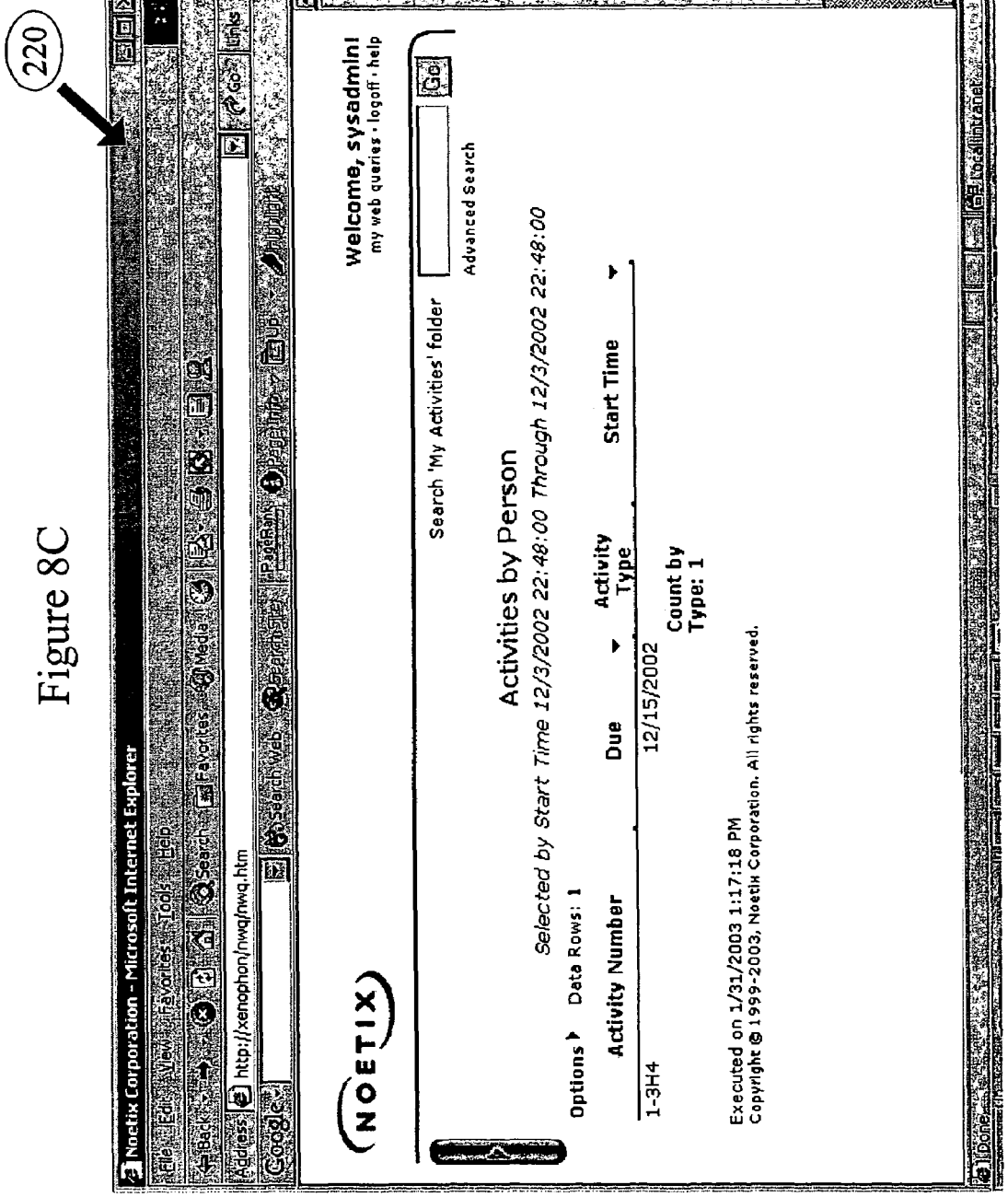
FIG. 8C is an example of an answer screen of the data access application shown in FIG. 8A.

FIG. 7 illustrates a generator application 201 framework wherein the generator process may include one or more generator applications. In particular, there are some operations that are common among all generators and these operations are included in a generic generator framework. The result is that a new generator does not have to move the metadata through the entire process. It can leverage the common features found in the generator framework and must only add new or unique functionality. In order to reduce generation times, a generator should be able to intelligently regenerate the target application. This will involve analyzing the source and target systems, determining the differences, and then synchronizing the target system to match the source. During this process, care should be taken to not adversely affect any custom development that may have occurred on the target system. This technique is also known as single-master synchronization.

A generator leverages the work of the Discovery and Instantiation phases of the process, and can provide applications with immediate value. A generator is able to:

1. Generate end user documentation by reading the concrete metadata and generating output in RTF, XML, HTML or other formats.
2. Read the concrete metadata and generate Database Definition Language (DDL) files that can be executed against one or more Relational Databases.
3. Fully configure an open system, such as an end user query tool, so that an end user can immediately begin to benefit from the reporting application.
4. Build components that can plug into existing business catalogs or portals, giving business users a way to easily find and access valuable business information.
5. Generate code or transformations that can execute business rules, manage enterprise application integration, and facilitate business-to-business and peer-to-peer communication.
6. Configure integration points between existing enterprise systems such as directory integration for user authentication.
7. Manipulate the concrete metadata to meet specific features or uniqueness of a given target system.
8. Produce metadata as required by ETL and data warehousing systems in order to fully configure a multidimensional reporting solution.

Returning to FIG. 6, the generation process (using one or more generator applications) may generate various data access applications. For example, as shown in FIG. 6, the data access applications may include, but are not limited to, help file documentation 211, database views (DDL) 212, XML reports 213 and report tool repositories 214. In particular, the generation process reads the concrete metadata 41 and creates generated objects 44 (See FIG. 1A) of many different formats. This example generates a Data Definition Language (DDL) file that can be executed against Noetix Query Server (NQS) to define a reporting object known as a virtual table in NQS but also referred to as a NoetixView. Also shown is an XML Document that represents a generated Noetix WebQuery (NWQ) Web Query (Report). Other generated objects such as DDL calls to create folders, users, groups and mappings in NQS are required for this example but are not provided for brevity.

Noetix QueryServer DDL

This is the DDL to create the virtual table definition in NQS.

CREATE Table NoetixViews.nmradmin_noetix."Activities>My Activities>>Activities"["Activities"] ("Activity Number" [" "] varchar(11),"Due" [" "] varchar(20),"Start Time" [" "]varchar(20),"Activity Type" [" "] varchar(10),PRIMARY KEY ("Activity Number")) COST 100

The resulting NoetixView contains the following columns:

NWQ Web Query

This is the generated XML document representing the Web Query in NWQ.

<NXQ><Columns><Column version="2"><a><![CDATA[Activity Number]]></a><b><![CDATA[ ]]></b><c>13</c><d></d><e>yes</e><f >no</f><g>no</g><h><![CDATA[Activities, Activity Number—This column returns the same values as A$Activity Number]]></h><i>0</i></Column><Column version="2"><a><![CDATA[Activity Type]]></a><b><![CDATA[ ]]></b><c>13</c><d></d><e>yes</e><f>no </f><g>no</g><h><![CDATA

[Activities, Type of Activity (e.g. meeting, call, correspondence . . . ). List of possible values: "Activity-Channel", "Administration", "Appointment", "Assessment", "Best Actions", "Call", "Call—Inbound", "Call—Outbound", "Contact Behavior", "Correspondence", "Demonstration", "Depot Repair", "Diagnosis", " Email—Inbound", "Email—Outbound", "Event", " FYI", "Fax—Inbound", " Fax—Outbound", "Field Repair", "In Store Activity", "In Store Visit", "Information Needed", "Installation", "Meeting", "Milestone", "Notes", " Other", "Paging", " Personal", "Possible Actions", "Preparation", "Presentation", "Recommended Activity", " Research", "Resolution", " Stock Transfer", "Store Check", "Tactic", "Technical Support Follow-Up", "Telephone", "Text Chat", "To Do", " Upgrade", "Voice Over IP", " Web Update", "Preventive Maintenance", "Diagnostic"—This column returns the same values as A$Activity Type]]></h><i>1</i></Column><Column version=“2”><a><![CDATA[Due]]></a><b><![CDATA[ ]]></b><c>16</c><d></d><e>yes</e><f>no</f><g>no</g><h><![CDATA[Activities, Date the activity must be started—This column returns the same values as A$Due]]></h><i>2</i></Column><Column version=“2”><a><![CDATA[Start Time]]></a><b><![CDATA[ ]]></b><c>16</c><d></d><e>yes</e><f>n o</f><g>no</g><h><![CDATA [Activities, Time the activity should be started]]></h><i>3</i></Column></Columns><Filters/><Parameters><P arameter version=“3”><a><![CDATA[Enter First Actual Start]]></a><b><![CDATA[Actual Start]]></b><c><![CDATA[on or after]]></c><d><d__1><![CDATA[ ]]></d__1></d><e>yes</e><f>yes</f><g>11</g><h>no</h><i>no</i></Parameter><Parameter version=“3”><a><![CDATA[Enter Last Actual Start]]></a><b><![CDATA[Actual Start]]></b><c><![CDATA[on or before]]></c><d><d__1><![CDATA[ ]]></d__1></d><e>yes</e><f>yes</f ><g>11</g><h>no</h><i>no</i></Parameter></Parameters><Execute><Execute version=“2”><rcs><rc><n><![CDATA[Due]]></n><w>-1</w><f><![CDATA[MM/dd/yyyy]]></f><ft>date</ft></rc><rc><n><![CDATA[Activity Type]]></n><w>-1</w><f><![CDATA[ ]]></f><ft></ft></rc></rcs><pis></pis></Execute></Execute><Saving><Saving version=“2”><nwqTitle><![CDATA[Activities by Persons]]></nwqTitle><nwqSubtitle><![CDATA[Selected by Start Time @p1 Through @p2]]></nwqSubtitle><nwqMobile>no</nwqMobile><d>yes</d><e>no </e><f><![CDATA[ ]]></f><g>yes</g></Saving></Saving><Sorting/><T otal><Total version=“2”><a><![CDATA[Activity Type]]></a><b>Count</b><c><![CDATA[Count by Type]]></c><d><![CDATA[Activity Type]]></d></Total></Total><DocData><Distinct>no</Distinct></DocData></NXQ>

Create View DDL

Sample Generated DDL to Create a View in a Relational Database

```
CREATE VIEW "Activities>My Activities>>Activities" (Activity_Number, Due, Start_Time,Activity_Type) AS SELECT id, appt_start_dt, appt_start_tm, todo_cd FROM s_evt_act;
```

FIG. 8A is an example of the data access application 220 generated by a generator application in accordance with the invention. The Data Access Application in this example is Noetix Enterprise Technology Suite (NETS). Noetix WebQuery (NWQ) is the business user interface for accessing data. Below is a list of generated Answers in the My Activities folder. The “Public NoetixViews-nmradmin_noetix>Siebel Sales Enterprise>Activities>My Activities” identifies the context for navigation to this folder. The latter part of this string matches the Siebel user interface navigation terms to easily match with the familiar Siebel UI. The third picture is the main screen, “What are My Personal Activities that have been started?” is the generated Answer for this example.

FIG. 8B is an example of a parameters screen of the data access application shown in FIG. 8A. In particular, when the Answer is executed the Parameters screen appears and prompts for the values that the abstract Answer metadata defined as required for this Answer to instantiate and generate. The prompts and column list of values were all converted to concrete instances during instantiation. FIG. 8C is an example of an answer screen of the data access application shown in FIG. 8A. In particular, the final result is the execution of the Answer or the report. This report contains all the transformation that occurred during instantiation such as report title and subtitle, column headings and the underlying query that populates the report correctly.

This is the SQL statement that is executed by the Web Query. This Query is translated numerous times during execution. Using FIG. 2B as a reference, the SQL is translated on the Query Server by (NQS) and then translated on the Noetix® Server by the Noetix® Siebel® Connector and then translated on the Siebel Server by the Business Object Layer and is finally passed to the database. The resulting dataset is passed back through the architecture. This process of the query execution is not within the scope of this invention but it adds clarity to understanding that the translations required for the Data Access Application to perform its function are provided by the invention.

```
SELECT "Activity Number","Due","Activity Type", "Start Time" FROM "NoetixViews"."nmradmin_noetix"."Activities>My Activities>>Activities"
```

In accordance with the invention, a sample list of embodiments of the generators are:

1. Help Generator that can generate help in RTF (MS Help) format or HTML.

2. Views Generator that can create database DDL (such as Oracle, SQL Server, DB2, etc.) for creating database views.

3. Oracle Discoverer EUL Generator that writes metadata directly into the Oracle Discoverer End User Layer (EUL). The EUL is the metadata repository for the Oracle end user query tool.

4. Noetix QueryServer (NQS) Generator that creates and executes NQS DDL (Data Definition Language) to create metadata objects in the Noetix platform including users, roles, virtual tables.

5. Noetix WebQuery Generator that interacts with a web service to define business information hierarchies.

6. Noetix AnswerPoint (NWQ) Generator that develops XML documents structured in a way that generates customized web queries in NWQ.

7. An ETL Generator that can completely configure a leading ETL tool so that it is immediately ready to start the process of loading and maintaining a data warehouse.

8. Business Objects Generator that can automatically configure a Business Objects Universe, thereby eliminating the need for expensive and time-consuming consulting.

Now, an example of two different data access applications generated by a particular generator application in accordance with the invention will be described in more detail to provide an example of the generator process.

Figure 9:
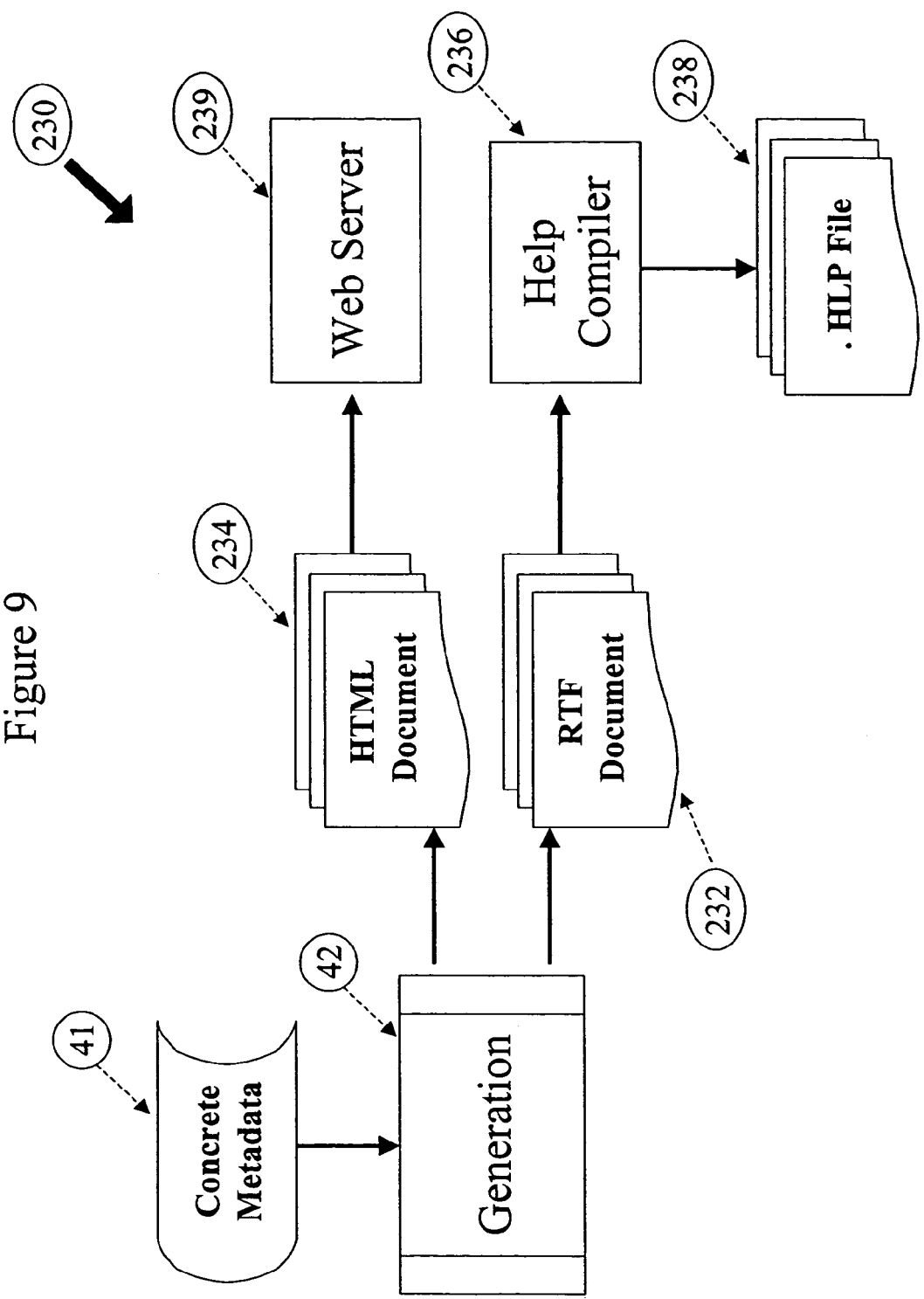
FIG. 9 depicts the Help Generator process in accordance with the invention.

FIG. 9 depicts the Help Generator process 230 in accordance with the invention. In particular, the NoetixViews for Oracle Help Generator is a software program that reads a subset of the concrete metadata 41 and then writes out end user documentation in Rich Text Format (RTF) 232 and/or HyperText Markup Language (HTML) 234. The resulting RTF includes tags that can be processed by a Microsoft Help Compiler 236, and this compiler is used to build a HLP file 238 from the RTF. The resulting HTML document 234 can be deployed using any standard web server 239 and web browser.

The Help Generator 320 uses the following types of concrete metadata:

Metadata about the objects themselves drives most of the content. This will include short descriptions, longer essays (these help the user learn how to go about using the metadata object), column lists and column descriptions.

Organizational metadata is used to structure the help system in a way that is easily navigable by the end user.

Keyword metadata is used to provide search capabilities.

Relationship metadata is employed to give users the ability to easily move between related metadata objects (a style of hyper-linking) in the same or different functional area.

Example Questions and Hints are used to help an end user quickly discover how to get answers to their pressing business questions. Hints are usually provided through handcrafted metadata that are common business questions that users may ask against the generated objects. For example the Customer generated object may have a hint like "What are my top ten customers?". The hint also provides instructions on how to write a query against the generated object that would return the results matching the hint.

Now, an example of a database view generator in accordance with the invention will be described which is another example of a generator in accordance with the invention.

Figure 10:
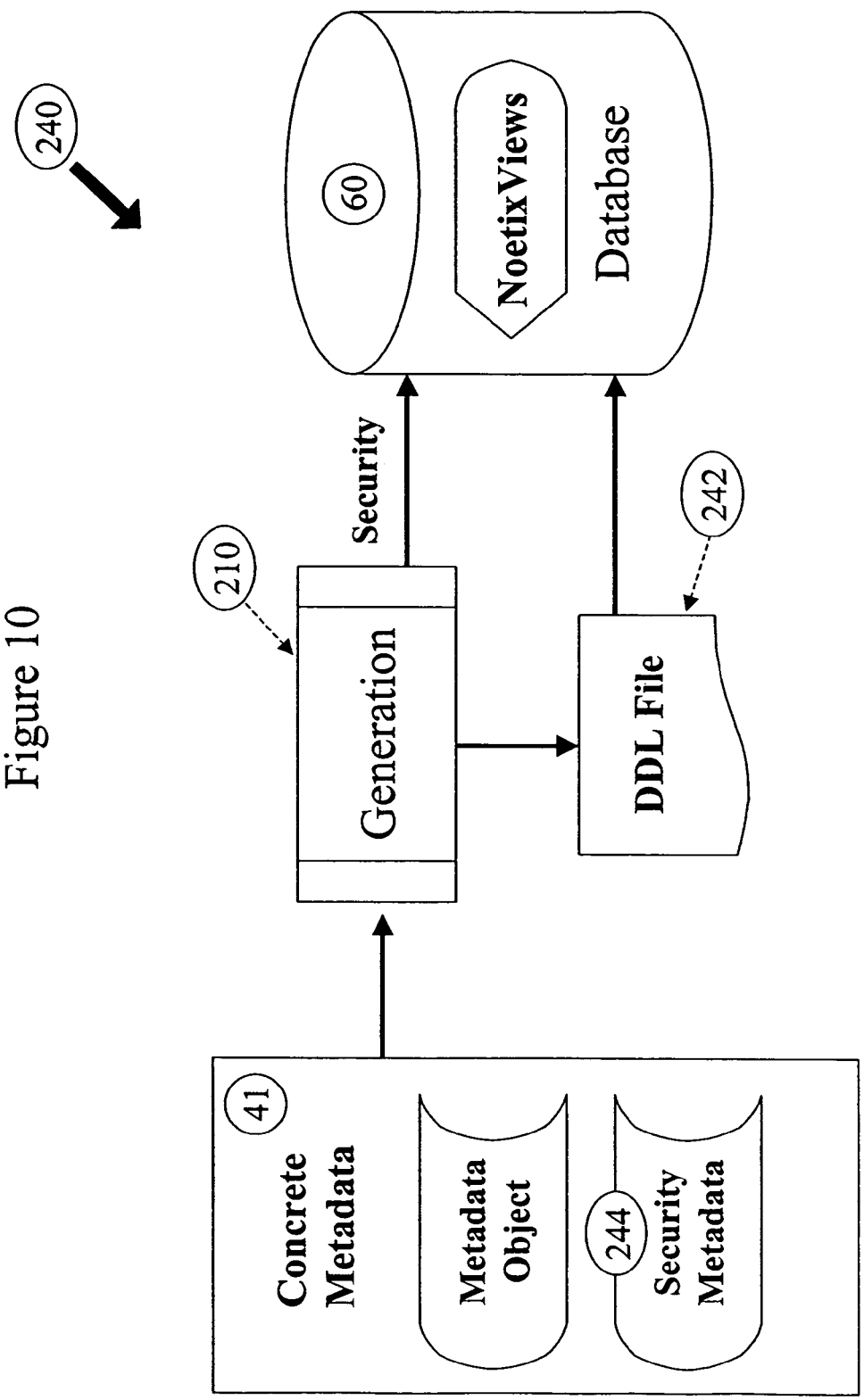
FIG. 10 depicts the Database View Generator in accordance with the invention.

FIG. 10 depicts the Database View Generator 240 in accordance with the invention. The NoetixViews for Oracle® Views Generator is a software program that reads a subset of the concrete metadata 41 and then writes out a file containing an Oracle® DDL 242 for creating database views. In addition, the Views Generator 240 reads relevant security metadata 244 and creates a secure environment in the target database 60. The Concrete object metadata is made up of multiple layers. New Concrete objects can be based upon existing concrete objects, giving the system of level of reuse. The Views Generator understands these layers and how they are related, so that it can create lower level objects prior to creating those objects that require them. In addition to the objects themselves, the Views Generator 240 is able to use the security features of the RDBMS to create a flexible security model for customers. Database roles are created as defined by the customer's organizational configurations and these roles are granted access to the appropriate views. Users can then be granted these specific roles in order to gain access to a particular section of their application.

The Views Generator uses the following types of concrete metadata:

Various concrete object metadata (including the object's name, description) as needed to build the View DDL.

The View's SELECT clause is built based on the object's column list and column descriptions.

The View's FROM clause is built based on table level metadata.

The View's WHERE clause is built based on concrete instances of join and filtering metadata.

Some concrete objects require the use of set operations, so the generator will, in those cases, use the correct UNION [ALL], MINUS or INTERSECTION syntax.

Any row level security defined for the concrete object.

Security metadata including which roles to create and the relationships between roles and views.

Now, the upgrade protection in accordance with the invention will be described in more detail.

FIGS. 11A-11D illustrate an example of an implementation of the upgrade protection method 46 in accordance with the invention. The Upgrade Protection process executes against the concrete metadata and makes the required changes based on configuration choices and pre-defined rules. In more detail, the invention creates instantiated concrete data objects for information access and data sharing. Those data objects are derived from (and specific to) a collection of source software application metadata. The problem is that source software application metadata and the source software application itself, however, are dynamic—they change over time. For the method to achieve optimum value, the data objects that are created must be created such that they are maintainable and sustainable (and that their value remains high) as the source software application changes from version to subsequent version. The method is specifically provided to include consideration for successive iterations of the method, each considering the results from earlier iterations, implemented in a manner that ensures Upgrade Protection for the data objects that are created. The method can be implemented such that, once a data object is created (through the completion of an iteration of the method), successive iterations of the method ensure that the interface to that data object is preserved.

As a result of this upgrade protection, external systems which utilize the data objects created by the method can continue to utilize those data objects, without change, through the evolution of the source software application. This attribute of the method is analogous to change control. When changes are made to the source software application (or to the source software application metadata), it is essential that the method be performed again, using the new information. However, it is also essential to identify any changes that are introduced into the resultant data objects in a controlled manner. The interfaces to any data objects that were created using earlier instances of the method must be retained. Meanwhile new data objects or extensions to existing data objects must be handled appropriately.

Thus, the upgrade protection process preserves the interface to the data objects across successive iterations of building and maintaining the data objects. The source concrete metadata is read from the concrete metadata tables of the NMR, transformed and loaded back into the that section of the NMR. The resultant concrete metadata reflects a consistent yet possibly expanded interface to the data objects. An example of an implementation of the upgrade protection process in accordance with the invention will be described with reference to FIGS. 11A-11D. In a preferred embodiment, the upgrade protection method is implemented as one or more software modules which contain a plurality of lines of computer code that implement the steps set forth below. In particular, the upgrade protection method 46 may includes a step 250 in which the upgrade protection process determines the most recent previously completed run (previous run) of generated concrete metadata for a particular source application and the currently underway run of concrete metadata (the new run.) In step 250, the upgrade protection process reads the data objects and column naming conventions of the previous run, which comprise the primary interface to the data objects, of the concrete metadata from the concrete metadata tables in the NMR. In step 254, the upgrade protection process compares the concrete metadata of the previous run to the concrete metadata of the new run. The detailed sub-steps of this step are described below with reference to FIG. 11B. In step 256, the upgrade protection process handles data objects from the previous run that do not appear in the current run. In particular, when a data object with a given name existed in a previous run but not by the same name in the new run, copy the best compatible, but differently named metadata definition of the data object (naming and source mapping metadata) from the new run, into the data object, named the same as the data object in the previous run. The detailed sub-steps of this step are described below with reference to FIG. 11C. In step 258, the upgrade protection process handles data objects column names that do not appear in the current run. In particular, when a data object that occurs in both runs, either naturally or created by this upgrade protection process, has a column with a given name in the previous run by not in the new run, copy a compatible but differently named metadata definition (naming and source mapping metadata) of the column from the new run, into a column named the same in the new run. The detailed sub-steps of this step are described below with reference to FIG. 11D. Using these steps, upgrade protection of the data objects is ensured. Now, the sub-steps of the comparison step above will be described.

Figure 11A:
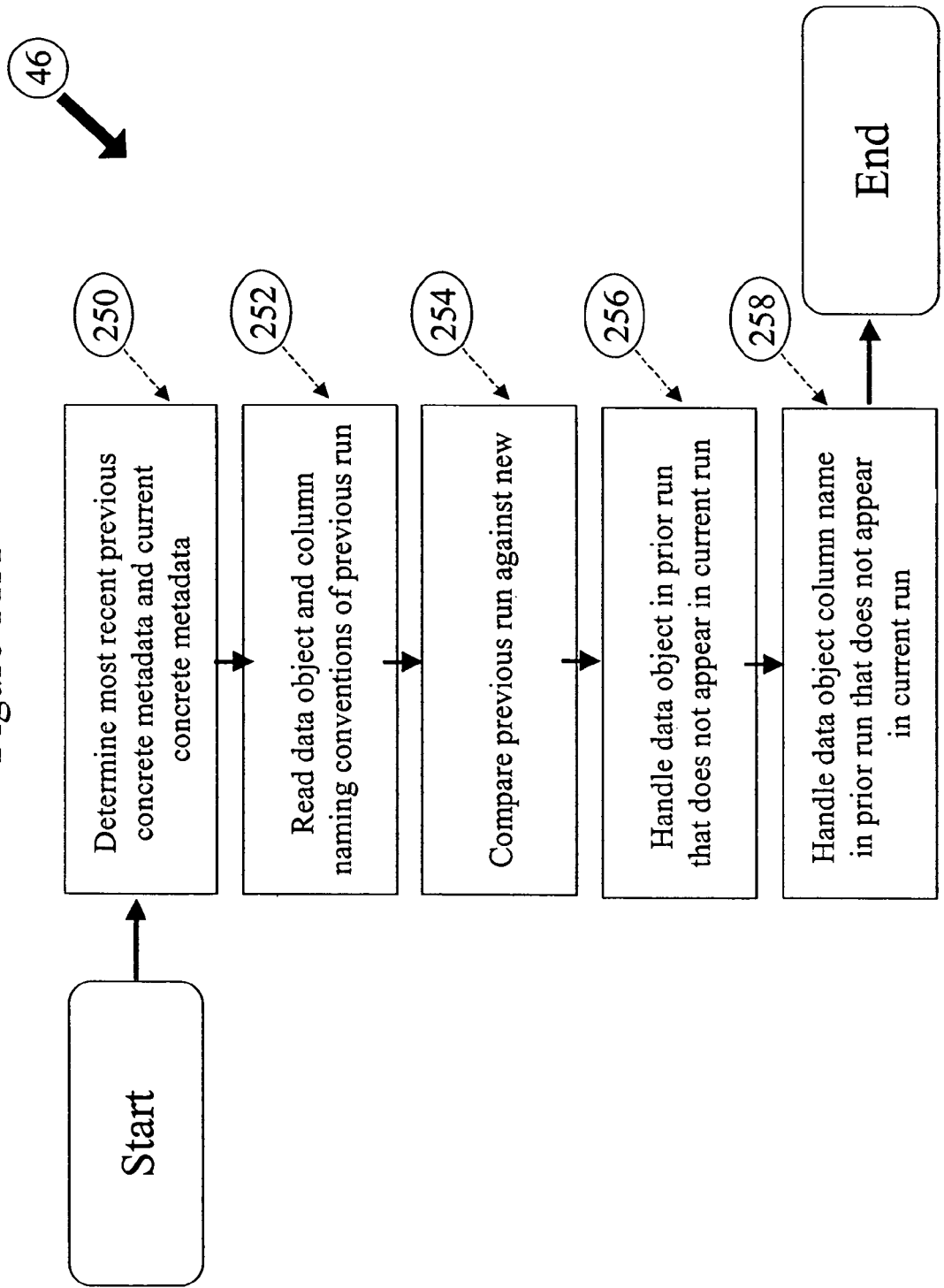
Figure 11B:
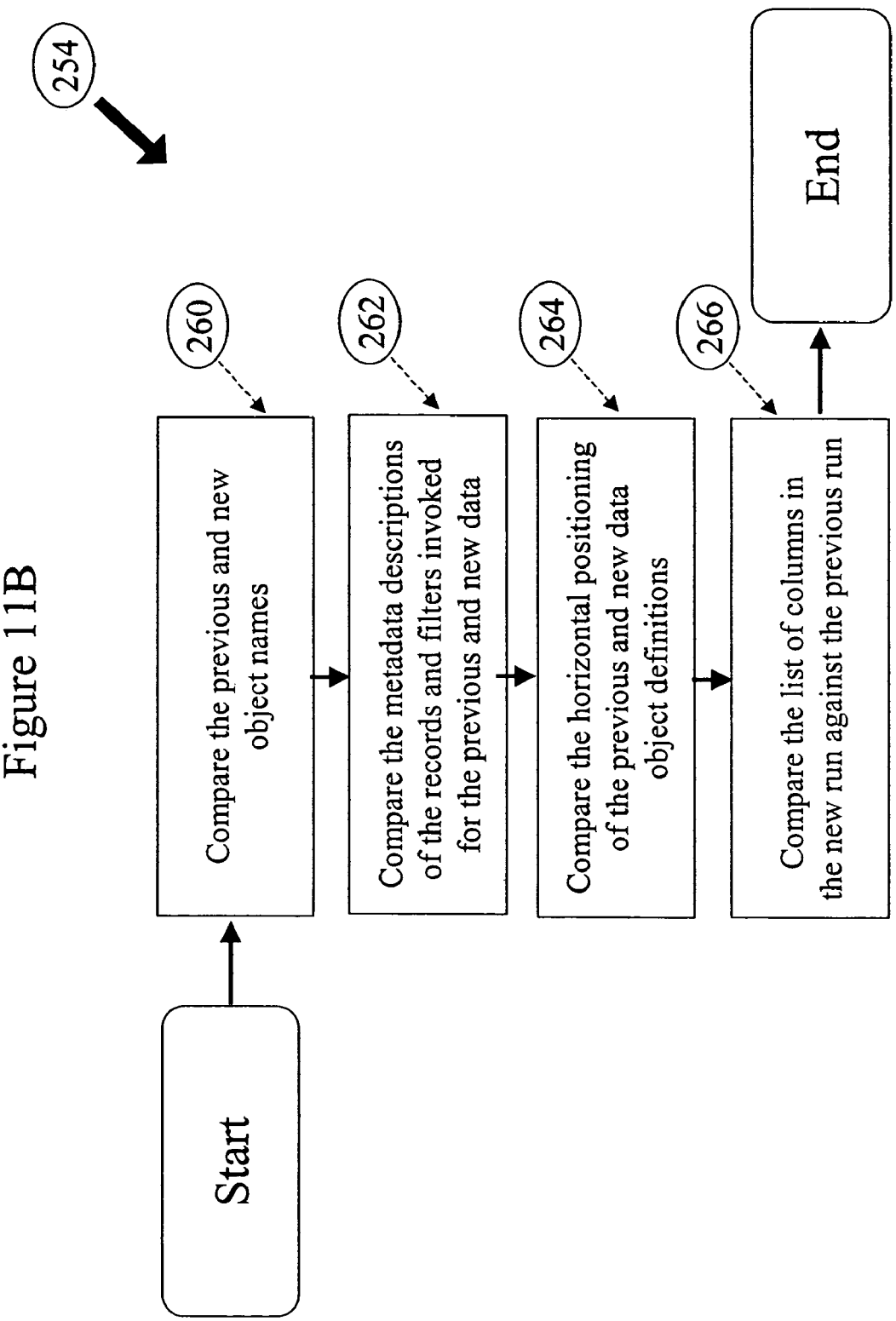

FIG. 11B illustrates the comparison step 254 and its sub-steps in accordance with the invention. In particular, in step 260, the upgrade protection process compares the data object names of the previous run to the data object names of the current run. In step 262, the upgrade protection process compares the metadata descriptions of the records and filters invoked for the previous run and the new run. In particular, the metadata descriptions of the records returned by the data object and what filters are invoked to reduce the set of records returned from the previous and new data object are compared to each other. In step 264, the upgrade protection process compares the horizontal partitioning of the previous and new data object definitions. In step 266, the upgrade protection process compares the list of columns of each data object in the new run against the list of columns of the corresponding data objects in the previous run.

Figure 11C:
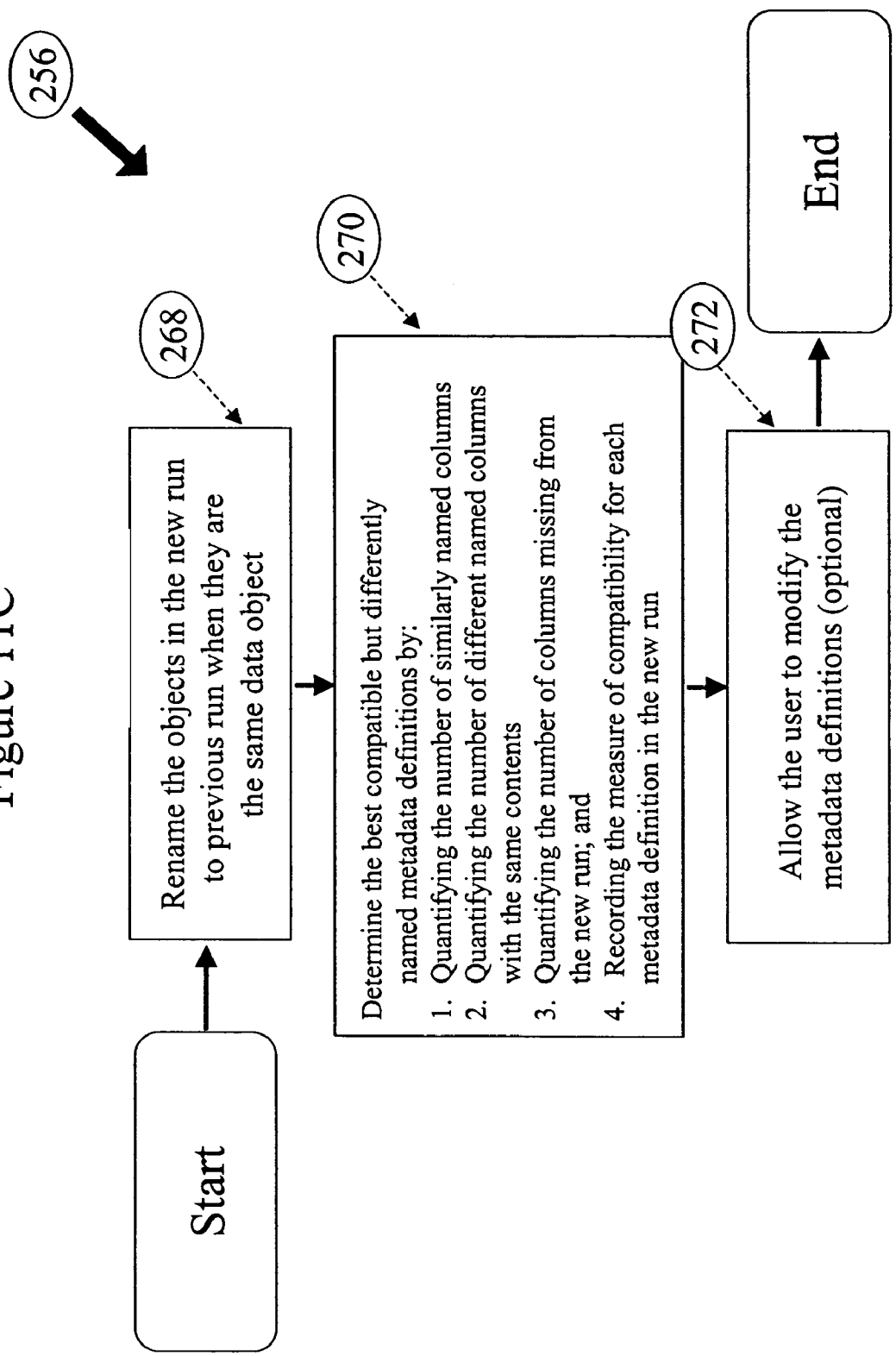

FIG. 11C illustrates the missing data object step 256 and its sub-steps in accordance with the invention. In particular, in step 268, the upgrade protection process, instead of duplicating data objects in the new run to match the names of data objects in a previous run, renames the data objects in the new run to match their names in a previous run when it can be determined they are the same data objects by their relationship to the source application screens from which they originated, and the metadata descriptions of the records returned by the data objects. In step 270, the upgrade protection process may determine the best compatible but differently named metadata definition of the data objects by: 1) quantifying the number of columns that are named the same; 2) quantifying the number of columns that are named differently but have the same contents; 3) quantifying the number of columns that are missing from the new run but existed in the previous run; and 4) recording the measure of compatibility for each candidate metadata definition in the new run. In step 272, the handling step of the upgrade protection process may optionally permit the user of the system to modify the decisions made about which metadata definitions of data objects to rename or copy to maintain a consistent interface to the data objects.

FIG. 11D illustrates the missing column step 258 and its sub-steps in accordance with the invention. In particular, in step 274, the upgrade protection process, alternatively to duplicating data objects columns in the new run to match the names of columns in corresponding data objects in a previous run, renames the columns in the new run to match their names in a previous run when it can be determined they are the same columns by the metadata descriptions of the data returned by the data object columns. In step 276, the upgrade protection process may optionally permit the user to modify the decisions made about which metadata definitions of data object columns to rename or copy to maintain a consistent interface to the data objects. Now, several examples of the upgrade protection process in accordance with the invention will be described.

In a first example, a data access application spans multiple versions. In particular, in one example, the source software application metadata belongs to the Oracle® Applications ERP suite. Consider an environment using the General Ledger (GL) module of version 11.0.3 of Oracle® Applications. The first time the data access application generation method is executed is through the installation of Noetix-Views for Oracle®. The result of this installation is a collection of data objects—the GL NoetixViews. Information technology and business user personnel use the database views as the foundation for creating reports and performing other data access tasks. At a later time, the administrator upgrades their Oracle Applications eBusiness Suite to a new version, 11.5.5. Following that upgrade, the database schema, business rules, and user interface of the Oracle Applications suite have changed. However, the administrators and users still have the reports that were created on the GL NoetixViews and want to continue to use those reports. The method is implemented in the NoetixViews for Oracle® installation process so that the GL views that are generated for the new version (Oracle® Applications 11.5.5) have the same interface (view names, column names, etc.) as the views generated for the previous version (Oracle® Applications 11.0.3). This ensures that the interfaces are preserved. The component of the views that has changed is the SQL syntax or "mapping" that is the code executed against the database to return the data. The data may now reside in new or different tables compared to the previous version. Therefore with this method the user and information technology personnel are abstracted away from the physical location of the data and they don't need to understand the changes to the physical data model of the source software application.

In a second example, the source software application metadata belongs to the Siebel® eBusiness Applications CRM suite. Consider an environment using the Sales Enterprise (Sales) module of version 6 of Siebel® eBusiness Applications. The first time the method is executed is through the installation of NoetixViews for Siebel®. The result of this installation is a collection of data objects—the Sales views—that are based on the user-interface elements (Screens, Views, and Applets, in Siebel terminology) that exist in the Siebel Sales Enterprise application. Information technology and business user personnel use the database views as the foundation for creating reports and performing other data access tasks. Later, the administrators modify their Siebel eBusiness Applications suite by adding some new screens and changing the content of some existing screens. However, the administrators and users still have the reports that were created on the Sales views and want to continue to use those reports. The method is implemented in the NoetixViews for Siebel installation process so that the Sales views that are generated for the new "run" (which contains the new screens) have the same interface (view names, column names, etc.) as the views generated for the previous "run" (which used the old screens). This ensures that the interfaces are preserved.

Figure 12A:
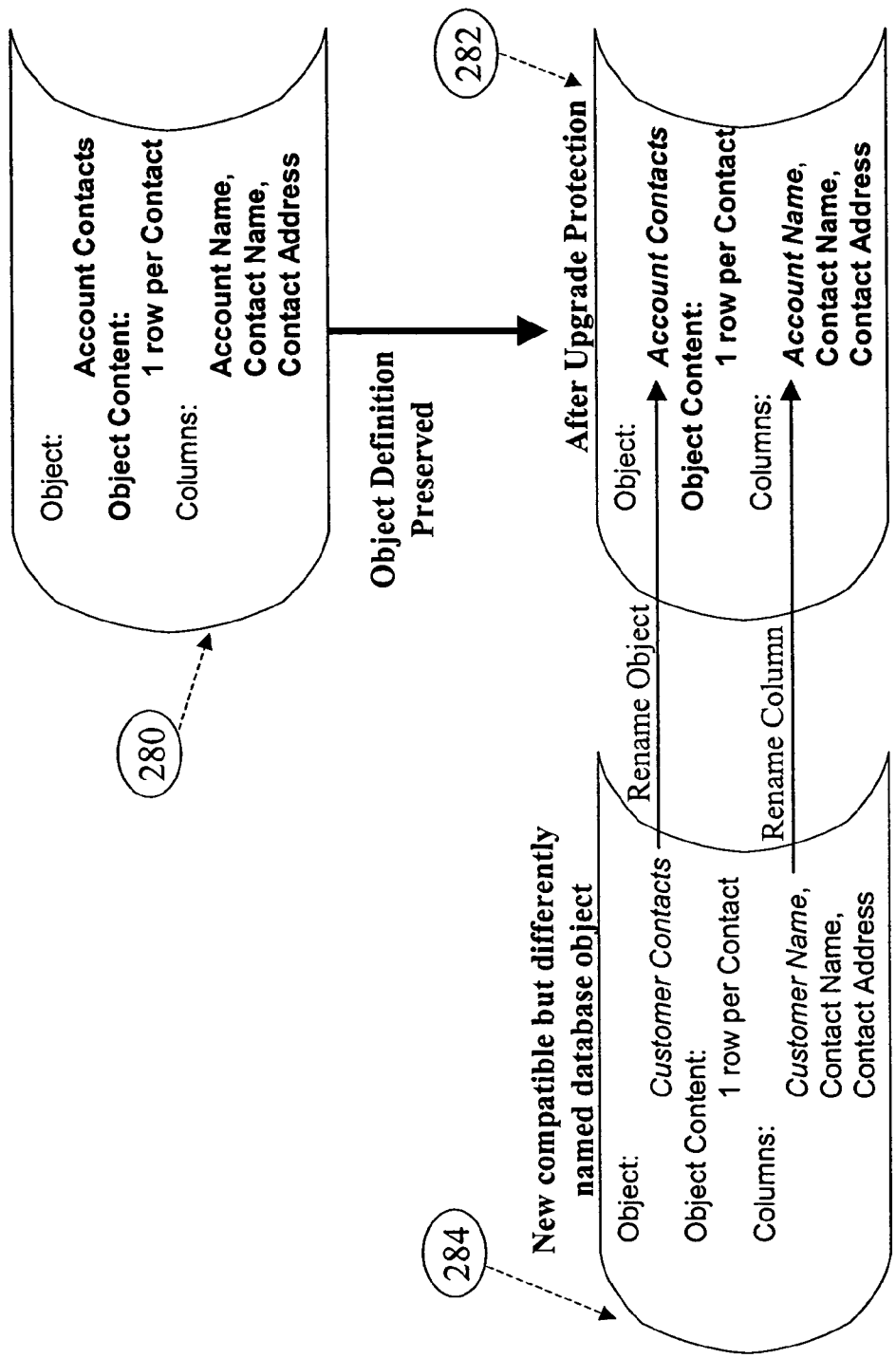
FIGS. 12A-12B illustrate two examples of the upgrade protection process in accordance with the invention.
Figure 12B:
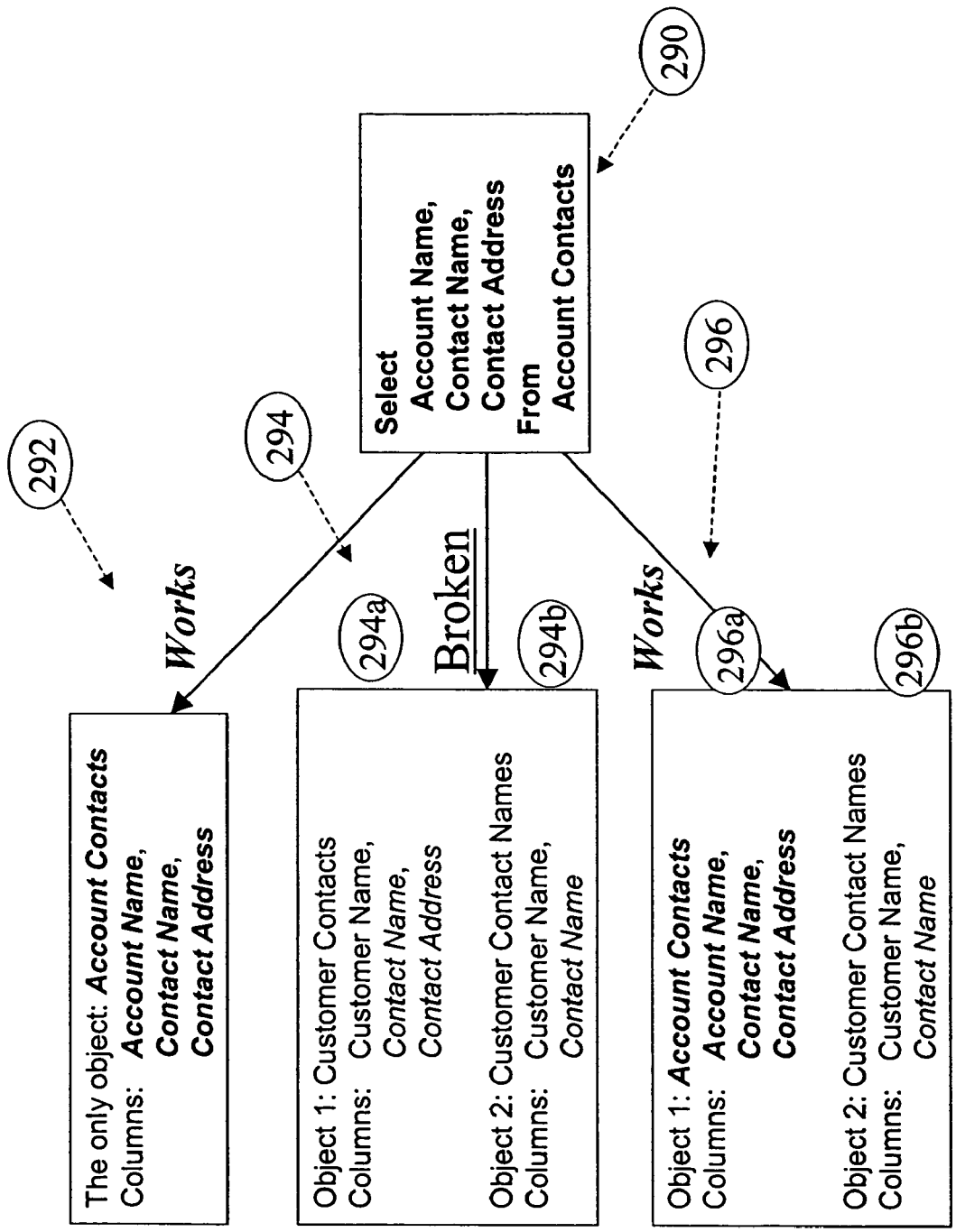

FIGS. 12A-12B illustrate two examples of the upgrade protection process in accordance with the invention. In particular, as shown in FIG. 12A, an object 280 from a previous run is shown wherein the object is "Account Contacts", the object content is "1 row per contact" and the columns are "Account Name", Contact Name" and "Contact Address." An object 284 that is generated in a new run is shown. Due to some condition, such as a new version of the application being installed, the object 284 has a name "Customer Contacts" with 1 row per Contact and the columns names are "Customer Name", "Contact Name" and "Contact Address." This object is obviously slightly different from the object 280 for the previous run. Therefore, if the upgrade protection in accordance with the invention was not available, the data access application, such as a report, that utilizes the original object 280 would not work since its object does not match the object 284 from the new run. However, using the upgrade protection process described above, the object 284 from the new run is transformed into an object 282 which is compatible with the original object 280 so that the objects from the previous run may be used with the new version of the application and the objects a protected from upgrades which typically break data access applications, such as reports and the like. As shown, the upgrade protection process changes the object name (to make it consistent with the previous run object) and changes a column name ("Customer Name" to "Account Name"). Thus, the resultant object 282 is identical to the original object 280 so that the data access application that was built on the original object 280 will operate properly with the new application which has the slightly different object 284.

FIG. 12B illustrates another example of the results of the upgrade protection process in accordance with the invention. In particular, an object 290 for a query stored in an external system is shown. The query selects columns "Account Name", "Contact Name" and "Contact Address" from an "Account Contacts" object in the application database. The application database originally contained an object 292 from which the query object 290 was created so that the query operates correctly and retrieves the proper information. In particular, the database contains only the "Account Contacts" object 292 with the "Account Name", "Contact Name" and "Contact Address" columns. As a result of an upgrade to the underlying application, the application database now contains a group of objects 294 including a first object 294a and a second object 294b. The first object 294a is a "Customer Contacts" object which has "Customer Name", "Contact Name" and "Contact Address" columns as shown while the second object 294b is a "Customer Contact Names" object which has a "Customer Name" and "Contact Name" column as shown. As is obvious, the query object 290 does not operate properly given these new objects and columns so that the query object is "broken" which would be the result from a typical application that does not include upgrade protection in accordance with the invention. However, using the upgrade protection process described above, a new groups of objects 296 (including object 296a and object 296b) is created which is compatible with the original query object. In this case, the upgrade protection process renames the "Customer Contacts" object to "Account Contacts" and the "Customer Name" column to "Account name." In accordance with the invention, the upgrade protection process did not change the "Customer Contact Names" object since it was missing a needed field and the "Customer Contacts" object was a better match for the "Account Contacts" object. Thus, with the group of newly generated objects 296 following the upgrade protection process, the query object 290 operates properly despite the change in the group of objects that results from a change in the underlying application. Now, another example of the upgrade protection in accordance with the invention will be described.

In this example, upgrade protection for a changed source application user interface will be described. In particular, the change of the name of a control in an applet is used for this example. In particular, one of the Controls defined in section 1.1.1 Controls in an Applet has been modified. The DISPLAY NAME has changed from "Start Time" to "Due Time". When the screen from the Source Software Application user interface is viewed, the label for the column now reflects the name change.

| DISPLAY NAME | FIELD (BUSINESS COMPONENT) |
| --- | --- |
| Activity Number | Id |
| Due | Start Date |
| Due Time | Start Time |
| Activity Type | Type |

As shown in the table above, the field names of the object is now inconsistent with the filed names of the display name. The complete process now executes for a second time. Because the field display name resides on the same Applet, View and Screen referencing the same Business Component the Upgrade Protection process identifies the change. The user has the option to replace the old name with the new name or to keep both the old name and the new name. The changed would be reflected in the generated objects for a NQS Virtual Table, a Database View and the NWQ Web Query (described above.)

If the option to replace the old name with the new name were chosen then the following DDL samples would be generated to create a Virtual Table in NQS and a view in the database.

CREATE Table NoetixViews.nmradmin_noetix."Activities>My Activities>>Activities" ["Activities"] ("Activity Number" [" "]varchar(11), "Due" [" "] varchar(20),"Due Time" [" "] varchar(20), "Activity Type" [" "] varchar(10),PRIMARY KEY ("Activity Number")) COST 100

CREATE VIEW "Activities>My Activities>>Activities" (Activity Number, Due, Due_Time, Activity_Type) AS SELECT id, appt_start_dt, appt_start_tm, todo_cd FROM s_evt_act;

If the option to keep the old name and the new name was chosen then the following DDL samples would be generated to create a Virtual Table in NQS and a view in the database.

CREATE Table NoetixViews.nmradmin_noetix."Activities>My Activities>>Activities" ["Activities"] ("Activity Number" [" "]varchar(11),"Due" [" "] varchar(20),"Start Time" [" "] varchar(20),),"Due Time" [" "] varchar(20),"Activity Type" [" "] varchar(10),PRIMARY KEY ("Activity Number")) COST 100

CREATE VIEW "Activities>My Activities>>Activities" (Activity_Number, Due, Start_Time, Due_Time, Activity_Type) AS SELECT id, appt_start_dt, appt_start_tm, appt_start_tm, todo_cd FROM s_evt_act;

Now, an example when a column in a table is changed will be described. One of the Columns defined in section 1.1.3 Columns in a Table have been modified. The Column Name changed from TODO_CD to ACTIVITY_TYPE. This change does not affect the Source Software Application user interface or the NQS Virtual Table because they both go through the Siebel Business Object layer, which takes this change into account.

| Column Name |
| --- |
| ID |
| APPT_START_DT |
| APPT_START_TM |
| ACTIVITY_TYPE |

The complete process now executes for an additional run beyond the first run. Because this is a physical data model change to the underlying database only generated objects that bypass the Siebel Business Object Layer need to be regenerated. In this case the database views needs to be regenerated. There is only one option here because the physical database mapping must be accurate for the generated object to execute properly. Here is the sample generated DDL code.

CREATE VIEW "Activities>My Activities>>Activities" (Activity_Number, Due, Start_Time, Activity_Type) AS SELECT id, appt_start_dt, appt_start_tm, activity_type FROM s_evt_act;

Thus, the data access generation system in accordance with the invention discovers the metadata contained in an application to generate data access applications. In addition, since the data access application generation system includes the upgrade protection, the objects generated by the system are protected against an application upgrade so that the data access application generated by the present invention are usable even when the underlying application is changed.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A data access and reporting application generation system implemented on a computer system that processes a source software application, the system comprising:

a computer system having a processor and a file system that stores a set of metadata associated with a source software application;

a discovery module executed by the processor that interfaces with a source software application and handcrafted metadata, each piece of handcrafted metadata describes one more pieces of business data stored in the source software application, many pieces of handcrafted metadata are combined together to create a reporting object template, and that automatically discovers metadata in the file system associated with the source software application configuration and creates, from the discovered metadata and the handcrafted metadata, one or more source metadata reporting object templates associated with the source software application and its configuration, the source metadata reporting objects being created from the discovered metadata or from the handcrafted metadata in combination with the discovered metadata, the discovery module further comprising a process that detects a business function of the source software application, a process that detects a business entity for the source software application, and a process that detects the relationships between the source software application configuration for the business function and the business entity; and an instantiation module executed by the processor that creates, using the source metadata reporting object templates created during the discovery process, one or more target metadata reporting objects corresponding to each source metadata reporting object wherein the target metadata reporting objects are associated with a particular source software application configuration and allow business data in the particular source software application with the particular source software application configuration to be reported on even when the source software application configuration changes.

2. The system of claim 1, wherein the source metadata object is an abstract metadata object and the target metadata reporting object is a concrete metadata object.

3. The system of claim 1, wherein the source metadata object is an abstract metadata object and the target metadata reporting object is an abstract metadata object.

4. The system of claim 1, wherein the source metadata object is a concrete metadata object and the target metadata reporting object is a concrete metadata object.

5. The system of claim 1, wherein the source metadata object is a generated object and the target metadata reporting object is a generated object.

6. The system of claim 1, wherein the source metadata object is an abstract metadata object and the target metadata reporting object is a generated object.

7. The system of claim 1, wherein the source metadata object is a concrete metadata object and the target metadata reporting object is a generated object.

8. The system of claim 1 further comprising an upgrade protection module that, as the source software application is upgraded to a new source software application configuration, updates the target metadata reporting objects associated with the particular source software application configuration so that the target metadata reporting objects associated with the particular source software application configuration are compatible with the new source software application configuration.

9. The system of claim 8, wherein the upgrade protection module further comprises a process for determining the target metadata reporting objects associated with the particular source software application and the target metadata reporting objects associated with the new source software application configuration, a process for determining the naming conventions of the target metadata reporting objects associated with the particular source software application configuration, a process that compares the target metadata reporting objects associated with the particular source software application configuration with the target metadata reporting objects associated with the new source software application configuration and a process that adjusts the target metadata reporting objects associated with the new source software application configuration to make the target metadata reporting objects associated with the new source software application configuration compatible with the target metadata reporting objects associated with the particular source software application configuration.

10. The system of claim 9, wherein the adjustment process further comprises a process to adjust the target metadata reporting object names associated with the new source software application configuration to make them compatible with the target metadata reporting object names associated with the particular source software application configuration and a process to adjust the target metadata reporting object column names associated with the new source software application configuration to make them compatible with the target metadata reporting object column names associated with the particular source software application configuration.

11. The system of claim 9, wherein the comparison step further comprises a process for comparing the target metadata reporting object names associated with the particular source software application configuration to the target metadata reporting object names associated with the new source software application configuration, a process for comparing the descriptions of the target metadata reporting object names associated with the particular source software application configuration to the descriptions of the target metadata reporting object names associated with the new source software application configuration, a process for comparing the horizontal partitioning of the target metadata reporting object names associated with the particular source software application configuration to the horizontal partitioning of the target metadata reporting object names associated with the new source software application configuration and a process that compares a list of columns associated with the particular source software application configuration to a list of columns associated with the new source software application configuration.

12. The system of claim 10, wherein the reporting object name adjustment process further comprises a process that renames a target metadata reporting object associated with the new source software application configuration to a target metadata reporting object associated with the particular source software application configuration for the same target metadata reporting object.

13. The system of claim 10, wherein the reporting object column name adjustment process further comprises a process that renames a target metadata reporting object column associated with the new source software application configuration to a target metadata reporting object column associated with the particular source software application configuration for the same target metadata reporting object column.

14. The system of claim 1, wherein the discovery module further comprises a process that detects the source metadata object associated with the source software application that groups information into a topic, a process that detects the source metadata object associated with the source software application that specifies the source of the topic, a process that detects the source metadata object associated with the source software application that specifies information associated with a logical group and a process that detects the source metadata object associated with the source software application that specifies a horizontal partitioning of a topic.

15. The system of claim 1, wherein the discovery module further comprises a process that detects security metadata.

16. The system of claim 1, wherein the discovery module further comprises a process that detects the source metadata object associated with the source software application that is used to categorize information in the source software application and a process that detects the source metadata object associated with the source software application that relates topics together.

17. The system of claim 1, wherein the discovery module further comprises a process that optimizes the discovery process.

18. The system of claim 1, wherein the discovery module further comprises a hook task that modifies the processes associated with the discovery module.

19. The system of claim 1, wherein the instantiation module further comprises a hook task that modifies the processes associated with the instantiation module.

20. The system of claim 1, wherein the instantiation module further comprises a process for enhancing business terminology into the target metadata reporting objects.

21. The system of claim 1 further comprising a generation module that receives concrete metadata objects and creates one or more generated objects which are used to implement a data access application that operates with the data contained in the source software application.

22. A data access application generation method implemented on a computer system having a processor and a file system that stores a set of metadata associated with a source software application that processes a source software application, the method comprising:

a discovery process that interfaces with a source software application and handcrafted metadata, each piece of handcrafted metadata describes one more pieces of business data stored in the source software application, many pieces of handcrafted metadata are combined together to create a reporting object template, and that automatically discovers metadata in the file system associated with the source software application configuration and creates, from the discovered metadata and the handcrafted metadata, one or more source metadata reporting object templates associated with the source software application and its configuration, the source metadata reporting objects being created from the discovered metadata or from the handcrafted metadata in combination with the discovered metadata, the discovery module further comprising a process that detects a business function of the source software application, a process that detects a business entity for the source software application, and a process that detects the relationships between the source software application configuration for the business function and the business entity; and an instantiation process that creates, using the source metadata reporting object templates created during the discovery process, one or more target metadata reporting objects corresponding to each source metadata reporting object wherein the target metadata reporting objects are associated with a particular source software application configuration and allow business data in the particular source software application with the particular source software application configuration to be reported on even when the source software application configuration changes.

23. The method of claim 22, wherein the source metadata object is an abstract metadata object and the target metadata reporting object is a concrete metadata object.

24. The method of claim 22 wherein the source metadata object is an abstract metadata object and the target metadata reporting object is an abstract metadata object.

25. The method of claim 22, wherein the source metadata object is a concrete metadata object and the target metadata reporting object is a concrete metadata object.

26. The method of claim 22, wherein the source metadata object is a generated object and the target metadata reporting object is a generated object.

27. The method of claim 22, wherein the source metadata object is an abstract metadata object and the target metadata reporting object is a generated object.

28. The method of claim 22, wherein the source metadata object is a concrete metadata object and the target metadata reporting object is a generated object.

29. The method of claim 22 further comprising an upgrade protection process that, as the source software application is upgraded to a new source software application configuration, updates the target metadata reporting objects associated with the particular source software application configuration so that the target metadata reporting objects associated with the particular source software application configuration are compatible with the new source software application configuration.

30. The method of claim 29, wherein the upgrade protection process further comprises determining the target metadata reporting objects associated with the particular source software application and the target metadata reporting object associated with the new source software application configuration, determining the naming conventions of the target metadata reporting objects associated with the particular source software application configuration, comparing the target metadata reporting objects associated with the particular source software application configuration with the target metadata reporting objects associated with the new source software application configuration and adjusting the target metadata reporting objects associated with the new source software application configuration to make the target metadata reporting objects associated with the new source software application configuration compatible with the target metadata reporting objects associated with the particular source software application configuration.

31. The method of claim 30, wherein the adjustment further comprises adjusting the target metadata reporting object names associated with the new source software application configuration to make them compatible with the target metadata reporting object names associated with the particular source software application configuration and adjusting the target metadata reporting object column names associated with the new source software application configuration to make them compatible with the target metadata reporting object column names associated with the particular source software application configuration.

32. The method of claim 30, wherein the comparison step further comprises comparing the target metadata reporting object names associated with the particular source software application configuration to the target metadata reporting object names associated with the new source software application configuration, comparing the descriptions of the target metadata reporting object names associated with the particular source software application configuration to the descriptions of the target metadata reporting object names associated with the new source software application configuration, comparing the horizontal partitioning of the target metadata reporting object names associated with the particular source software application configuration to the horizontal partitioning of the target metadata reporting object names associated with the new source software application configuration and comparing a list of columns associated with the particular source software application configuration to a list of columns associated with the new source software application configuration.

33. The method of claim 31, wherein the object name adjustment further comprises renaming a target metadata reporting object associated with the new source software application configuration to a target metadata reporting object associated with the particular source software application configuration for the same target metadata reporting object.

34. The method of claim 31, wherein the reporting object column name adjustment further comprises renaming a target metadata reporting object column associated with the new source software application configuration to a target metadata reporting object column associated with the particular source software application configuration for the same target metadata reporting object column.

35. The method of claim 22, wherein the discovery process further comprises detecting the source metadata object associated with the source software application that groups information into a topic, detecting the source metadata object associated with the source software application that specifies the source of the topic, detecting the source metadata object associated with the source software application that specifies information associated with a logical group and a process that detects the source metadata object associated with the source software application that specifies a horizontal partitioning of a topic.

36. The method of claim 22, wherein the discovery process further comprises detecting security metadata.

37. The method of claim 22, wherein the discovery process further comprises detecting the source metadata object associated with the source software application that is used to categorize information in the source software application and detecting the source metadata object associated with the source software application that relates topics together.

38. The method of claim 22, wherein the discovery process further comprises optimizing the discovery process.

39. The method of claim 36, wherein the discovery process further comprises a hook task that modifies the processes associated with the discovery module.

40. The method of claim 22, wherein the instantiation process further comprises a hook task that modifies the processes associated with the instantiation module.

41. The method of claim 22, wherein the instantiation module further comprises enhancing business terminology into the target metadata reporting objects.

42. The method of claim 22 further comprising a generation process that receives concrete metadata objects and creates one or more generated objects which are used to implement a data access application that operates with the data contained in the source software application.

43. An upgrade protection system for a data access application generation system implemented on a computer system that processes a source software application, the upgrade protection system comprising:
- a computer system having a processor and a file system that stores a set of metadata associated with a source software application;
- a module that provides one or more source metadata objects associated with the source software application and its configuration and one or more target metadata reporting objects corresponding to each source metadata object wherein the target metadata reporting objects are associated with the particular source software application configuration; and
- an upgrade protection module that, as the source software application is upgraded to a new source software application configuration, automatically updates the target metadata reporting objects associated with the particular source software application configuration to generate updated target metadata reporting objects so that the undated target metadata reporting objects are compatible with the new source software application configuration and the data access application remains unchanged and is usable with the new source software application configuration;
- wherein the upgrade process further comprises a process to adjust a name of the updated target metadata reporting objects to make them compatible with the target metadata reporting object names associated with the particular source software application configuration and a process to adjust a column name of the updated target metadata reporting objects column names to make them compatible with the target metadata reporting object column names associated with the particular source software application configuration.

44. The system of claim 43, wherein the source metadata object is an abstract metadata object and the target metadata reporting object is a concrete metadata object.

45. The system of claim 43, wherein the source metadata object is an abstract metadata object and the target metadata reporting object is an abstract metadata object.

46. The system of claim 43, wherein the source metadata object is a concrete metadata object and the target metadata reporting object is a concrete metadata object.

47. The system of claim 43, wherein the source metadata object is a generated object and the target metadata reporting object is a generated object.

48. The system of claim 43, wherein the source metadata object is an abstract metadata object and the target metadata reporting object is a generated object.

49. The system of claim 43, wherein the source metadata object is a concrete metadata object and the target metadata reporting object is a generated object.

50. The system of claim 43, wherein the upgrade protection module further comprises a process for determining the target metadata reporting object associated with the particular source software application and the target metadata reporting object associated with the new source software application configuration, a process for determining the naming conventions of the target metadata reporting objects associated with the particular source software application configuration, a process that compares the target metadata reporting objects associated with the particular source software application configuration with the target metadata reporting objects associated with the new source software application configuration and a process that adjusts the target metadata reporting objects associated with the new source software application configuration to make the target metadata reporting objects associated with the new source software application configuration compatible with the target metadata reporting objects associated with the particular source software application configuration.

51. The system of claim 43, wherein the upgrade process further comprises a process to adjust the mapping of target metadata reporting objects associated with the new source software application configuration to make them compatible with source software application configuration.

52. The system of claim 50, wherein the comparison step further comprises a process for comparing the target metadata reporting object names associated with the particular source software application configuration to the target metadata reporting object names associated with the new source software application configuration, a process for comparing the descriptions of the target metadata reporting object names associated with the particular source software application configuration to the descriptions of the target metadata reporting object names associated with the new source software application configuration, a process for comparing the horizontal partitioning of the target metadata reporting object names associated with the particular source software application configuration to the horizontal partitioning of the target metadata reporting object names associated with the new source software application configuration and a process that compares a list of columns associated with the particular source software application configuration to a list of columns associated with the new source software application configuration.

53. The system of claim 43, wherein the metadata reporting object name adjustment process further comprises a process that renames a target metadata reporting object associated with the new source software application configuration to a target metadata reporting object associated with the particular source software application configuration for the same target metadata reporting object.

54. The system of claim 43, wherein the metadata reporting object column name adjustment process further comprises a process that renames a target metadata reporting object column associated with the new source software application configuration to a target metadata reporting object column associated with the particular source software application configuration for the same target metadata reporting object column.

55. An upgrade protection method for a data access application generation method implemented on a computer system that processes a source software application, the upgrade protection method comprising:
- providing one or more source metadata objects associated with the source software application and its configuration and one or more target metadata reporting objects corresponding to each source metadata object wherein the target metadata reporting objects are associated with the particular source software application configuration; and
- as the source software application is upgraded to a new source software application configuration, automatically updating the target metadata reporting objects associated with the particular source software application configuration to generate updated target metadata reporting objects so that the updated target metadata reporting objects are compatible with the new source software application configuration and the data access application remains unchanged and is usable with the new source software application configuration;

wherein the adjustment further comprises adjusting a name the target metadata reporting objects to make them compatible with the target metadata reporting object names associated with the particular source software application configuration and adjusting a column name of the updated target metadata reporting objects column names to make them compatible with the target metadata reporting object column names associated with the particular source software application configuration.

56. The method of claim 55 wherein the source metadata object is an abstract metadata object and the target metadata reporting object is a concrete metadata object.

57. The method of claim 55, wherein the source metadata object is an abstract metadata object and the target metadata reporting object is an abstract metadata object.

58. The method of claim 56, wherein the source metadata object is a concrete metadata object and the target metadata reporting object is a concrete metadata object.

59. The method of claim 56, wherein the source metadata object is a generated object and the target metadata reporting object is a generated object.

60. The method of claim 56, wherein the source metadata object is an abstract metadata object and the target metadata reporting object is a generated object.

61. The method of claim 56, wherein the source metadata object is a concrete metadata object and the target metadata reporting object is a generated object.

62. The method of claim 56, wherein the updating further comprises determining the target associated with the particular source software application and the target associated with the new source software application configuration, determining the naming conventions of the target metadata reporting objects associated with the particular software application configuration, comparing the target metadata reporting objects associated with the particular source software application configuration with the target metadata reporting objects associated with the new source software application configuration and adjusting the target metadata reporting objects associated with the new source software application configuration to make the target metadata reporting objects associated with the new source software application configuration compatible with the target metadata reporting objects associated with the particular source software application configuration.

63. The method of claim 55, wherein the adjustment process further comprises a process to adjust the mapping of target metadata reporting objects associated with the new source software application configuration to make them compatible with the source software application configuration.

64. The method of claim 62, wherein the comparison step further comprises comparing the target metadata reporting object names associated with the particular source software application configuration to the target metadata reporting object names associated with the new source software application configuration, comparing the descriptions of the target metadata reporting object names associated with the particular source software application configuration to the descriptions of the target metadata reporting object names associated with the new source software application configuration, comparing the horizontal partitioning of the target metadata reporting object names associated with the particular source software application configuration to the horizontal partitioning of the target metadata reporting object names associated with the new source software application configuration and comparing a list of columns associated with the particular source software application configuration to a list of columns associated with the new source software application configuration.

65. The method of claim 55, wherein the reporting metadata object name adjustment further comprises renaming a target metadata reporting object associated with the new source software application configuration to a target metadata reporting object associated with the particular source software application configuration for the same target metadata reporting object.

66. The method of claim 55, wherein the reporting metadata object column name adjustment further comprises renaming a target metadata reporting object column associated with the new source software application configuration to a target metadata reporting object column associated with the particular source software application configuration for the same target metadata reporting object column.

* * * * *